United States Patent
Kameyama et al.

(10) Patent No.: US 7,382,974 B2
(45) Date of Patent: Jun. 3, 2008

(54) INFORMATION RECEIVING/RECORDING/REPRODUCING APPARATUS AND METHOD THEREOF USING A SECONDARY MEMORY DEVICE BEFORE SWITCHING TO A REAL TIME TRANSMISSION

(75) Inventors: Koichi Kameyama, Saijo (JP); Isao Yamamoto, Niihama (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 1328 days.

(21) Appl. No.: 09/979,853

(22) PCT Filed: Mar. 22, 2001

(86) PCT No.: PCT/JP01/02298

§ 371 (c)(1),
(2), (4) Date: Mar. 1, 2002

(87) PCT Pub. No.: WO01/74066

PCT Pub. Date: Oct. 4, 2001

(65) Prior Publication Data

US 2003/0007776 A1  Jan. 9, 2003

(30) Foreign Application Priority Data

Mar. 27, 2000  (JP)  ............................. 2000-087578
May 17, 2000  (JP)  ............................. 2000-145606

(51) Int. Cl.
*H04N 5/00* (2006.01)
*H04N 5/91* (2006.01)

(52) U.S. Cl. ......................................... 386/125; 386/46

(58) Field of Classification Search .................... None
See application file for complete search history.

(56) References Cited

U.S. PATENT DOCUMENTS 5,216,552 A * 6/1993 Dunlap et al. ................. 386/96
2002/0064370 A1 * 5/2002 Berkheimer et al. .......... 386/52

FOREIGN PATENT DOCUMENTS

| JP | 6-78268 | 3/1994 |
| JP | 7-30851 | 1/1995 |
| JP | 8-287598 | 1/1996 |
| JP | 2000-32399 | 1/2000 |

OTHER PUBLICATIONS

International Search Report dated Jul. 17, 2001, application No. PCT/JP01/02298.

* cited by examiner

*Primary Examiner*—John Miller
*Assistant Examiner*—Heather R. Jones
(74) *Attorney, Agent, or Firm*—RatnerPrestia

(57) ABSTRACT

A recording and reproduction allows recording and playback of video and audio signals. While viewing a recorded video and audio signal, it is sometimes desirable to switch to a real-time transmission. A time lag, however, can occur during this switching when a disk recording device is used. By providing a system with both a disk recording device and a high speed semiconductor recording device, it is possible to realize a smaller time lag and therefore smooth switching from a recorded signal to a real-time signal.

8 Claims, 35 Drawing Sheets

Fig. 2

| reproduction condition | decoded data switching part control | output switching part control |
|---|---|---|
| real time reproduction condition | — | real time reproduction output |
| shift of reproduction condition from real time reproduction condition to recorded data reproduction condition according to command for commencing backward direction high speed reproduction | switching to data utilization of disk recording medium part after data utilization of semiconductor recording medium part | recorded data reproduction output |
| shift of reproduction condition from real time reproduction condition to recorded data reproduction condition according to command for commencing forward direction low speed reproduction | switching to data utilization of disk recording medium part after data utilization of semiconductor recording medium part | recorded data reproduction output |
| shift of reproduction condition from real time reproduction condition to recorded data reproduction condition in cases other than above conditions | data utilization of disk recording medium part | recorded data reproduction output |
| shift of reproduction condition from recorded data reproduction condition to real time reproduction condition due to fact that real time reproduction is caught up with at the time of forward direction high speed reproduction | switching to data utilization of semiconductor recording medium part after data utilization of disk recording medium part | switching to real time reproduction output after recorded data reproduction output |
| shift of reproduction condition from recorded data reproduction condition to real time reproduction condition in cases other than above conditions | | real time reproduction output |
| recorded data reproduction condition | data utilization of disk recording medium part | recorded data reproduction output |

Fig. 7

| (701) reproduction condition | (702) decoded data switching part control |
|---|---|
| real time reproduction condition | utilization of inputted digitally coded video sound data in real time |
| shift of reproduction condition from real time reproduction condition to recorded data reproduction condition according to command for commencing backward direction high speed reproduction | utilization of inputted digitally coded video sound data in real time is switched to data utilization of semiconductor recording medium part and, after that, is switched to data utilization of disk recording medium part |
| shift of reproduction condition from real time reproduction condition to recorded data reproduction condition according to command for commencing forward direction low speed reproduction | utilization of inputted digitally coded video sound data in real time is switched to data utilization of semiconductor recording medium part and, after that, is switched to data utilization of disk recording medium part |
| shift of reproduction condition from real time reproduction condition to recorded data reproduction condition in cases other than above conditions | utilization of inputted digitally coded video sound data in real time is switched to data utilization of disk recording medium part |
| shift of reproduction condition from recorded data reproduction condition to real time reproduction condition due to fact that real time reproduction is caught up with at the time of forward direction high speed reproduction | data utilization of disk recording medium part is switched to data utilization of semiconductor recording medium part and, after that, inputted digitally coded video sound data is switched to utilization in real time |
| shift of reproduction condition from recorded data reproduction condition to real time reproduction condition in cases other than above conditions | data utilization of semiconductor recording medium part is switched to utilization of inputted digitally coded video sound data in real time |
| recorded data reproduction condition | data utilization of disk recording medium part |

Fig. 11

| reproduction condition | sampled video sound data |
|---|---|
| real time reproduction condition | entirety of video data |
| forward direction high speed reproduction (velocity: m) | video data sampled at large time intervals |
| forward direction high speed reproduction (velocity: n) | video data and sound data sampled at small time intervals |
| recorded data reproduction condition in cases other than above conditions (forward direction low speed, backward direction high speed reproduction, or the like) | unnecessary to record data in semiconductor recording medium part |

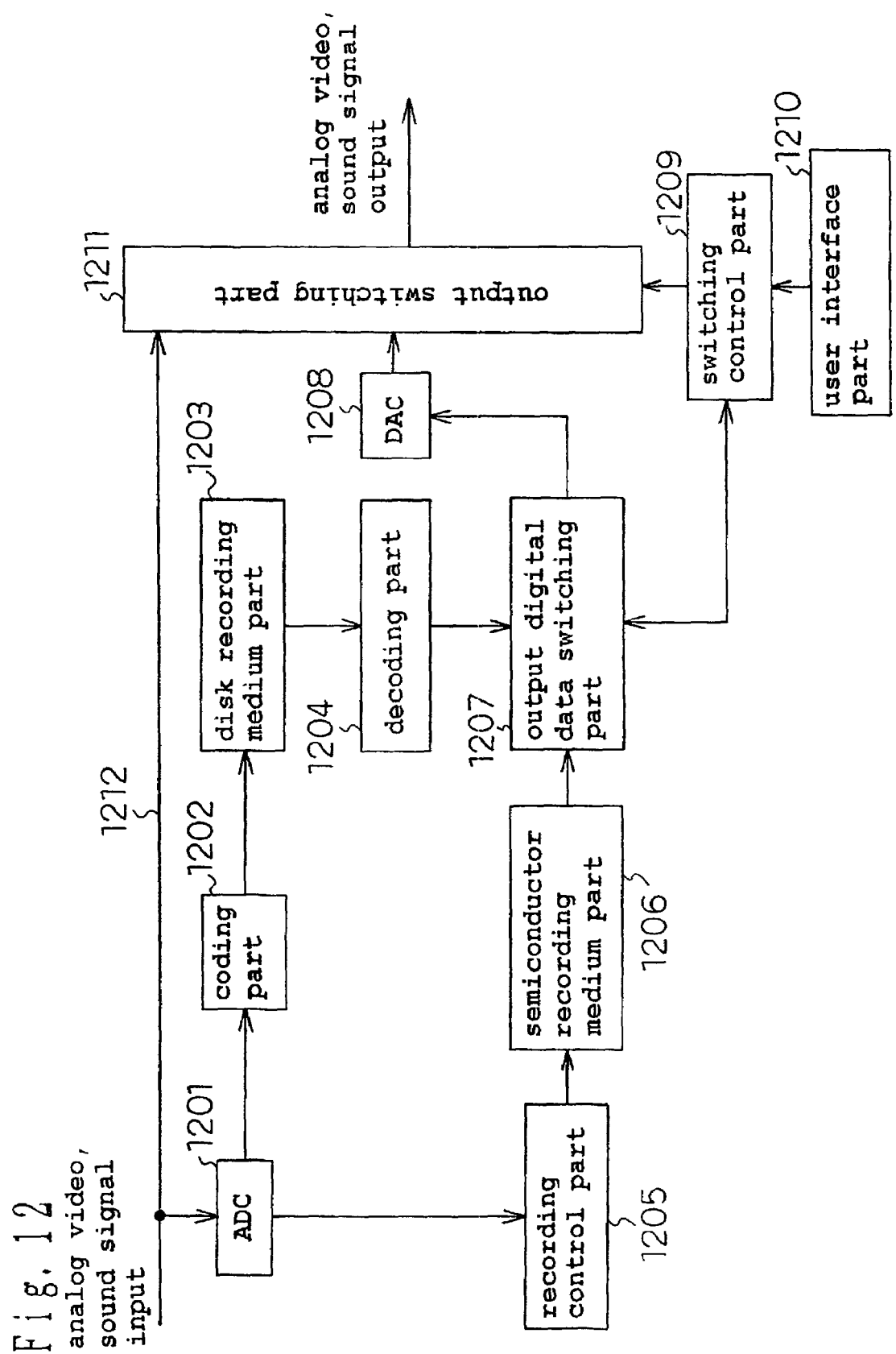

Fig. 13

| reproduction condition | output digital data switching part control | output switching part control |
|---|---|---|
| real time reproduction condition | — | real time reproduction output |
| shift of reproduction condition from real time reproduction condition to recorded data reproduction condition according to command for commencing backward direction high speed reproduction | after utilization of digital data of semiconductor recording medium part which is not coded, digitally coded data of disk recording medium part is switched to digital data utilization after decoding | recorded data reproduction output |
| shift of reproduction condition from real time reproduction condition to recorded data reproduction condition according to command for commencing forward direction low speed reproduction | after utilization of digital data of semiconductor recording medium part which is not coded, digitally coded data of disk recording medium part is switched to digital data utilization after decoding | recorded data reproduction output |
| shift of reproduction condition from real time reproduction condition to recorded data reproduction condition in cases other than above conditions | digitally coded data of disk recording medium part is switched to digital data utilization after decoding | recorded data reproduction output |
| shift of reproduction condition from recorded data reproduction condition to real time reproduction condition due to fact that real time reproduction is caught up with at the time of forward direction high speed reproduction | digitally coded data of disk recording medium part is switched to digital data utilization of semiconductor recording medium part which is not coded after digital data utilization after decoding | switching to real time reproduction output after recorded data reproduction output |
| shift of reproduction condition from recorded data reproduction condition to real time reproduction condition in cases other than above conditions | — | real time reproduction output |
| recorded data reproduction condition | digitally coded data of disk recording medium part is switched to digital data utilization after decoding | recorded data reproduction output |

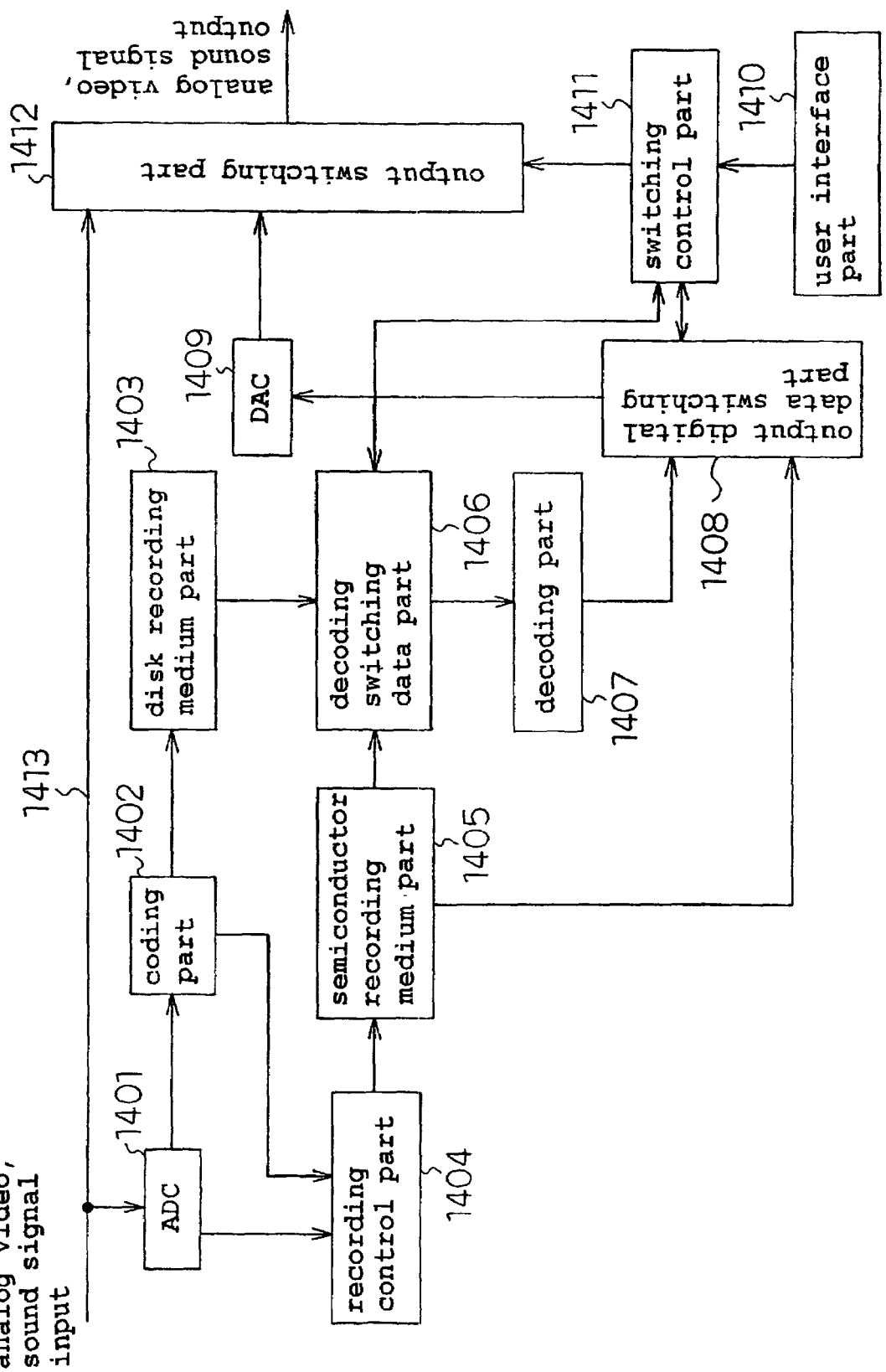

Fig. 15-1

| reproduction condition (1501) | decoded data switching part control (1502) | output digital data switching part control (1503) | output switching part control (1504) |
|---|---|---|---|
| real time reproduction condition | — | — | real time reproduction output |
| shift of reproduction condition from real time reproduction condition to recorded data reproduction condition according to command for commencing backward direction high speed reproduction | switching to data utilization of disk recording medium part after data utilization of semiconductor recording medium part | after utilization of digital data of semiconductor recording medium part which is not coded, digitally coded data of semiconductor recording medium part or of disk recording medium part is switched to digital data utilization after decoding | recorded data reproduction output |
| shift of reproduction condition from real time reproduction condition to recorded data reproduction condition according to command for commencing forward direction low speed reproduction | switching to data utilization of disk recording medium part after data utilization of semiconductor recording medium part | after utilization of digital data of semiconductor or recording medium part which is not coded, digitally coded data of semiconductor recording medium part or of disk recording medium part is switched to digital data utilization after decoding | recorded data reproduction output |

Fig. 15-2

| | | | |
|---|---|---|---|
| shift of reproduction condition from real time reproduction condition to recorded data reproduction condition in cases other than above conditions | data utilization of disk recording medium part | digitally coded data of disk recording medium part is switched to digital data utilization after decoding | recorded data reproduction output |
| shift of reproduction condition from recorded data reproduction condition to real time reproduction due to fact that real time reproduction is caught up with at the time of forward direction high speed reproduction | switching to data utilization of semiconductor recording medium part after data utilization of disk recording medium part | digitally coded data of disk recording medium part or of semiconductor recording medium part is converted to utilization of digital data of semiconductor recording medium part which is not coded after digital data utilization after decoding | switching to real time reproduction output after recorded data reproduction output |
| shift of reproduction condition from recorded data reproduction condition to real time reproduction condition in cases other than above conditions | — | — | real time reproduction output |
| recorded data reproduction condition | data utilization of disk recording medium part | digitally coded data of disk recording medium part is switched to digital data utilization after decoding | recorded data reproduction output |

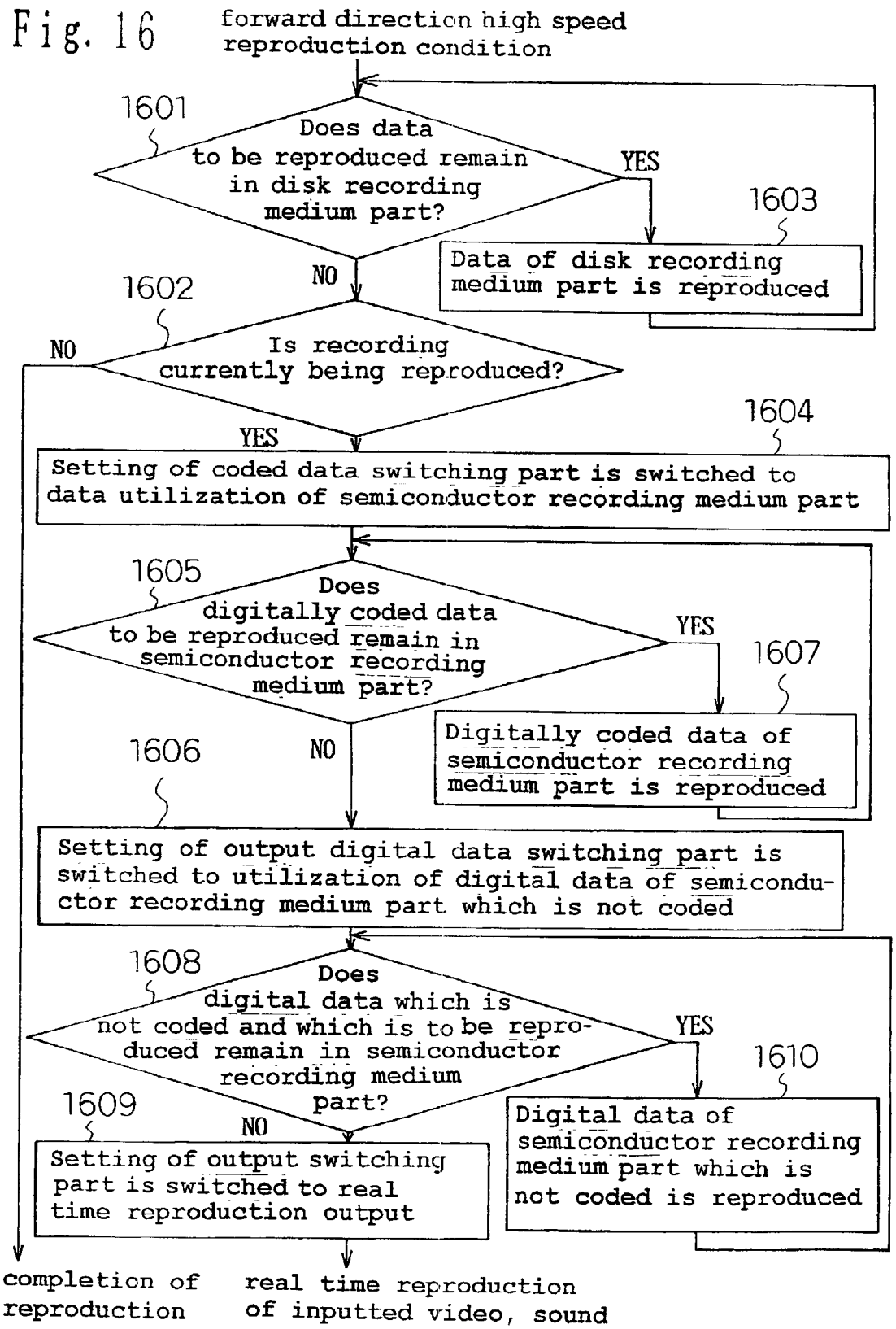

Fig. 25

| sound coding | sound mode | |
|---|---|---|
| MPEG1 and MPEG2 | stereo | |
| | joint stereo | |
| | dual channel | |
| | single channel | |
| MPEG2 | multichannel (maximum of 5 channels + LFE) | |
| | multilingual (sub-channel maximum of seven languages) | |

US 7,382,974 B2

INFORMATION RECEIVING/RECORDING/REPRODUCING APPARATUS AND METHOD THEREOF USING A SECONDARY MEMORY DEVICE BEFORE SWITCHING TO A REAL TIME TRANSMISSION

TECHNICAL FIELD

The present invention relates to an information reception, recording and reproduction apparatus for implementing a time shift reproduction by utilizing a disk recording medium which allows random access, an information reception, recording and reproduction method, and the like, which is, for example, characterized by implementing smooth switching of reproduction conditions when implementing a specific reproduction of forward direction high speed reproduction or backward direction high speed reproduction, in particular, when converting from the condition of reproducing an input video sound signal in real time to a specific reproduction and converting from a specific reproduction to the condition of reproducing an input video sound signal in real time.

BACKGROUND TECHNOLOGY

Conventionally, as for an information reception, recording and reproduction apparatus for implementing a time shift reproduction by utilizing a disk recording medium which allows random access, a method and an apparatus such as is described in Japanese unexamined patent publication H7(1995)-30851 which records TV programs in real time and reproduces at an arbitrary time are known.

In the following, a configuration and an operation of an information reception, recording and reproduction apparatus according to a prior art is described in reference to FIG. 32.

As shown in the figure, an information reception, recording and reproduction apparatus according to a prior art is formed of a time shift means 3200 for temporarily recording an analog input video signal such as a TV broadcast which is then reproduced, a switching part 3208 for receiving inputs of a video signal which is outputted from the time shift means 3200 and a video signal transmitted in real time so that one of the video signals is selectively outputted and a display part 3209 for displaying the video signal outputted from the switching part 3208.

Next, in the time shift means 3200, processing of the inputted video signal is as follows. That is to say, an AD conversion part (in the figure referred to ADC) 3201 digitally converts a video signal and a compression processing part 3203 compresses the digitally converted data and recorded it in a recording apparatus 3204 that is a recording medium allowing a random access. Here, it is possible to read out the video data recorded in the recording apparatus 3204 at an arbitrary time.

The video data recorded in the recording apparatus 3204 is outputted to an expansion processing part 3205 at a predetermined time which can be arbitrarily set to the time when reproduction is desired. Next, the video data is expanded from the condition of being compressed in the expansion processing part 3205 and the digital video data is converted to an analog video signal in a DA conversion part (referred to as DAC in the figure) 3207 and, then, is outputted to the switching part 3208.

In addition, in the switching part 3208, switching is carried out to select either the case where the input video signal, such as the current TV broadcast, is displayed in real time or the case where the video signal reproduced via the recording unit 3204 is displayed and, then, the corresponding video signal is outputted to the display part 3209 so as to be displayed.

In addition, in an apparatus which uses a recording medium, such as a magnetic disk or an magnetic optical disk, allowing random access which is an example of the time shift reproduction means 3200, specific reproductions such as a pause in reproduction, a forward direction high speed reproduction, a forward direction slow reproduction and a backward direction high speed reproduction can be easily implemented.

In the case that a means of reproducing video sound data recorded in such a recording medium, that is to say, the time shift reproduction means 3200 is constantly utilized for reproducing a video sound signal, it is possible to smoothly switch the reproduction conditions at the time when the reproduction conditions are switched from a normal reproduction to the above specific reproductions or at the time when the reproduction conditions are switched from the above specific reproductions to a normal reproduction.

However, since a time lag due to signal processing time on the time shift reproduction means 3200 side occurs between the inputted video sound signal, primarily transmitted in real time, and the video sound signal outputted from the time shift reproduction means 3200 which reproduces data that has once been recorded in a recording medium, in some cases the smooth switching of reproduction conditions becomes difficult at the time of constant utilization of the time shift reproduction means 3200.

For example, in the case that the input video sound signal is a TV broadcast, when a viewed channel (of a TV station) is switched and switching is carried out from the input video sound signal transmitted in real time to the video sound signal outputted from the time shift means 3200, time for processing the signal of the channel switched to is required before the video sound signal is outputted from the time shift means 3200. This processing time becomes the amount of time of the above time lag during which a blank screen is displayed on the display part 3209 and, as a result, a smooth switching of the input video sound signal is not carried out.

The switching part 3208 corresponds to the above described condition and takes into account, in advance, the reproduction conditions in the two means of the time shift reproduction means 3200 and the means of reproducing an input video sound signal in real time so that signals from both means are switched by receiving a signal input from the means of real time reproduction according to timing which causes a time lag.

However, in the case that switching from a normal reproduction to a specific reproduction is carried out, that is to say, in the case that the condition of reproducing an input video sound signal in real time is shifted to the condition of a backward direction high speed reproduction or a forward direction low speed reproduction, or in the case that switching is carried out from the forward direction high speed reproduction from a recording medium to a real time reproduction of an input video sound signal, the effect of the above described time lag cannot be removed even by means of the above described method and a smooth switching of the reproduction conditions cannot be realized.

In addition, though only in the case that input video sound data is constantly reproduced in real time without being recorded in a recording medium and specific reproductions such as a pause in reproduction, a forward direction high speed reproduction, a forward direction slow reproduction, a backward direction high speed reproduction are carried out, a smooth output of the switched input video sound data is possible when the video sound data recorded in the recording medium is reproduced, a time lag has occurred between the input video sound data and the video sound data outputted via the recording medium as is already described and, therefore, a time lag has occurred between the video sound data at the time of normal reproduction and the video sound data at the time of specific reproduction when the reproduction condition is switched from the normal reproduction to the above or when the reproduction condition is switched from the above specific reproduction to the normal reproduction and, thereby, a smooth switching of the reproduction conditions can not be realized because of effects of this time lag.

DISCLOSURE OF THE INVENTION

The present invention is provided in view of the above described problems and a purpose of the invention is to provide an information reception, recording and reproduction apparatus, an information reception, recording and reproduction method, and the like, wherein a smooth switching of the reproduction conditions and the switching of input video sound signals can be carried out giving an unnatural feeling to the user due to the effects of the above described time lag.

To achieve the above object, one aspect of the present invention is an information reception, recording and reproduction apparatus for carrying out a time shift reproduction wherein a video sound signal is reproduced after being temporarily recorded, comprising, at least:

a first recording means of recording said video sound signal in order to carry out the operation of said time shift reproduction, which allows random access, and a second recording means, which allows random access, at a speed higher than that of said first recording means;

a real time transmission means of transmitting said video sound signal in real time; and a switching means of switching among, and outputting, an output of said first recording means, an output of said second recording means and an output of said real time transmission means.

Another aspect of the present invention is the above-described invention, wherein said switching means carries out a switching operation based on a monitored condition of said video sound signal.

Still another aspect of the present is the above-described invention, wherein the output of said second recording means is used during, at least, output switching between the output of said first recording means and the output of said real time transmission means.

Yet still another aspect of the present invention is the above-described invention, further comprising:

a first coding means of receiving an input of an analog signal as said video sound signal and of digitally coding said analog signal into coded data; and a first decoding means of gaining a digital signal by decoding said coded data and of converting the digital signal into an analog signal, wherein said first recording means and/or said second recording means carry out recording and reproduction of said video sound signal in the form of said coded data and/or said digital signal.

Still yet another aspect of the present invention is the above-described invention, further comprising a second decoding means of receiving coded data that is digitally coded as said video sound signal, of gaining a digital signal by decoding said coded data and, in addition, of converting the digital signal into an analog signal, wherein said first recording means and/or said second recording means carry out recording and reproduction of said video sound signal in the form of said coded data and/or said digital signal.

A further aspect of the present invention is the above-described invention, further comprising a sampling means of sampling the entirety, or a part of, said video sound signal as a specific reproduction signal for use in a specific reproduction based on the reproduction condition of said video sound signal, A still further aspect of the present invention is the above-described invention, wherein said sampling means has the function of changing the intervals of sampling time of said specific reproduction signal in accordance with the speed of the specific reproduction.

A yet further aspect of the present invention is the above-described invention, wherein said sampling means samples said specific reproduction signal in, at least, the form of said coded data.

A still yet further aspect of the present invention is the above-described invention, wherein said sampling means samples said specific reproduction signal in, at least, the form of the digital signal before said coded data is coded.

An additional aspect of the present invention is the above-described invention, wherein said second recording means changes the order of reproduction of the coded data, which is said specific reproduction signal, and of the digital data before being coded, based on the reproduction condition of said video sound signal.

A still additional aspect of the present invention is an information reception, recording and reproduction apparatus, comprising:

a selection means of selecting a signal to be outputted from among a plurality of received signals based on a predetermined indication;

a recording and reproduction means of once recording said selected signal and of reproducing the once recorded signal;

an output switching means of switching between (a) an output of a reproduction signal outputted from said recording and reproduction means as a first signal and (b) an output of said selected signal, which does not pass through said recording and reproduction means, as a second signal;

a detection means of detecting a position where a switching from the output of said second signal to the output of said first signal is carried out from said signal recorded in said recording and reproduction means; and a switching control means of controlling, at the time when a change of the selection of said signal to be outputted in said selection means is indicated, (1) the signal selected based on said change indication is outputted without passing through said recording and reproduction means and, after that, (2) the signal is switched to the output of the signal selected based on said change indication which is recorded in said recording and reproduction means based on the detection result of the position for carrying out said switching of said detection means.

A yet additional aspect of the present invention is the information reception, recording and reproduction apparatus according to the 11th invention:

a time information sampling means of sampling information with respect to time corresponding to said detected position for carrying out the switching from said signal; and a switching position specification means of checking said information sampled from said reproduction signal which is reproduced by said recording and reproduction means and of specifying a position for carrying out said corresponding switching, wherein said control for switching based on said detection result means (1) when said detection means detects said position for carrying out the switching said output switching means is controlled so as to make the conversion to a predetermined condition and (2) when said switching position specification means specifies said position for carrying out the switching, said output switching means switches to the output of the signal which is recorded in said recording and reproduction means and which is selected based on said change indication.

A still yet additional aspect of the present invention is the information reception, recording and reproduction apparatus according to the 12th invention, wherein said control of the output switching means so as to make the conversion into a predetermined condition means to freeze the signal, which is outputted to said output switching means without passing through said recording and reproduction means and which is selected based on said change indication, in the condition of said detected position for carrying out the switching.

A supplementary aspect of the present invention is the information reception, recording and reproduction apparatus according to the 13th invention, wherein said received signal is an analog or a digital video sound signal which has a time stamp and wherein said information is said time stamp.

A still supplementary aspect of the present invention is the information reception, recording and reproduction apparatus according to the 14th invention, wherein said position for carrying out the switching is a scene switching position of said video sound signal.

A yet supplementary aspect of the present invention is the information reception, recording and reproduction apparatus according to the 14th invention, wherein said position for carrying out the switching is a sound mode switching position of said video sound signal.

A still yet supplementary aspect of the present invention is the information reception, recording and reproduction apparatus according to the 14th invention, wherein said video sound signal has a commercial message and wherein said position for carrying out the switching is a portion of said commercial message of said video sound signal.

One aspect of the present invention is the Information reception, recording and reproduction apparatus according to the 14th invention, wherein said position for carrying out the switching is (1) a substantially soundless portion or (2) a substantially motionless portion from and to the previous and subsequent video image, of said video sound signal.

Another aspect of the present invention is an information reception, recording and reproduction method wherein, when there is a change indication of the selection of the signal to be outputted among a plurality of received signals, the signal selected based on said change indication is once recorded in order to output said selected signal as a first signal and, at the same time, the signal is outputted as a second signal, wherein, a position for carrying out the switching from the output of said second signal to the output of said first signal is detected from the recorded signal, and wherein, after that, control is carried out so as to switch to the output of said recorded signal, which is selected according to said change indication, based on the detection result of the position for carrying out said switching.

Still another aspect of the present invention is a program for allowing a computer to function as the entirety of, or a part of, the first recording means which records said video sound signal for carrying out the operation of said time shift reproduction and which allows random access and the second recording means which allows random access at a speed higher than that of said first recording means, the real time transmission means of transmitting said video sound signal in real time and the switching means of switching between and outputting the output of said first recording means, the output of said second recording means and the output of said real time transmission means of the information reception, recording and reproduction apparatus according to the 1st invention.

Yet still another aspect of the present invention is a program for allowing a computer to function as the entirety of, or a part of, a selection means of selecting a signal to be outputted from among a plurality of received signals based on a predetermined indication; a recording and reproduction means of once recording said selected signal and of reproducing the once recorded signal; an output switching means of switching between (a) an output of a reproduction signal outputted from said recording and reproduction means as a first signal and (b) an output of said selected signal, which does not pass through said recording and reproduction means, as a second signal; a detection means of detecting a position where a switching from the output of said second signal to the output of said first signal is carried out from said signal recorded in said recording and reproduction means; and a switching control means of controlling, at the time when a change of the selection of said signal to be outputted in said selection means is indicated, (1) the signal selected based on said change indication is outputted without passing through said recording and reproduction means and, after that, (2) the signal is switched to the output of the signal selected based on said change indication which is recorded in said recording and reproduction means based on the detection result of the position for carrying out said switching of said detection means, of the information reception, recording and reproduction apparatus according to the 11th invention.

Still yet another aspect of the present invention is a program for allowing a computer to implement the entirety of, or a part of, the steps, wherein, when there is a change indication of the selection of the signal to be outputted among a plurality of received signals, the signal selected based on said change indication is once recorded in order to output said selected signal as a first signal and, at the same time, the signal is outputted as a second signal, Wherein, a position for carrying out the switching from the output of said second signal to the output of said first signal is detected from the recorded signal, and wherein, after that, control is carried out so as to switch to the output of said recorded signal, which is selected according to said change indication, based on the detection result of the position for carrying out said switching, in the information reception, recording and reproduction method according to the 19th invention.

BRIEF DESCRIPTION OF THE DRAWINGS

FIG. 7 is a diagram showing a control condition of a switching control part according to Embodiment 2 of the present invention;

FIG. 11 is a diagram showing sample data of a recording control part according to Embodiment 3, Embodiment 4 and Embodiment 5 of the present invention;

FIG. 12 is a block diagram of an information reception, recording and reproduction apparatus according to Embodiment 4 of the present invention;

FIG. 13 is a diagram showing a control condition of a switching control part according to Embodiment 4 of the present invention;

FIG. 14 is a block diagram of an information reception, recording and reproduction apparatus according to Embodiment 5 of the present invention;

FIG. 15 is a diagram showing a control condition of a switching control part according to Embodiment 5 of the present invention;

FIG. 16 is a flow chart showing a process wherein the real time reproduction at the time of the forward direction high speed reproduction is caught up with according to Embodiment 5 of the present invention;

FIG. 25 is a diagram showing a sound mode according to Embodiment 8 of the present invention;

DESCRIPTION OF THE NUMERALS

Figure 1:
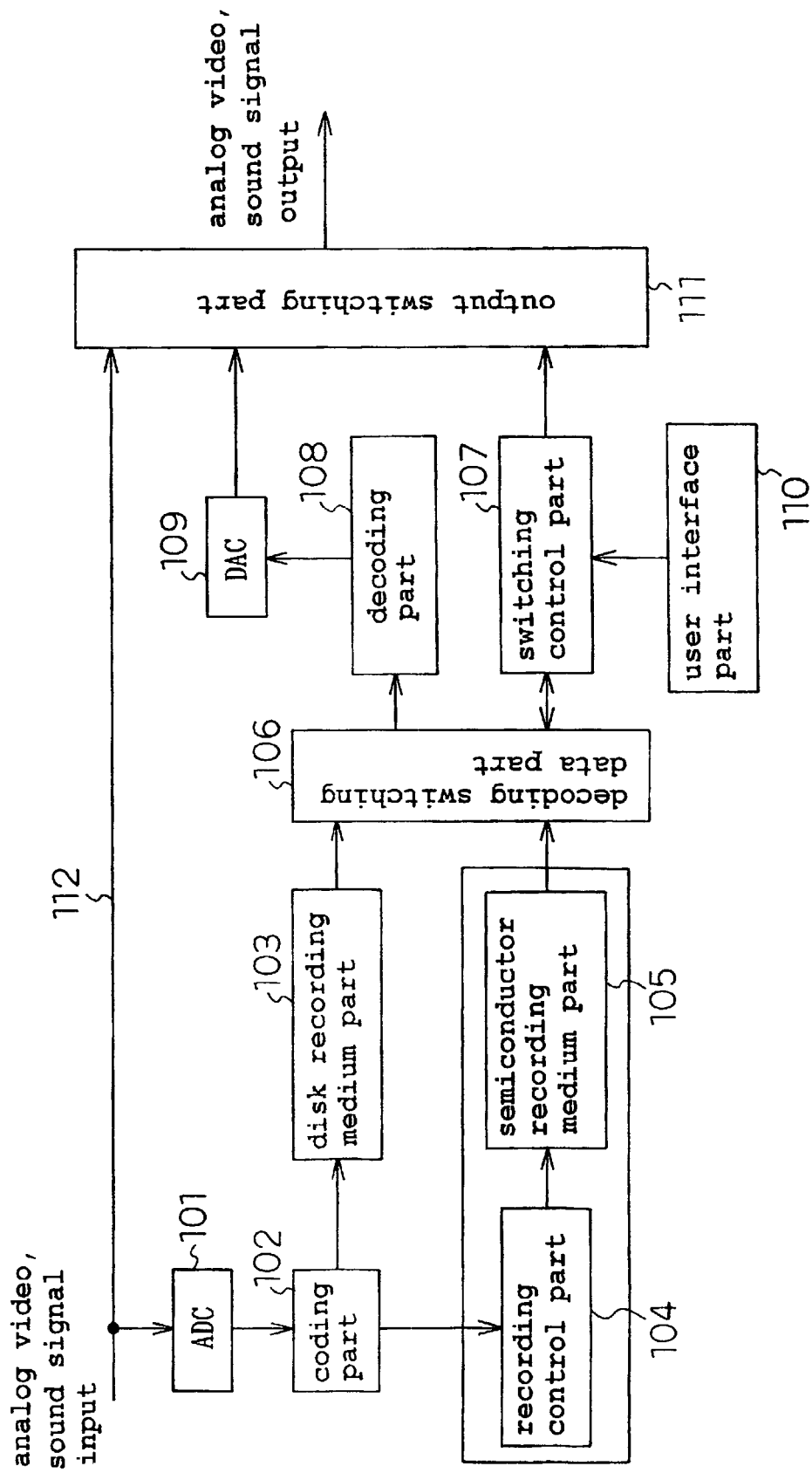
FIG. 1 is a block diagram of an information reception, recording and reproduction apparatus according to Embodiment 1 and Embodiment 3 of the present invention.

101, 1201, 1401, 3201 AD conversion part (ADC)
102, 1202, 1402 coding part
103, 601, 1203, 1403 disk recording medium part
104, 602, 1205, 1404 recording control part
105, 603, 1206, 1405 semiconductor recording medium part
106, 604, 1406 decoded data switching part
107, 605, 1209, 1411 switching control part
108, 606, 1204, 1407 decoding part
109, 607, 1208, 1409, 3207 DA conversion part (DAC)
110, 608, 1210, 1410 user interface part
111, 1211, 1412 output switching part
112, 609, 1212, 1413 real time transmission path
1207, 1408 output digital data switching part
201, 701, 1101, 1301, 1501 reproduction condition
202, 702, 1502 decoded data switching control
203, 1303, 1504 output switching part control
1302, 1503 output digital data switching part control
1102 sampled video sound data
1901, 2201, 2601, 2901 AD conversion part (ADC)
1902, 2202, 2602, 2902 coding part
1903, 2001 scene change detection part
1904, 2002, 2204, 2302, 2604, 2702, 2904, 3002 time stamp sampling part 1905, 2003, 2205, 2303, 2605, 2703, 2905, 3003 disk recording medium part
1906, 2004, 2206, 2304, 2606, 2704, 2906, 3004 time stamp analysis part
1907, 2008, 2207, 2308, 2607, 2708, 2907, 3008 decoding part
1908, 2006, 2208, 2306, 2608, 2706, 2908, 3006 switching control part
1909, 2005, 2209, 2305, 2609, 2705, 2909, 3005 user interface part
1910, 2210, 2610, 2910 frame memory
1911, 2007, 2211, 2307, 2611, 2707, 2911, 3007 output switching part
1912, 2009, 2212, 2309, 2612, 2709, 2912, 3009 DA conversion part (DAC)
2203, 2301 sound mode change detection part
2603, 2701 CM detection part
2903, 3001 coded data amount calculation part
3202, 3206 frame memory
3203 compression processing part
3204 recording apparatus
3205 expansion processing part
3208 switching part
3209 display part
3210 control part

PREFERRED EMBODIMENTS FOR CARRYING OUT THE INVENTION

Embodiment 1

In the following, Embodiment 1 of the present invention is described in reference to FIGS. 1, 2, 3, 4 and 5.

An information reception, recording and reproduction apparatus according to the present Embodiment 1 is different from the prior art and the embodiment relates to an information reception, recording and reproduction apparatus for preparing, in order to reproduce an inputted video sound signal, a means of reproduction after recording the signal on a disk recording medium which allows random access, a means of reproduction after recording the signal on a semiconductor recording medium which allows high speed access and a means of reproduction without recording the signal on a recording medium and of reproducing the signal by switching these reproduction means in accordance with the reproduction condition.

FIG. 1 is a block diagram of an information reception, recording and reproduction apparatus at the time of the input of an analog video sound signal according to one embodiment of the present invention. As shown in FIG. 1, an AD conversion part (referred to as ADC in the figure) is denoted as 101, a coding part is denoted as 102, a disk recording medium part is denoted as 103, a recording control part is denoted as 104, a semiconductor recording medium part is denoted as 105, a decoded data switching part is denoted as 106, a switching control part is denoted as 107, a decoding part is denoted as 108, a DA conversion part (referred to as DAC in the figure) is denoted as 109, a user interface part is denoted as 110, an output switching part is denoted as 111 and a real time transmission path is denoted as 112.

The operation of the information reception, recording and reproduction apparatus according to the present embodiment which has the above described structure is described as follows. An inputted analog video sound signal is converted to digital video sound data by the AD conversion part 101. The digitalized video sound data is coded in the coding part 102 and the coded data is recorded on the disk recording medium part 103 and in the semiconductor recording medium part 105. At this time, data recording to the semiconductor recording medium part 105 is recorded in an endless manner wherein recording by rewriting to the latest data at any arbitrary time through control by means of the recording control part 104.

Next, the switching control part 107 carries out control of the decoded data switching part 106 and the output switching part 111 in accordance with the current reproduction condition of an analog video sound signal and an indication, such as a command from the user for changing the reproduction condition according to notification made by means of the user interface part 110.

In the case that data from the disk recording medium part 103 or from the semiconductor recording medium part 105 is designated to be reproduced in the switching control part 107, the coded data read out from the recording medium part 103 or 105 is sent to the decoding part 108 to be decoded and, in addition, the decoded digital data is converted to analog data by the DA conversion part 109 so as to be outputted as an analog video sound signal.

In the case that the analog video sound signal is designated to be outputted in real time in the switching control part 107, the inputted analog video sound signal is outputted without change via the real time transmission path 112.

Figures 1, 17:
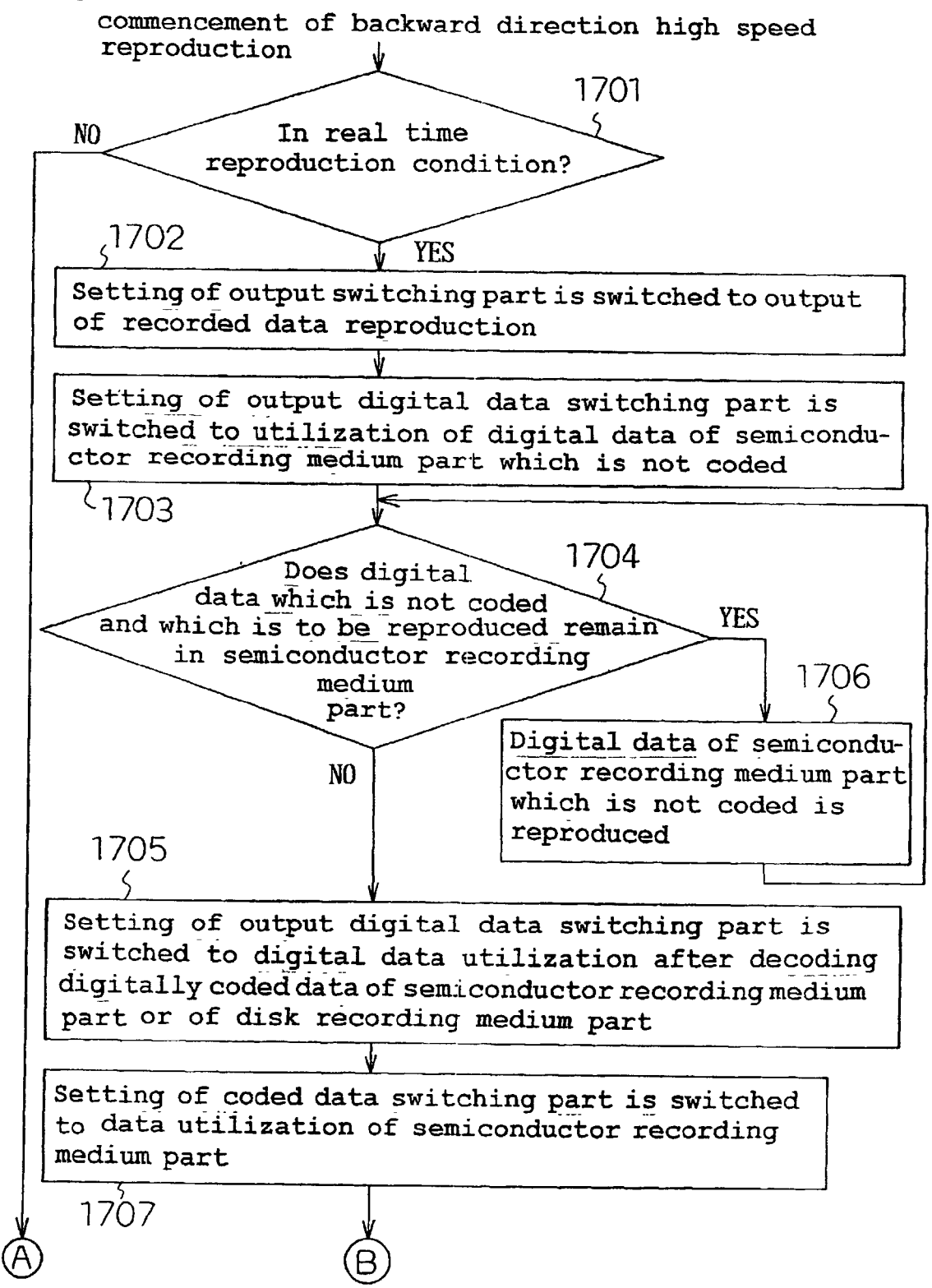
FIG. 17 is flow chart showing a process wherein the command for the commencement of backward direction high speed reproduction is given according to Embodiment 5 of the present invention.
Figures 2, 17:
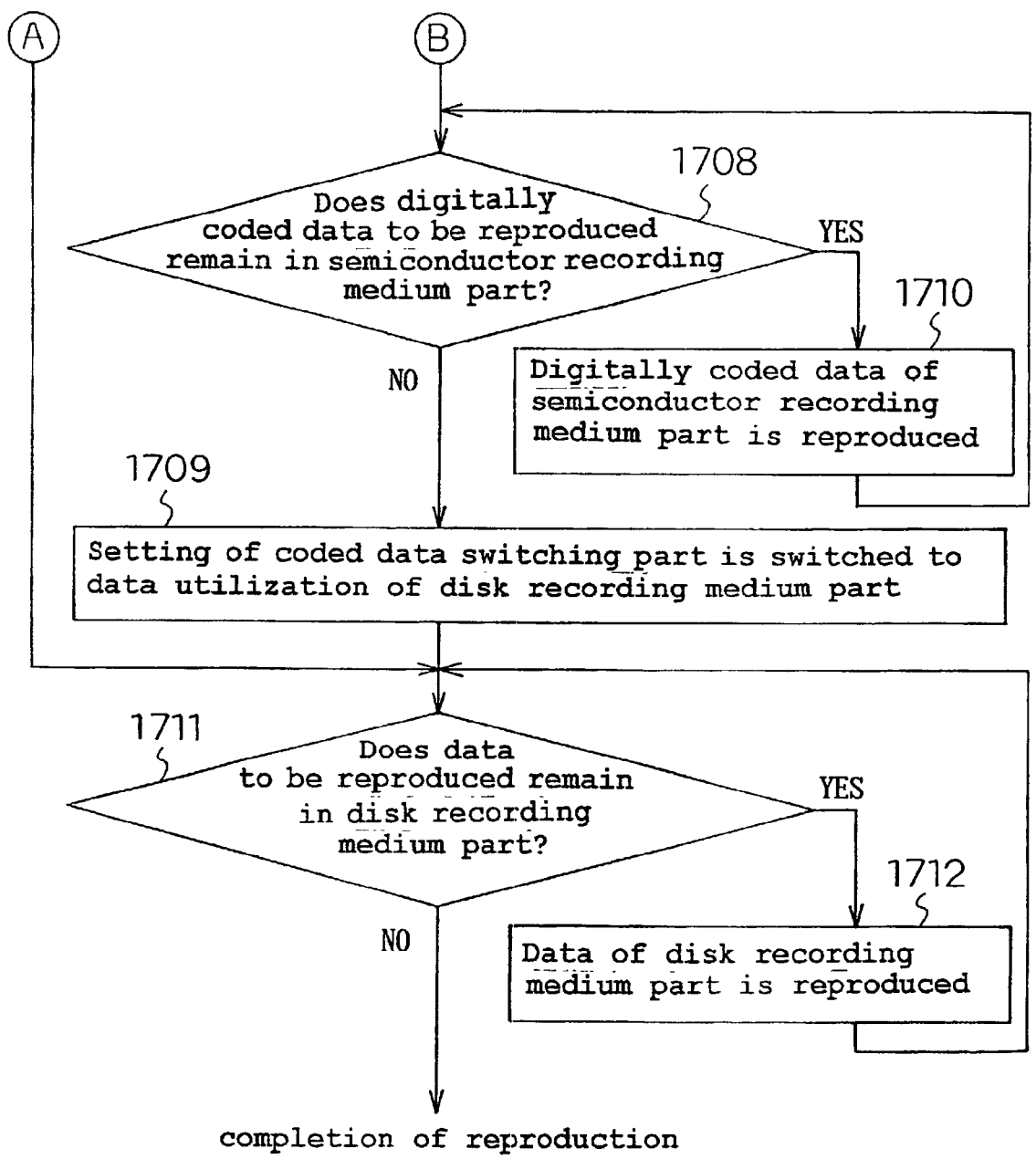
FIG. 2 is a diagram showing a control condition of a switching control part according to Embodiment 1 and Embodiment 3 of the present invention.

Next, FIG. 2 shows a diagram showing the relationships between the reproduction condition in the switching control part 107 and the control condition of the decoded data switching part 106 and the output switching part 111.

In FIG. 2 the reproduction condition 201 shows the current reproduction condition of a video sound signal or the shift of the reproduction condition by a command, or the like, from the user to change the reproduction condition of which the notification is made by means of the user interface part 110. The reproduction conditions are divided into the two conditions of the real time reproduction condition and the recorded data reproduction condition wherein the real time reproduction condition represents the condition of outputting the inputted video sound signal without change via the real time transmission path 112 while the recorded data reproduction condition represents the condition of reproducing and outputting the video sound data read out from the recording medium part 103 or 105. Conditions, such as forward direction high speed reproduction, backward direction high speed reproduction and forward direction low speed reproduction, which are the specific reproduction conditions, are all included in the recorded data reproduction condition.

The decoded data switching part control 202 shows a control condition of the decoded data switching part 106 occurring at the same time as the reproduction condition 201. The control conditions in the decoded data switching part control 202 are a control condition of the setting of the utilization of the data read out from the disk recording medium part 103 as the object of decoding, a control condition of the setting of the utilization of the data read out from the semiconductor recording medium part 105 as the object of decoding and a control condition of switching these two settings.

The output switching part control 203 shows the control condition of the output switching part 111 occurring at the same time as the reproduction condition 201. The control conditions in the output switching part control 203 are a control condition which sets the means of outputting the inputted video sound signal in real time without change via the real time transmission path 112, a control condition which sets the means of reproducing and of outputting the video sound data read out from the recording medium part 103 or 105 and a control condition of switching these two settings.

Figure 3:
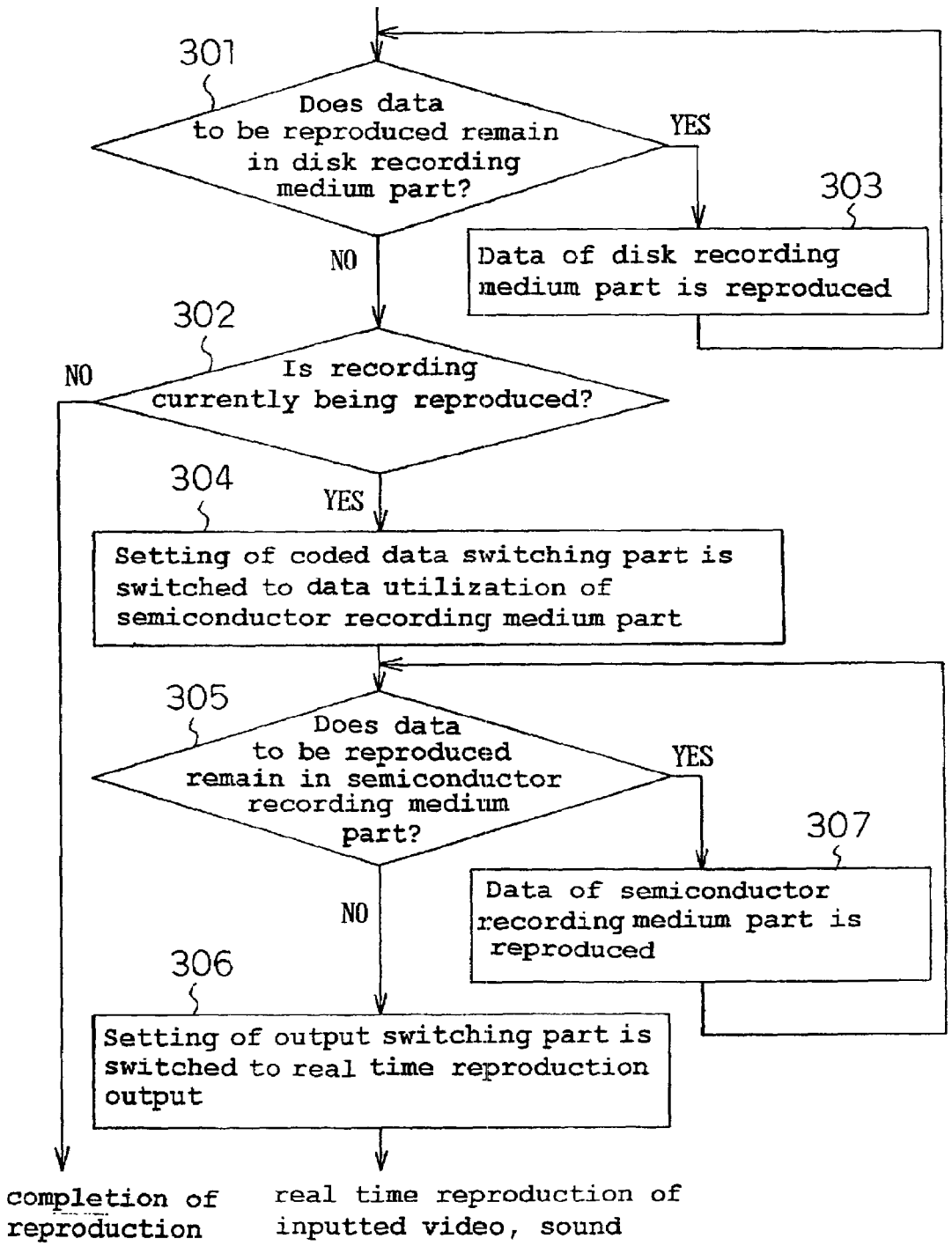
FIG. 3 is a flow chart showing a process wherein the real time reproduction at the time of the forward direction high speed reproduction is caught up with according to Embodiment 1 of the present invention.

Next, FIG. 3 is a flow chart showing processing at the time of shift of the reproduction condition from the recorded data reproduction condition to the real time reproduction condition when the real time reproduction is caught up with at the time of forward direction high speed reproduction in the reproduction condition 201 in FIG. 2.

First, in the forward direction high speed reproduction data within the disk recording medium part 103 is reproduced (Step 303) as long as reproducible data remains within the disk recording medium part 103 (Step 301, Step 302). When reproducible data no longer remains within the disk recording medium part 103, whether or not reproduction is carried out simultaneously with recording under the present condition is checked (Step 302).

In the case of the condition wherein reproduction is not carried out simultaneously with recording, the data which has been recorded and stored the previous time is reproduced and reproduction cannot be carried out continuously and, therefore, the reproduction is completed.

In the case of the condition wherein reproduction is carried out simultaneously with recording, the condition occurs wherein the forward direction high speed reproduction catches up with the real time reproduction condition. First, the switching control part 107 controls the switching of the setting of the decoded data switching part 106 from the setting of the utilization of the data of the disk recording medium part 103 as the object of decoding to the setting of the utilization of the data of the semiconductor recording medium part 105 as the object of recording (Step 304), and, then, the data within the semiconductor recording medium part 105 is reproduced as long as reproducible data remains within the semiconductor recording medium part 105 (Step 305, Step 307).

When reproducible data no longer remains within the semiconductor recording medium part 105, the switching control part 107 next controls the switching of the setting of the output switching part 111, from the setting to the means of reproducing and outputting video sound data read out from the recording medium to the setting to the means of outputting the inputted video sound signal in real time without recording on the recording medium and, then, switches to real time reproduction (Step 306).

Figure 4:
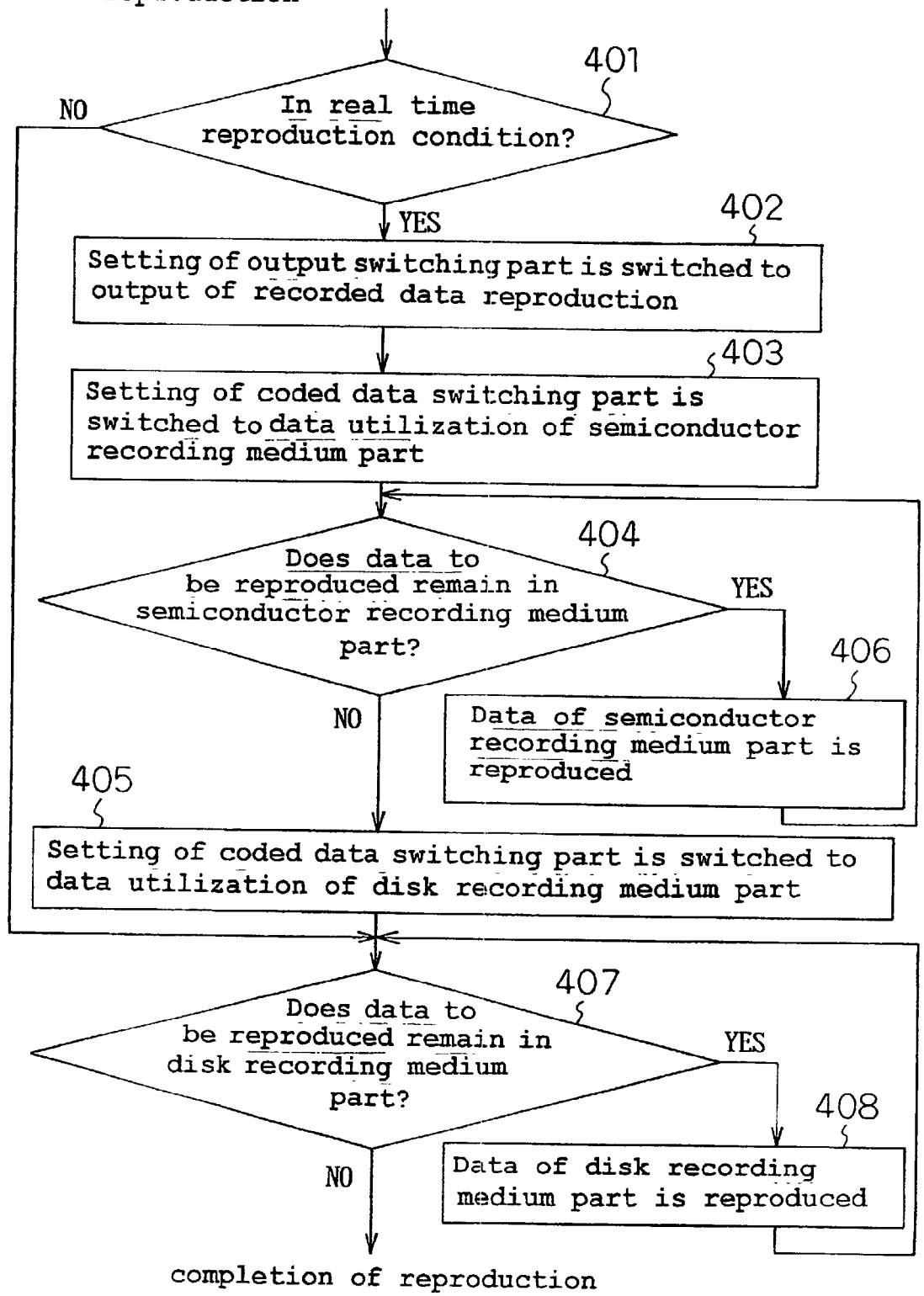
FIG. 4 is flow chart showing a process wherein the command for the commencement of backward direction high speed reproduction is given according to Embodiment 1 of the present invention.

Next, FIG. 4 is a flow chart showing processing at the time of the shift of the reproduction condition from the real time reproduction condition to the recorded data reproduction condition occurring at the same time as the command for commencement of backward direction high speed reproduction in the reproduction condition 201 in FIG. 2.

In the case that the commencement of backward direction high speed reproduction is indicated, whether or not the current reproduction condition is the real time reproduction condition is checked (Step 401). In the case that the current reproduction condition is not the real time reproduction condition, the setting of the decoded data switching part 106 is already set to the setting of the utilization of the data of the disk recording medium part 103 as the object of decoding while the setting of the output switching part 111 is set to the setting of the means of reproducing and outputting the video sound data read out from the recording medium and, therefore, the switching control part 107 does not control switching and the data within the disk recording medium part 103 is reproduced under the current setting (Step 407).

In the case that the current reproduction condition is the real time reproduction condition, first, the switching control part 107 controls the switching of the setting of the output switching part 111 from the setting of the means of outputting the inputted video sound signal in real time without recording in the recording medium to the setting of the means of reproducing and of outputting the video sound data read out from the recording medium part and controls the setting of the decoded data switching part 106 to the setting of the utilization of the data of the semiconductor recording medium part 105 (Step 403) as the object of decoding so that the current reproduction condition is switched to the recorded data reproduction condition (Step 402).

Next, in the semiconductor recording medium part 105, the data within this semiconductor recording medium part 105 is reproduced as long as reproducible data remains (Step 404, Step 406). When reproducible data no longer remains within the semiconductor recording medium part 105, the switching control part 107 next controls the switching of the setting of the decoded data switching part 106 from the setting of the utilization of the data of the semiconductor recording medium part 105 as the object of decoding to the setting of the utilization of the data of the disk recording medium part 103 as the object of decoding so that reproduction of data within the disk recording medium part 103 is commenced (Step 405). After this, the operations of the above described Step 407 and Step 408 are carried out.

Figure 5:
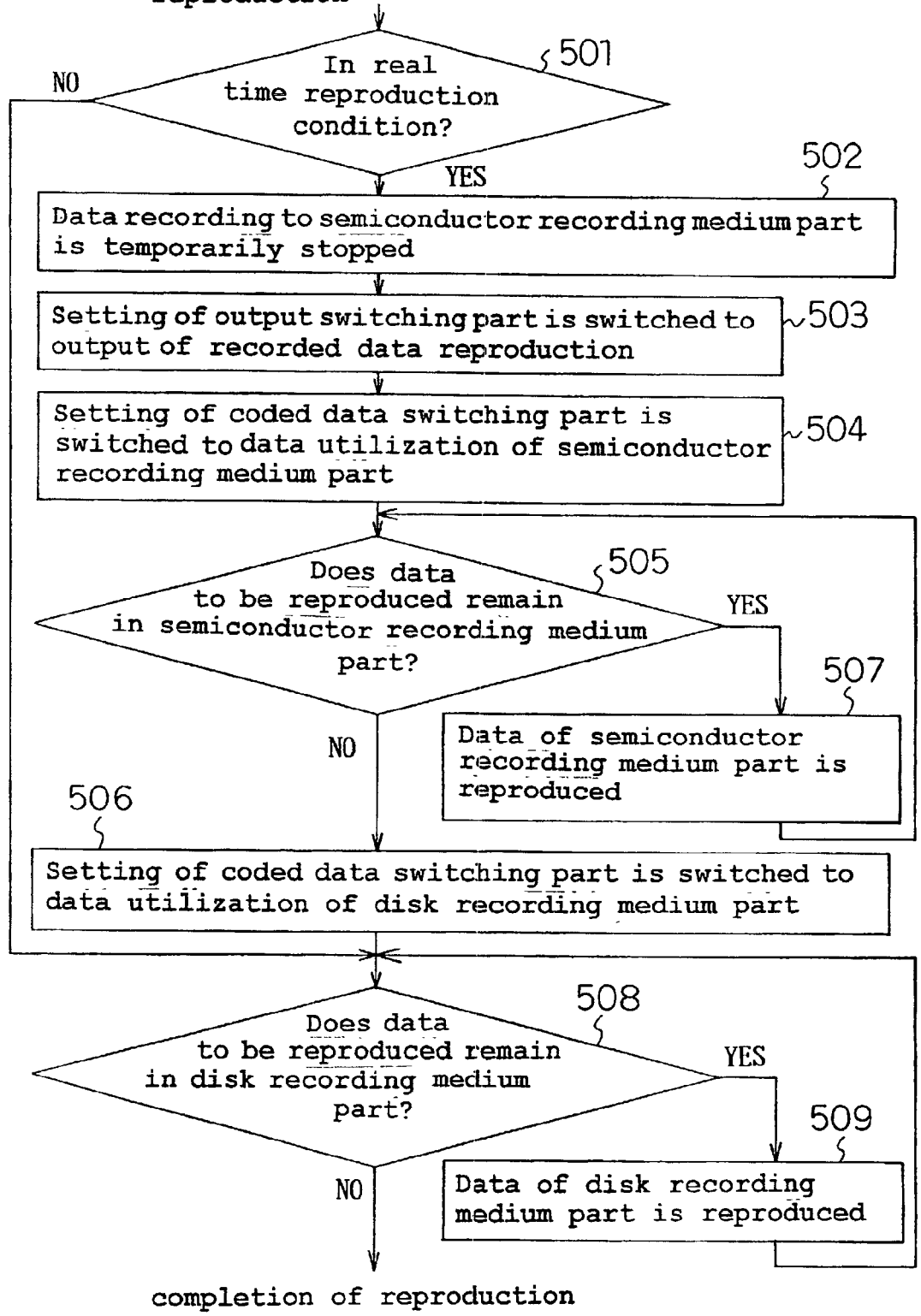
FIG. 5 is flow chart showing a process wherein the command for the commencement of forward direction low speed reproduction is given according to Embodiment 1 of the present invention.

Next, FIG. 5 is a flow chart showing processing at the time of shift of the reproduction condition 201 in FIG. 2 from the real time reproduction condition to the recorded data reproduction condition occurring at the same time as the command for the commencement of forward direction low speed reproduction.

In the case that the commencement of forward direction low speed reproduction, whether or not the current reproduction condition is the real time reproduction condition is checked (Step 501). In the case that the current reproduction condition is not the real time reproduction condition, the setting of the decoded data switching part 106 is already set to the setting of the utilization of the data of the disk recording medium part 103 as the object of decoding while the setting of the output switching part 111 is set to the setting of the means of reproducing and outputting the video sound data read out from the recording medium part and, therefore, the data within the disk recording medium part 103 is reproduced without controlling the switching by the switching control part 107 under the current setting (Steps 508, 509).

In the case that the current reproduction condition is the real time reproduction condition, first, the recording control part 104 temporarily stops writing data into the semiconductor recording medium part 105 (Step 502). This is to prevent data to be reproduced according to a low speed reproduction from being recorded over by being overwritten by the latest data before being reproduced since the semiconductor recording medium part 105 normally records by overwriting according to the latest data at any arbitrary time.

Then, the switching control part 107 controls the switching of the setting of the output switching part 111 from the setting to the means of outputting the input video sound signal in real time without recording on the recording medium part to the setting to the means of reproducing and outputting the video sound data read out from the recording medium part and controls the setting of the decoded data switching part 106 to the setting of the utilization of the data of the semiconductor recording medium part 105 (Step 504) as the object of decoding so that the condition is switched to the recorded data reproduction condition (Step 503).

Next, the data within the semiconductor recording medium part 105 is reproduced as long as the reproducible data remains within the semiconductor recording medium part 105 (Steps 505, 507). When reproducible data no longer remains within the semiconductor recording medium part 105, the switching control part 107 next controls the switching of the setting of the decoded data switching part 106 from the setting of utilization of the data of the semiconductor recording medium part 105 as the object of decoding to the setting of utilization of the data of the disk recording medium part 103 as the object of decoding so that the reproduction of the data of the disk recording medium part 103 commences (Steps 508, 509).

As described above, according to the present embodiment, in order to reproduce the inputted analog video sound signal, means of reproducing after recording the signal in the disk recording medium, which allows random access, means of reproducing after recording the signal in the semiconductor recording medium, which allows high speed access, and means of reproducing the signal without recording in the recording medium are prepared so that the signal is reproduced by switching these reproduction means in accordance with the reproduction condition and, thereby, an information reception, recording and reproduction apparatus can be implemented which allows a smooth switching of the reproduction conditions.

Embodiment 2

In the following, the second embodiment of the present invention is described in reference to FIGS. 6, 7, 8, 9 and 10.

The present Embodiment 2 relates to an information reception, recording and reproduction apparatus of the case where a digitally coded video sound signal is used instead of the usage of an analog video sound signal as the input video sound signal in the above described Embodiment 1.

Figure 6:
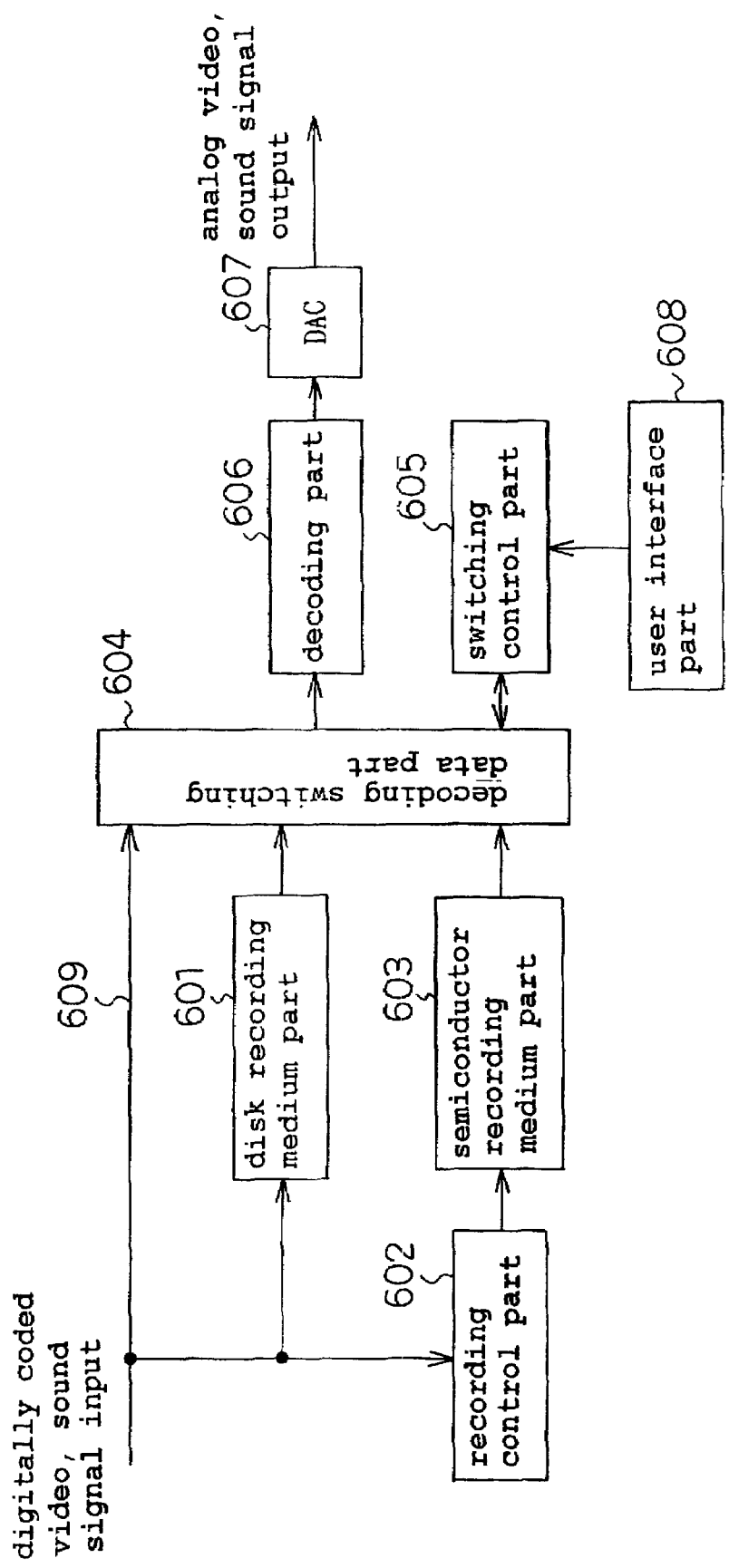
FIG. 6 is a block diagram of an information reception, recording and reproduction apparatus according to Embodiment 2 of the present invention.

FIG. 6 shows a block diagram of an information reception, recording and reproduction apparatus at the time of input of a digitally coded video sound signal according to Embodiment 2 of the present invention. As shown in FIG. 6, a disk recording medium part is denoted as 601, a recording control part is denoted as 602, a semiconductor recording medium part is denoted as 603, a decoded data switching part is denoted as 604, a switching control part is denoted as 605, a decoding part is denoted as 606, a DA conversion part (referred to as DAC in the figure) is denoted as 607, a user interface part is denoted as 608 and a real time transmission path is denoted as 609.

Next, the operation of the information reception, recording and reproduction apparatus according to the present embodiment which has the above structure is described. An inputted digitally coded video sound signal is sent to, and is recorded in, the disk recording medium part 601 and the semiconductor recording medium part 603. At this time, data recording in the semiconductor recording medium part 603 is a recording in an endless manner wherein overwriting recording is carried out as the latest data at any arbitrary time according to control by the recording control part 602.

Next, the decoded data switching part 604 is controlled by the switching control part 605 in accordance with the current reproduction condition and in accordance with instructions such as a command by the user for changing the reproduction condition of which notification is made by the user interface part 608.

The switching control part 605 designates reproduction of data of the disk recording medium part 601, reproduction of data of the semiconductor recording medium part 603 or direct reproduction of a digitally coded video sound signal via the real time transmission path 609 without utilizing data of any recording medium part. The data of the designated route is sent to the decoding part 606 so as to be recorded and the decoded digital data is converted to an analog signal by the DA conversion part 607 so as to be outputted.

Next, FIG. 7 is a diagram showing the relationships between the reproduction condition in the switching control part 605 and the control condition of the decoded switching part 604.

In FIG. 7, the reproduction condition 701 has the same content as the reproduction condition 201 in the above FIG. 2, of which the description is omitted. The decoded data switching part control 702 shows the control condition concerning the decoded data switching part 604 occurring at the same time as the reproduction condition 701.

The control condition in the decoded data switching part control 702 includes the control of the setting of the utilization of the data of the disk recording medium part 601 as the object of decoding, the control of the setting of the utilization of the data of semiconductor recording medium part 603 as the object of decoding, the setting of the utilization in real time of the inputted digitally coded video sound data and the control condition switching these three settings.

Figure 8:
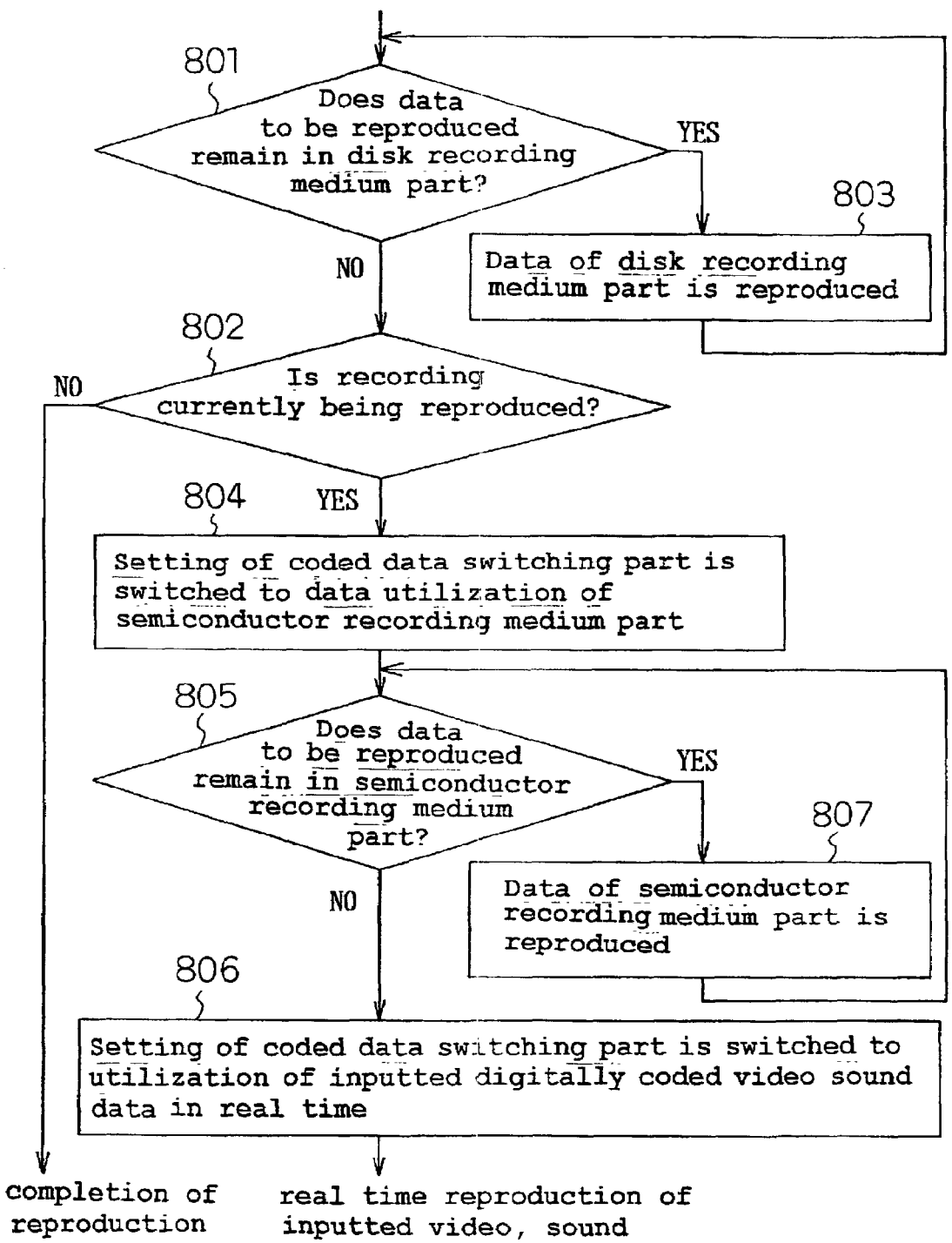
FIG. 8 is a flow chart showing a process wherein the real time reproduction at the time of the forward direction high speed reproduction is caught up with according to Embodiment 2 of the present invention.

FIG. 8 is a flow chart showing processing at the time of the shift of the reproduction condition from the recorded data reproduction condition to the real time reproduction condition when the forward direction high speed reproduction catches up with the real time reproduction in the reproduction condition 701 in FIG. 7.

First, at the time of forward direction high speed reproduction the data within the disk recording medium part 601 is reproduced as long as reproducible data remains within the disk recording medium part 601 (Step 801, Step 803). When reproducible data no longer remains within the disk recording medium part 601, it is checked whether or not reproduction is carried out simultaneously with recording under the current condition (Step 802). In the case of the condition wherein reproduction is not carried out simultaneously with recording, data which has been previously recorded and stored is reproduced and reproduction cannot be carried out continuously and, therefore, the reproduction is completed. In the case of the condition where the reproduction is carried out simultaneously with recording, it is a condition where the real time reproduction condition is caught up with by the forward direction high speed reproduction.

In the condition where the real time reproduction condition is caught up with, first, the switching control part 605 controls the switching of the setting of the decoded data switching part 604 from the setting of the utilization of the data of the disk recording medium part 601 as the object of decoding to the setting of the utilization of the data of the semiconductor recording medium part 603 as the object of decoding (Step 804) and the data within the semiconductor recording medium part 603 is reproduced as long as reproducible data remains within the semiconductor recording medium part 603 (Step 805, Step 807).

When reproducible data no longer remains within the semiconductor recording medium part 603, the switching control part 605 next controls the switching of the setting of the coded data switching part 604 from the setting of the utilization of the data of the semiconductor recording medium part 603 as the object of decoding to the setting of the utilization in real time of the digitally coded video sound data inputted as the object of decoding so that the condition is switched to real time reproduction (Step 806).

Figure 9:
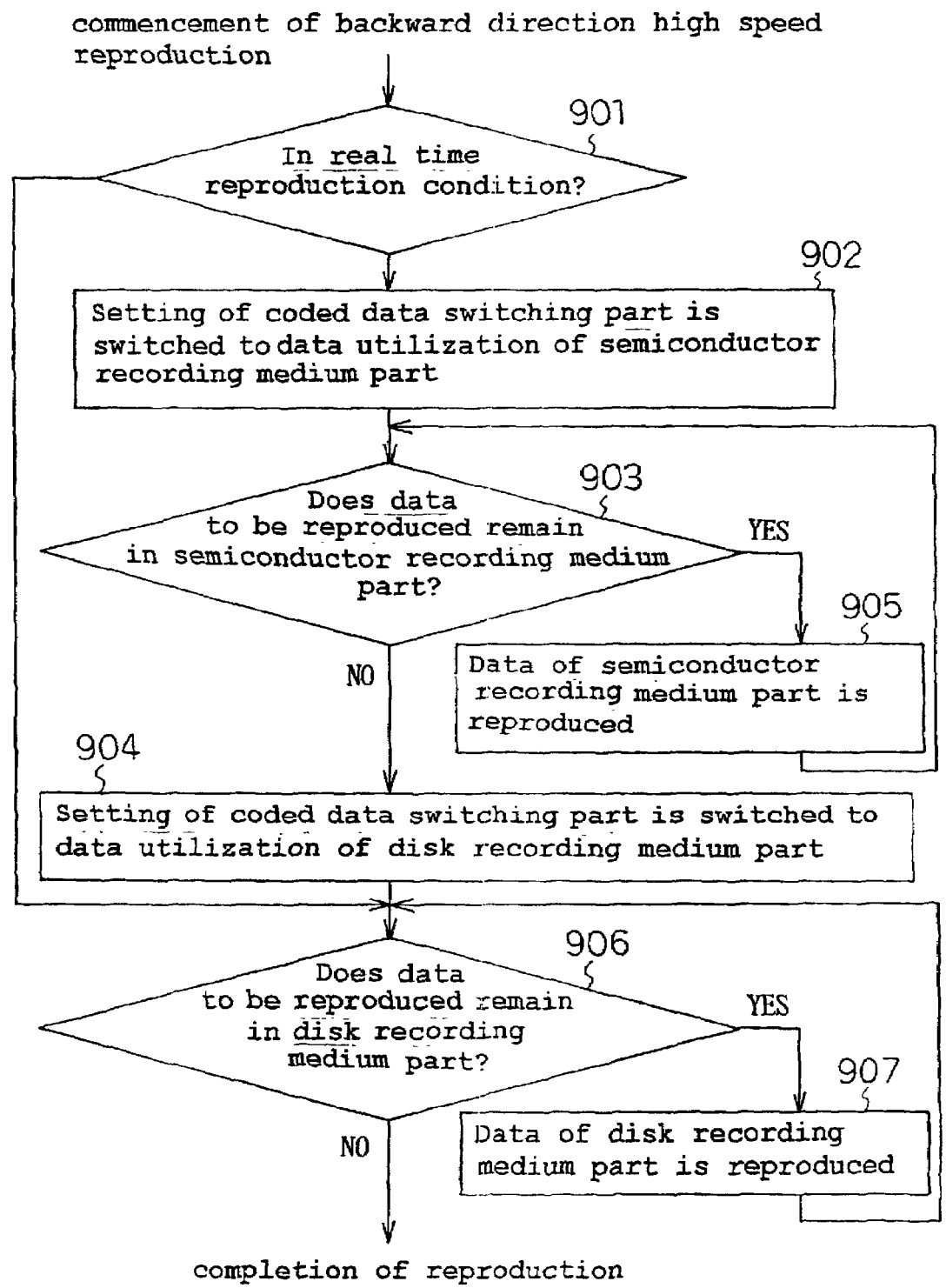
FIG. 9 is flow chart showing a process wherein the command for the commencement of backward direction high speed reproduction is given according to Embodiment 2 of the present invention.

Next, FIG. 9 is a flow chart showing processing at the time of shift of the reproduction condition from the real time reproduction condition to the recorded data reproduction condition occurring at the same time as a command for commencing backward direction high speed reproduction in the reproduction condition 701 in FIG. 7.

In the case that the commencement of the backward direction high speed reproduction is indicated, it is checked whether or not the current reproduction condition is the real time reproduction condition (Step 901). In the case that the current reproduction condition is not the real time reproduction condition, the setting of the decoded data switching part 604 is already set to the setting the utilization of the data of the disk recording medium part 601 as the object of decoding and, therefore, the switching is not controlled by the switching control part 605 so as to reproduce the data within the disk recording medium part 601 under the current setting (Step 906, Step 907).

In the case that the current reproduction condition is the real time reproduction condition, first, the switching control part 605 controls the setting of the decoded data switching part 604 from the setting of the utilization in real time of the digitally coded video sound data inputted as the object of decoding to the setting of the utilization of the data of the semiconductor recording medium part 603 as the object of decoding so that the condition is switched to the recorded data reproduction condition (Step 902). The data within the semiconductor recording medium part 603 is reproduced as long as reproducible data remains within the semiconductor recording medium part 603 (Step 903, Step 905).

When reproducible data no longer remain within the semiconductor recording medium part 603, the switching control part 605 next controls the switching of the setting of the decoded data switching part 604 from the setting of the utilization of the data of the semiconductor recording medium part 603 as the object of decoding to the setting of utilization of the data of the disk recording medium part 601 as the object of decoding (Step 904) so that the reproduction of the data within the disk recording medium part 601 is commenced. After this, the operations of the above described Step 906 and Step 907 are carried out.

Figure 10:
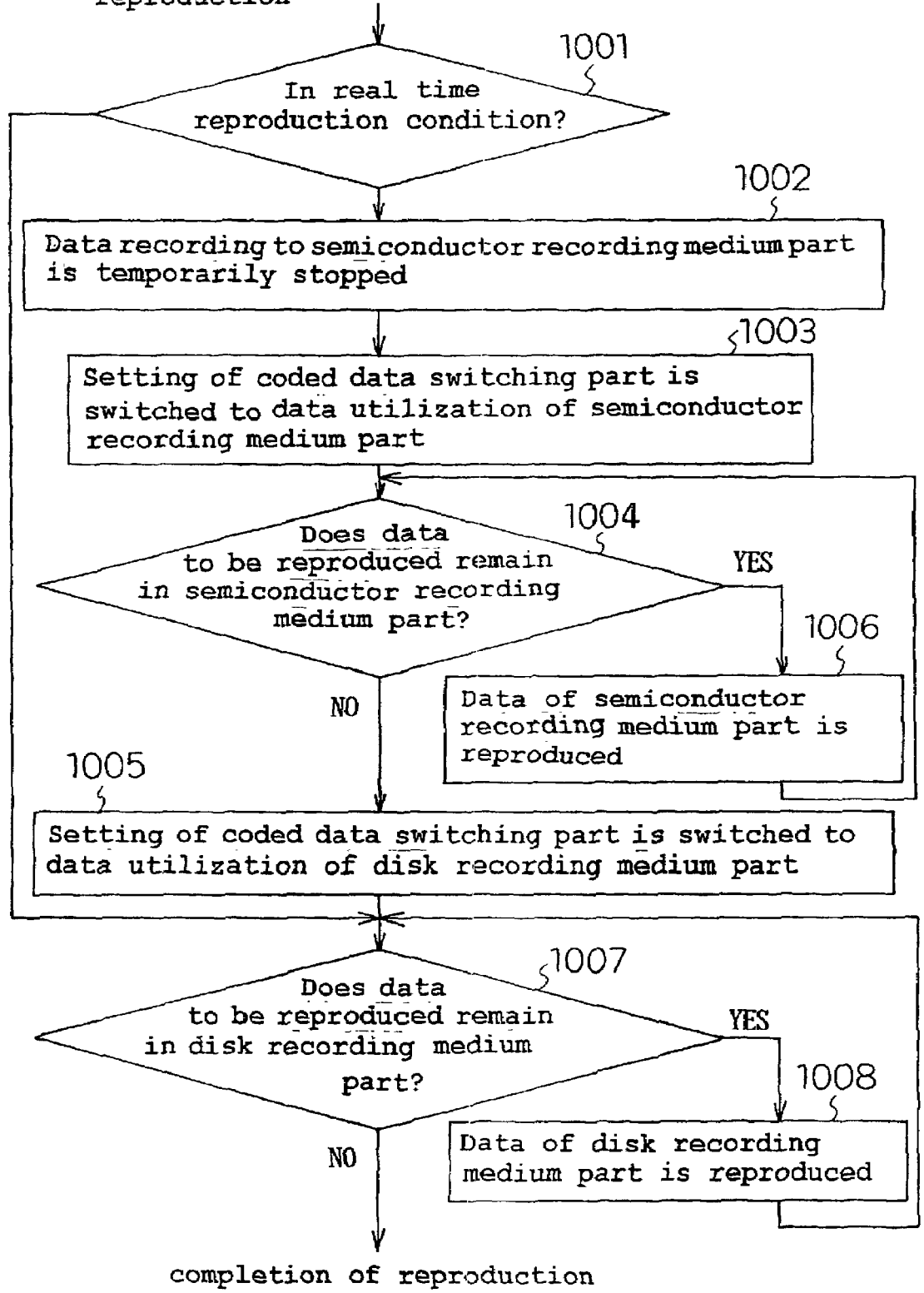
FIG. 10 is flow chart showing a process wherein the command for the commencement of forward direction low speed reproduction is given according to Embodiment 2 of the present invention.

Next, FIG. 10 is a flow chart showing processing at the time of the shift of the reproduction condition from the real time reproduction condition to the recorded data reproduction condition occurring at the same time as a command for commencing forward direction low speed reproduction in the reproduction condition 701 in FIG. 7.

In the case that the commencement of the forward direction low speed reproduction is indicated, it is checked whether or not the current reproduction condition is the real time reproduction condition (Step 1001). In the case that the current reproduction condition is not the real time reproduction condition, the setting of the decoded data switching part 604 is already set to the setting of the utilization of the data of the disk recording medium part 601 as the object of decoding and, therefore, the data within the disk recording medium part 601 is reproduced without controlling the switching by the switching control part 605 under the current setting (Step 1007, Step 1008).

In the case that the current reproduction condition is the real time reproduction condition, first, the recording control part 602 temporarily stops writing data into the semiconductor recording medium part 603 (Step 1002) This is to prevent data to be reproduced according to a low speed reproduction from being recorded over by being overwritten by the latest data before being reproduced since the semiconductor recording medium part 603 normally records by overwriting according to the latest data at any arbitrary time.

Then, the switching control part 605 controls the setting of the decoded data switching part 604 from the setting of the utilization in real time of the digitally coded video sound data inputted as the object of decoding to the setting of utilization of the data of the semiconductor recording medium part 603 as the object of decoding so that the condition is switched to the recorded data reproduction condition (Step 1003). The data within the semiconductor recording medium part 603 is reproduced as long as reproducible data remains within the semiconductor recording medium part 603 (Step 1004, Step 1006).

When reproducible data no longer remains within the semiconductor recording medium part 603, the switching control part 605 next controls the setting of the decoded data switching part 604 from the setting of the utilization of the data of the semiconductor recording medium part 603 as the object of decoding to the setting of utilization of the data of the disk recording medium part 601 as the object of decoding (Step 1005) so as to commence the reproduction of the data within the disk recording medium part.

As described above according to the present embodiment, in order to reproduce the inputted and digitally coded video sound signal, means of reproducing the signal after recording the signal in the disk recording medium, which allows random access and means of reproducing the signal without recording on the recording medium are prepared so that the signal is reproduced by switching these reproduction means in accordance with the reproduction condition and, thereby, an information reception, recording and reproduction apparatus can be implemented which allows a smooth switching of the reproduction conditions.

Embodiment 3

In the following, Embodiment 3 of the present invention is described in reference to FIGS. 1, 2 and 11.

The present Embodiment 3 relates to an information reception, recording and reproduction apparatus wherein the semiconductor recording medium part is efficiently utilized by comprising a means of sampling data utilized only at the time of special reproduction when data is recorded in the semiconductor recording medium part in the above Embodiment 1 where the means samples and records the digitally coded data after being coded.

The structure and the operation of the information reception, recording and reproduction apparatus at the time of the analog video sound signal input according to Embodiment 3 of the present invention in reference to FIG. 1 are the same as the above Embodiment 1, of which the overlapped descriptions are omitted. Here, the sampling means of sampling the data utilized at the time of specific reproduction is provided within the semiconductor recording medium part 603.

In addition, the structures and the operations with respect to the reproduction condition of the present embodiment and the control condition of the decoded data switching part 106 and the output switching part 111 in reference to FIG. 2 are the same as in the above Embodiment 1, of which the overlapped descriptions are omitted.

Next, FIG. 11 is a diagram showing the relationships between the current reproduction condition and the video sound data sampled in the recording control part 104.

In FIG. 11, the reproduction condition 1101 shows the current reproduction condition. In reference to FIG. 2, data of the semiconductor recording medium part 105 is utilized at the time of the commencement of the backward direction high speed reproduction and at the time of the commencement of the forward direction low speed reproduction when the current condition shifts from the real time reproduction condition to another reproduction condition. Accordingly, when the reproduction condition 1101 is the real time reproduction condition it is necessary to record data in the semiconductor recording medium part 105 in preparation for the commencement of the backward direction high speed reproduction and the commencement of the forward direction low speed reproduction and therefore, the sampled video sound data 1102 becomes the setting for sampling all the video data.

Though intermittent video data does not have any problems in the case of the backward direction high speed reproduction, in the case of the forward direction low speed reproduction all the video data is necessary and, since it is not clear whether the backward direction high speed reproduction or the forward direction low speed reproduction is designated, it is necessary to make a setting for sampling the video data. In addition, sound is not, in general, outputted in the backward direction high speed reproduction or in the forward direction low speed reproduction and, therefore, sound data is not recorded.

In addition, in reference to FIG. 2, when the current condition shifts from the recording reproduction condition to the real time reproduction condition, the case that the data of the semiconductor recording medium part 105 is utilized is when the real time reproduction is caught up with at the time of forward direction high speed reproduction. Accordingly, when the reproduction condition 1101 is in the forward direction high speed reproduction condition it is necessary to record data in the semiconductor recording medium part 105 in preparation for the shift to the real time reproduction condition arid, therefore, the sampled video sound data 1102 is set so as to sample video data, which is sampled intermittently in, for example, frame units, and sound data.

Here, since the intervals video data utilized for reproduction vary depending on the reproduction speed of the forward direction high speed reproduction, in the case that the reproduction speed of the forward direction high speed reproduction is m (m is a high speed reproduction of which the speed is faster than n) in the reproduction condition 1101, the sampled video sound data 1102 becomes the video data sampled with large time intervals while in the case that the reproduction speed of the forward direction high speed reproduction is n (n is a high speed reproduction of which speed is slower than m) in the reproduction condition 1101, the sampled video sound data 1102 becomes video data sampled at short time intervals.

In addition, since the forward direction high speed reproduction of which the speed is slow in some cases outputs sound intermittently, the sampled video sound data 1102 may be video data and sound data sampled at short time intervals in the case that the reproduction speed of the forward direction high speed reproduction is n (n is a high speed reproduction of which the speed is slower than m) in the reproduction condition 1101.

As described above, according to the present embodiment, an information reception, recording and reproduction apparatus can be implemented wherein the semiconductor recording medium is efficiently utilized by providing a means of sampling only data utilized at the time of specific reproduction within the semiconductor recording medium part at the time when data is recorded in the semiconductor recording medium part, where the means samples and records the digitally coded data after being coded.

Here, by sampling digital data after being coded, there is an advantage that the apparatus can be utilized at the reproduction condition switching time for a long period of time. In addition, by changing sampled data according to the current reproduction condition an information reception, recording and reproduction apparatus can be implemented wherein the semiconductor recording medium can be more efficiently utilized.

Embodiment 4

In the following, Embodiment 4 of the present embodiment is described in reference to FIGS. 11, 12 and 13.

The present Embodiment 4 relates to an information reception, recording and reproduction apparatus wherein a semiconductor recording medium is efficiently utilized by providing a means of sampling data only utilized at the time of specific reproduction when data is recorded in the semiconductor recording medium in the above described Embodiment 1 where the means samples and records the digital data before being coded.

FIG. 12 shows a block diagram of an information reception, recording and reproduction apparatus according to one embodiment of the present invention which provides a means of sampling data only utilized at the time of specific reproduction within the semiconductor recording medium part at the time when digital data is recorded in the semiconductor recording medium at the time of the analog video sound signal input where the means is a means of sampling digital data before being coded. As shown in FIG. 12, an AD conversion part (referred to as ADC in the figure) is denoted as 1201, a coding part is denoted as 1202, a disk recording medium part is denoted as 1203, a decoding part is denoted as 1204, a recording control part is denoted as 1205, a semiconductor recording medium part is denoted as 1206, an output data switching part is denoted as 1207, a DA conversion part (referred to as DAC in the figure) is denoted as 1208, a switching control part is denoted as 1209, a user interface part is denoted as 1210, an output switching part is denoted as 1211 and a real time transmission path is denoted 1212. Here, the sampling means of sampling data utilized at the time of the specific reproduction is provided within the semiconductor recording medium part 1206.

The operation of the information reception, recording and reproduction apparatus according to the present embodiment which has the above described structure is described as follows. An inputted analog video sound signal is converted to a digital video sound data by the AD conversion part 1201. The digitalized video sound data is coded by the coding part 1202 and the coded data is recorded in the disk recording medium part 1203. In addition, the video sound data digitalized in the AD conversion part 1201 is extracted by the recording control part 1205 as the video sound data in accordance with the current reproduction condition so as to be recorded in the semiconductor recording medium part 1206. At this time, the data recording to the semiconductor recording medium part 1206 is a recording in an endless manner wherein overwriting recording is carried out as the latest data at any arbitrary time according to control by the recording control part 1205.

Next, the output digital data switching part 1207 and the output switching part 1211 are controlled by the switching control part 1209 in accordance with the current reproduction condition and the indication such as a command for changing the reproduction condition from the user of which notification is made by the user interface part 1210.

In the case that the data of the disk recording medium part 1203 is designated to be reproduced in the switching control part 1209, the coded data read out from the disk recording medium part 1203 is sent to the decoding part 1204 so as to be decoded and the decoded digital data is converted into analog data by the DA conversion part 1208 so as to be outputted.

In the case that the data of the semiconductor recording medium part 1206 is designated to be reproduced in the switching control part 1209, the digital data read out from the semiconductor recording medium part 1206 is converted into analog data in the DA conversion part 1208 so as to be outputted. In addition, in the case that the analog video sound signal is designated to be outputted in real time in the switching control part 1209, the inputted analog video sound signal is outputted without change via the real time transmission path 1212.

Next, FIG. 11 is a diagram showing the relationships between the current reproduction condition and the video sound data in the recording control part 1205 which becomes the object of sampling and the contents thereof are the same in the above described Embodiment 3, of which the descriptions are omitted.

Next, FIG. 13 is a diagram showing the relationships between the reproduction condition in the switching control part 1209 and the control conditions of the output digital data switching part 1207 and the output switching part 1211. Here, in FIG. 13 the contents of the reproduction condition 1301 and the output switching part control 1303 are the same as the reproduction condition 201 and the output switching part control 203 of FIG. 2 in the above described Embodiment 1, of which the descriptions are omitted.

The output digital data switching part control 1302 shows the control condition of the output digital data switching part 1207 occurring at the same time as the reproduction condition 1301. The control conditions in the output digital data switching part control 1302 are a control condition of the setting for utilizing the digital data of the semiconductor recording medium part 1206 which is not coded, a control condition of the setting for utilizing digital data after decoding the digitally coded data of the disk recording medium part 1203 and a control condition of switching these two settings.

In such a structure, an information reception, recording and reproduction apparatus can be implemented wherein the semiconductor recording medium is efficiently utilized by providing a means of sampling only the data utilized at the time of specific reproduction when data is recorded in the semiconductor recording medium within the semiconductor recording medium part wherein the means samples and records the digital data before being coded.

Here, there is an advantage that video sound data that is closer to the real time reproduction can be utilized at the time of reproduction condition switching by sampling digital data before being coded. In addition, by changing the sampled data according to the current reproduction condition, an information reception, recording and reproduction apparatus can be implemented wherein the semiconductor recording medium is more efficiently utilized.

Embodiment 5

In the following, the ninth and the tenth embodiments of the present invention are described in reference to FIGS. 11, 14, 15, 16, 17 and 18.

The present Embodiment 5 relates to an information reception, recording and reproduction apparatus wherein the semiconductor recording medium is efficiently utilized by providing a means of sampling only the data utilized at the time of special reproduction when data is recorded in the semiconductor recording medium in the above described Embodiment 1, where the means works as both the means of sampling digitally coded data after being coded and the means of sampling digital data before being coded and by recording the sampled data.

FIG. 14 shows a block diagram of an information reception, recording and reproduction apparatus according to one embodiment of the present invention which provides a means of sampling only the data utilized at the time of specific reproduction when digital data is recorded in the semiconductor decoding medium part 1405 at the time of analog video sound signal input within the semiconductor recording medium part, wherein the means works both the means of sampling digitally coded data after being coded and the means of sampling digital data before being coded. As shown in FIG. 14, an AD conversion part (referred to as ADC in the figure) is denoted as 1401, a coding part is denoted as 1402, a disk recording medium part is denoted as 1403, a recording control part is denoted as 1404, a semiconductor recording medium part is denoted as 1405, a decoded data switching part is denoted as 1406, a decoding part is denoted as 1407, an output digital data switching part is denoted as 1408, a DA conversion apart (referred to as DAC in the figure) is denoted as 1409, a user interface part is denoted as 1410, a switching control part is denoted as 1411, an output switching part is denoted as 1412 and a real time transmission path is denoted as 1413. Here, the sampling means of sampling the data utilized at the time of specific reproduction is provided within the semiconductor recording medium part 1405.

The operation of the information reception, recording and reproduction apparatus according to the present embodiment which has the above structure is next described. In FIG. 14, an inputted analog video sound signal is converted into digital video sound data in the AD conversion part 1401. The digitalized video sound data is coded in the coding part 1402 and the coded data is recorded in the disk recording medium part 1403 and, at the same time, video sound data according to the current reproduction condition is sampled from the above coded data by the recording control part 1404 so as to be recorded in the semiconductor recording medium part 1405.

In addition, the video sound data according to the current reproduction condition is sampled from the video sound data digitalized in the AD conversion part 1401 by the recording control part 1404 so as to be recorded in the semiconductor recording medium part 1405.

Here, in the above described operation, the data recording to the semiconductor recording medium part 1405 is a recording in an endless manner wherein overwriting recording is carried out to the latest data at any arbitrary time according to control by the recording control part 1404.

Next, the decoded data switching part 1406, the output digital data switching part 140B and the output switching part 1412 are controlled by the switching control part 1411 in accordance with the reproduction condition of the current analog video sound signal and an instruction such as a command for changing the reproduction condition from the user of which notification is made by the user interface part 1410.

In the case that the data of the disk recording medium part 1403 is designated to be reproduced by the switching control part 1411, the coded data read out from the disk recording medium part 1403 is decoded in the decoding part 1407 and in addition the decoded digital data is converted into analog data by the DA conversion part 1409 so as to be outputted as an analog video sound signal.

In the case that the data of the semiconductor recording medium part 1405 is designated to be reproduced by the switching control part 1411, the data within the semiconductor recording medium part 1405 is read out in accordance with the current reproduction condition. At this time in the case that the data read out from the semiconductor recording medium part 1405 is digitally coded data which is coded, the data is sent to the decoding part 1407 so as to be decoded and the decoded digital data is converted to analog data by the DA conversion part 1409 so as to be outputted. In addition, in the case that the data read out from the semiconductor recording medium part 1405 is digital data which is not coded, the read out digital data is converted into analog data by the DA conversion part 1409 so as to be outputted.

On the other hand, in the case that an analog video sound signal is designated to be outputted in real time in the switching control part 1411, the inputted analog video sound signal is outputted without change via the real time transmission path 1413.

FIG. 11 is a diagram showing the relationships between the current reproduction condition and the video sound data sampled in the recording control part 1404 and the contents thereof are the same as in the above described Embodiment 3, of which the descriptions are omitted.

Next, FIG. 15 is a diagram showing the relationships between the reproduction condition and the control conditions of the decoded data switching part 1406, the output digital data switching part 1408 and the output switching part 1412.

In FIG. 15, the contents of the reproduction condition 1501, the decoded data switching part control 1502 and the output switching part control 1504 are the same as of the reproduction condition 201, the decoded data switching part control 202 and the output switching part control 203 of FIG. 2 in the above described Embodiment 1, of which the descriptions are omitted. The output digital data switching part control 1503 shows a control condition of the output digital data switching part 1408 occurring at the same time as the reproduction condition 1501.

The control conditions of the output digital data switching part control 1503 are a control condition of the setting for utilizing the digital data of the semiconductor recording medium part 1405 which is not coded, a control condition of the setting for utilizing the digital data after decoding the digitally coded data of the disk recording medium part 1403 or the semiconductor recording medium part 1405 and a control condition of switching these two settings.

Next, FIG. 16 is a flow chart showing processing at the time of shift of the reproduction condition from the recorded data reproduction condition where the real time reproduction is caught up with at the time of the forward direction high speed reproduction in the reproduction condition 1501 in FIG. 15 to the real time reproduction condition.

First, the forward direction high speed reproduction reproduces data within the disk recording medium part 1403 as long as reproducible data remains within the disk recording medium part 1403 (Step 1601, Step 1603). When reproducible data no longer remains within the disk recording medium part 1403, it is checked whether or not reproduction is carried out simultaneously with recording under the current condition (Step 1602). In the case of the condition where reproduction is not carried out simultaneously with recording, the data recorded and stored previously is reproduced and the continuous reproduction cannot be carried out and, therefore, the reproduction is completed.

In the case of the condition where reproduction is carried out simultaneously with recording, it is the condition where the real time reproduction is caught up with by the forward direction high speed reproduction. First, the switching control part 1411 controls the switching of the setting of the decoded data switching part 1406 from the setting of the utilization of the data of the disk recording medium part 1403 as the object of decoding to the setting of the utilization of the data of the semiconductor recording medium part 1405 as the object of decoding (Step 1604) and the digitally coded data within the semiconductor recording medium part 1405 is reproduced as long as reproducible digitally coded data remains within the semiconductor recording medium part 1405 (Step 1605, Step 1607).

When reproducible digitally coded data no longer remains within the semiconductor recording medium part 1405, the switching control part 1411 next controls so as to switch the setting of the output digital data switching part 1408 to the setting for the utilization of the digital data of the semiconductor recording medium part 1405, which is not coded, (Step 1606) and the digital data, which is not coded, within the semiconductor recording medium part 1405 is reproduced as long as reproducible digital data which is not coded remains within the semiconductor recording medium part 1405 (Step 1608, Step 1610).

When reproducible digital data, which is not coded, no longer remains within the semiconductor recording medium part 1405, the switching control part 1411 controls the setting of the output switching part 1412 so as to be switched from the setting of the means of reproducing and of outputting the video sound data read out from the recording medium to the setting of the means of outputting the inputted video sound signal in real time without recording in the recording medium so as to switch to the real time reproduction (Step 1609).

Next, FIG. 17 is a flow chart showing processing at the time of the shift of the reproduction condition from the real time reproduction condition according to a command for commencing the backward direction high speed reproduction to the recorded data reproduction condition in the reproduction condition 1501 of FIG. 15.

In the case that the commencement of the backward direction high sped reproduction is indicated, it is checked whether or not the current reproduction condition is a real time reproduction condition (Step 1701). In the case that the current reproduction condition is not the real time reproduction condition, the setting of the decoded data switching part 1406 is already switched to the setting of the utilization of the data of the disk recording medium part 1403 as the object of decoding, the setting of the output digital data switching part 1408 is already switched to the setting of the utilization of the digital data gained by decoding the digitally coded data of the semiconductor recording medium part 1405 or of the disk recording medium part 1403, and the setting of the output switching part 1412 is already switched to the setting of the means of reproducing and of outputting the video sound data read out from the recording medium, respectively, and therefore, the data within the disk recording medium part 1403 is reproduced under the current setting without carrying out the switching control by the switching control part 1411 (Step 1711, Step 1712).

In the case that the current reproduction condition is the real time reproduction condition, first the switching control part 1411 controls the setting of the output switching part 1412 so as to be switched from the setting of the means of outputting the inputted video sound signal in real time without recording in the recording medium part to the setting of the means of reproducing and of outputting the video sound data read out from the recording medium part (Step 1703) and the setting of the output digital data switching part 1408 is controlled and switched to the setting of the utilization of the digital data, which is not coded, of the semiconductor recording medium part 1405 so as to be switched to the recorded data reproduction condition (same Step 1703) and, then, the digital data which is not coded within the semiconductor recording medium part 1405 is reproduced as long as reproducible digital data which is not coded remains within the semiconductor recording medium part 1405 (Step 1704, Step 1706).

Next, when reproducible digital data which is not coded no longer remains within the semiconductor recording medium part 1405, the switching control part 1411 controls the setting of the output digital data switching part 1408 so as to be switched to the setting of the utilization of the digital data gained by decoding the digitally coded data of the semiconductor recording medium part 1405 or of the disk recording medium part 1403 (Step 1705) and the setting of the decoded data switching part 1406 is controlled and switched to the setting of the utilization of the data of the semiconductor recording medium part 1405 (Step 1707) as the object of decoding and, then, the data within the semiconductor recording medium part 1405 is reproduced as long as reproducible digitally coded data remains within the semiconductor recording medium part 1405 (Step 1708, Step 1710).

When reproducible digitally coded data no longer remains within the semiconductor recording medium part 1405, the switching control part 1411 next controls the setting of the decoded data switching part 1406 so as to be switched from the setting of the utilization of the data of the semiconductor recording medium part 1405 as the object of recording to the setting of the utilization of the data of the disk recording medium part 1403 as the object of decoding (Step 1709) and, then, the reproduction of the data within the disk recording medium part 1403 is commenced (Step 1711, Step 1712).

Figures 1, 18:
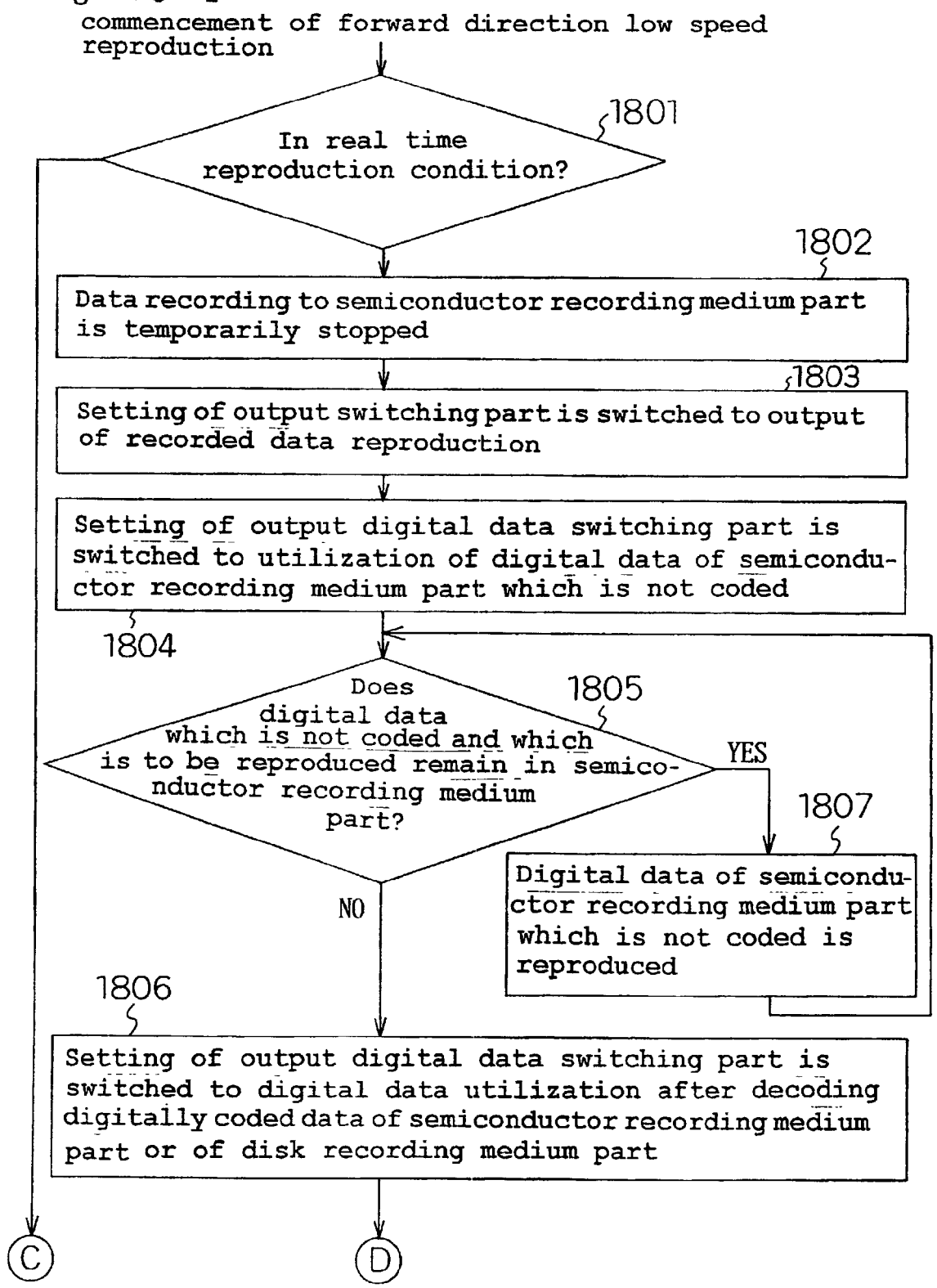
FIG. 18 is flow chart showing a process wherein the command for the commencement of forward direction low speed reproduction is given according to Embodiment 5 of the present invention.
Figures 2, 18:
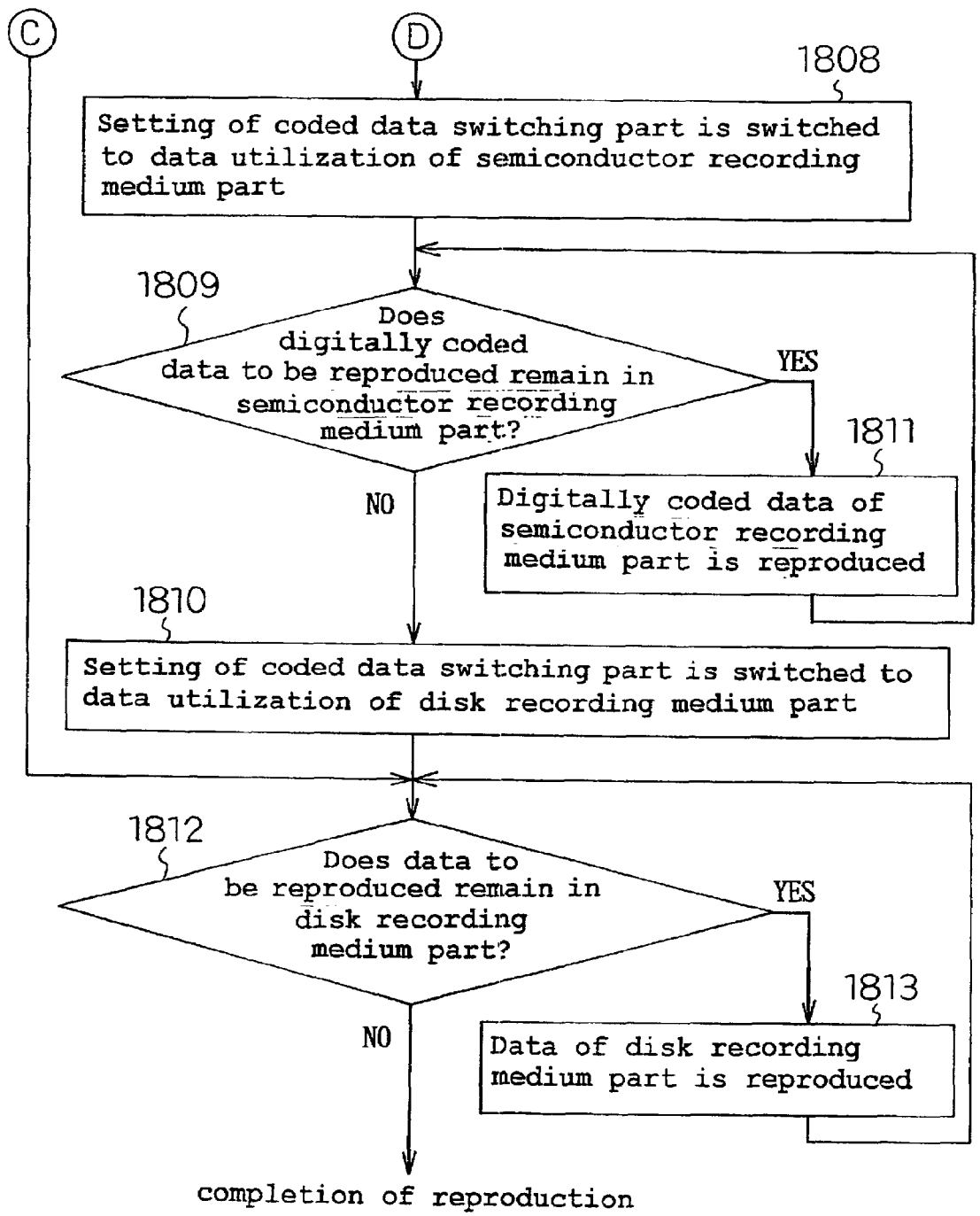

Next, FIG. 18 is a flow chart showing processing at the time of the shift of the reproduction condition from the real time reproduction condition according to a command for commencing the forward direction low speed reproduction to the recorded data reproduction condition in the reproduction condition 1501 of FIG. 15.

In the case that the commencement of the forward direction low speed reproduction is indicated, it is checked whether or not the current reproduction condition is the real time reproduction condition (Step 1801). In the case that the current reproduction condition is not the real time reproduction condition, the setting of the decoded data switching part 1406 is already switched to the setting of the utilization of the data of the disk recording medium part 1403 as the object of decoding, the setting of the output digital data switching part 1408 is already switched to the setting of the utilization by switching the digitally coded data of the semiconductor recording medium part 1405 or of the disk recording medium part 1403 to the digital data after being decoded and the setting of the output switching part 1412 is switched to the setting of the means of reproducing and of outputting the video sound data read out from the recording medium and, therefore, the data within the disk recording medium part 1403 is reproduced under the current setting without carrying out the switching control by the switching control part 1411 (Step 1812, Step 1813).

In the case that the current reproduction condition is the real time reproduction condition, first the recording control part 1404 temporally stops the data writing to the semiconductor recording medium part 1405 (Step 1802). This is to prevent the data which should be reproduced from being over written and recorded to the latest data before being reproduced due to a low speed reproduction since the semiconductor recording medium part 1405 is normally overwritten to record the latest data at any arbitrary time.

The switching control part 1411 controls the setting of the output switching part 1412 so as to be switched from the setting of the means of outputting the inputted video sound signal in real time without recording in the recording medium to the setting of the means of reproducing and of outputting the video sound data read out from the recording medium (Step 1803) and the setting of the output digital data switching part 1408 is controlled and is switched to the setting of the utilization of the digital data, which is not coded, of the semiconductor recording medium part 1405 so as to be switched to the recording data reproduction condition (Step 1804) and the digital data which is not coded within the semiconductor recording medium part 1405 is reproduced as long as reproducible digital data which is not coded remains within the semiconductor recording medium part 1405 (Step 1805, Step 1807).

Next, when reproducible digital data which is not coded no longer remains within the semiconductor recording medium part 1405, the switching control part 1411 controls so as to switch the setting of the output digital data switching part 1408 to the setting of the utilization of the digital data gained by decoding digitally coded data of the semiconductor recording medium part 1405 or of the disk recording medium part 1403 (Step 1806) and the setting of the decoded data switching part 1406 is controlled and is switched to the setting of the utilization of the data of the semiconductor recording medium part 1405 as the object of decoding (Step 1808) and then the data within the semiconductor recording medium part 1405 is reproduced as long as reproducible digitally coded data remains within the semiconductor recording medium part 1405 (Step 1809, Step 1811).

When reproducible digitally coded data no longer remains within the semiconductor recording medium part 1405, the switching control part 1411 next controls the setting of the decoded data switching part 1406 so as to be switched from the setting of the utilization of the data of the semiconductor recording medium part 1405 as the object of decoding to the setting of the utilization of the data of the disk recording medium part 1403 as the object of decoding (Step 1810) and the reproduction of the data within the disk recording medium part 1403 is commenced (Step 1812, Step 1813).

As described above, according to the present embodiment, an information reception, recording and reproduction apparatus can be implemented wherein a means of sampling only the data utilized at the time of specific reproduction when data is recorded in the semiconductor recording medium is provided within the semiconductor recording medium part where the means is both the means of sampling digitally coded data after being coded and the means of sampling the digital data before being coded so that the semiconductor recording medium can be efficiently utilized by recording the sampled data.

Here, the information reception, recording and reproduction apparatus can be implemented wherein smoother switching of the reproduction conditions is possible by having two advantages such that, by sampling the digital data before being coded, the video sound data, which is closer to the real time reproduction, can be utilized at the time of the switching of the reproduction conditions and, by sampling the digital data after being coded, the video sound data for a long period of time can be utilized at the time of the switching of the reproduction conditions and by utilizing data so as to make the best use of both of these characteristics depending on the reproduction condition.

In addition, an information reception recording, reproduction apparatus can be implemented wherein the semiconductor recording medium is more efficiently utilized by varying the sampled data according to the current reproduction condition.

As described above, according to Embodiment 1 of the present invention, in an information reception, recording and reproduction apparatus wherein at least one of digital video or digital sound is recorded in or reproduced from a disk recording medium which allows random access, an advantageous effect is gained that reproduction conditions can be smoothly switched by preparing a means of reproducing the inputted analog video sound signal or digital video sound signal after recording the signal in the disk recording medium which allows random access, a means of reproducing the signal from the semiconductor recording medium which allows high speed access and a means of reproducing the signal without recording in the recording medium and by reproducing the signal by switching these reproduction means according to the reproduction condition.

In addition, according to Embodiment 2 of the present invention, in an information reception, recording and reproduction apparatus wherein at least one of digital video or digital sound is recorded in and reproduced from the above described disk recording medium which allows random access, an advantageous effect is gained that the semiconductor recording medium can be efficiently utilized by providing a means of sampling only the digital data utilized at the time of specific reproduction according to the current reproduction condition as the means of recording digital data in the above described semiconductor recording medium and by recording only the digital data utilized at the time of special reproduction in the above described semiconductor recording medium.

In addition, according to Embodiment 3 of the present invention, in an information reception, recording and reproduction apparatus wherein at least one of digital video or digital sound is recorded in and reproduced from the above described disk recording medium which allows random access, the means of sampling only the data utilized at the time of specific reproduction is the means of sampling digitally coded data after being coded and, therefore, an advantageous effect is gained that the semiconductor recording medium can be more efficiently utilized.

In addition, according to Embodiment 4 of the present invention, in an information reception, recording and reproduction apparatus wherein at least one of digital video or digital sound is recorded in and reproduced from the above described disk recording medium which allows random access, the means of sampling only the data utilized at the time of specific reproduction is a means of sampling the digital data before being coded and therefore, an advantageous effect is gained that the video sound data closer to the real time reproduction can be utilized at the time of the switching of the reproduction conditions.

In addition, according to Embodiment 5 of the present invention, in an information reception, recording and reproduction apparatus wherein at least one of digital video or digital sound is recorded in and reproduced from the above described disk recording medium which allows random access, an advantageous effect is gained that the reproduction conditions can be switched more smoothly by having a function of changing the order of data utilized for reproducing the digital data, which is not coded, recorded within the semiconductor recording medium part and digitally coded data after being coded depending on the current reproduction condition and by utilizing the data so as to make the best use of the characteristics of both the digital data which is not coded and the digitally coded data after being coded depending on the reproduction condition.

Here, in each of the above described embodiments, the disk medium recording parts 103, 601, 1203 and 1403 correspond to the first recording means of the present invention, the recording control part 104, 602, 1205 and 1404 as well as the semiconductor recording medium parts 105, 603, 1206 and 1405 correspond to the second recording means of the present invention, the decoded data switching parts 106, 604, 1406, the switching control parts 107, 605, 1209, 1411, the user interface parts 110, 608, 1210, 1410, the output digital data switching part 1207, 1408 and the output conversion parts 111, 1211 and 1412 correspond to the switching means of the present invention, the ADCs 101, 1201, 1401 and the coding parts 102, 1202 and 1402 correspond to the first coding means of the present invention, the decoding parts 108, 1204, 1407 and the DACs 109, 1208 and 1409 correspond to the first decoding means of the present invention and the real time transmission paths 112, 609, 1212 and 1413 correspond to the real time transmission means of the present invention while the decoding part 606 and the DAC 607 in Embodiment 2 correspond to the second decoding means of the present invention.

Embodiment 6

Figure 19:
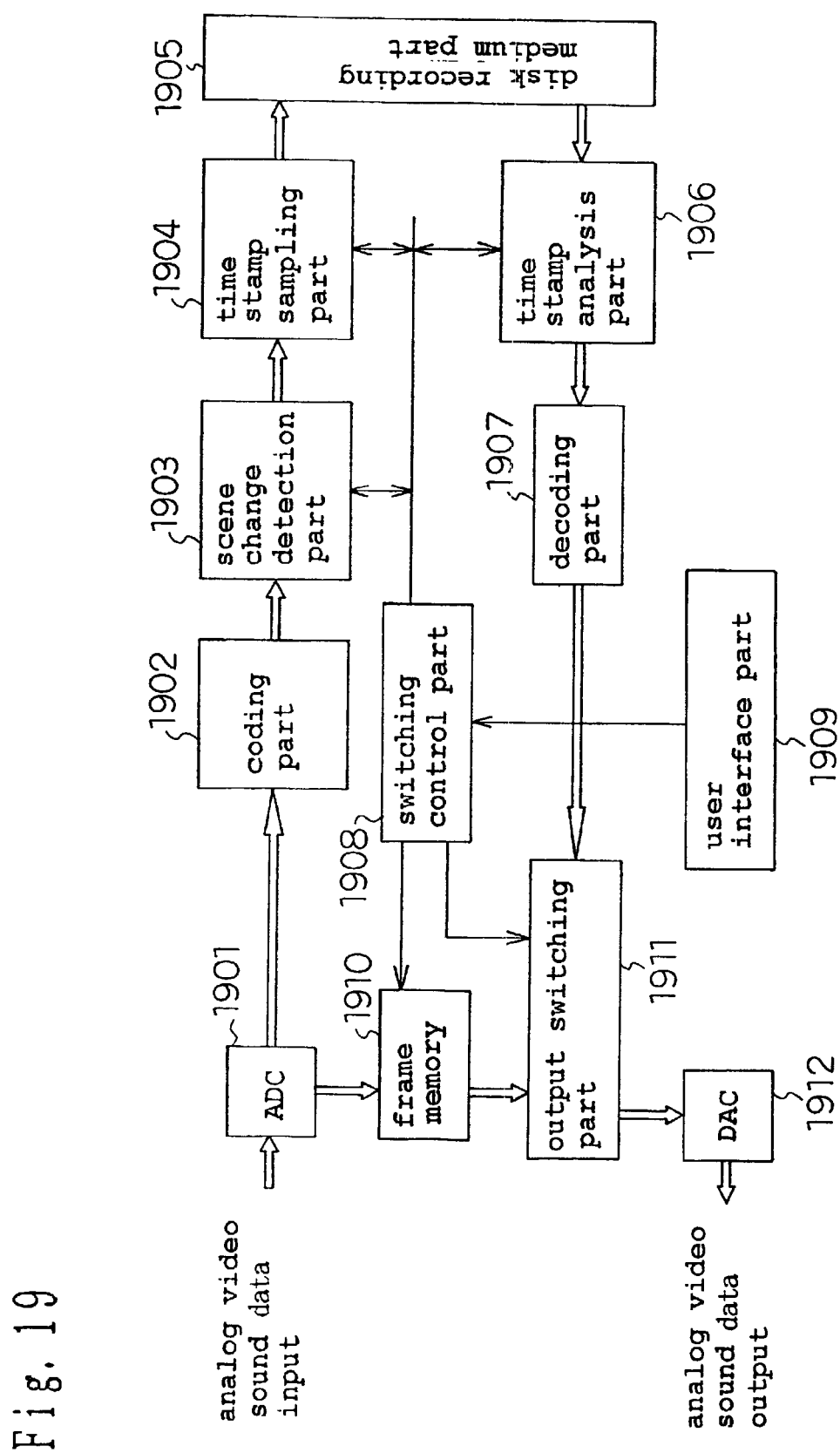
FIG. 19 is a block diagram of an information reception, recording and reproduction apparatus at the time of an analog video sound data input according to Embodiment 6 of the present invention.

First, the structure and the operation of an information reception, recording and reproduction apparatus according to the present Embodiment 6 are described primarily in reference to FIG. 19. Here, at the same time as describing the structure and preparation of the information reception, recording and reproduction apparatus of the present embodiment, one embodiment of an information reception, recording and reproduction method of the present invention is also described.

First, in reference to FIG. 19, the structure of the information reception recording and reproduction apparatus to which analog video sound data is inputted according to the present embodiment is described. Here, FIG. 19 shows a block diagram of the information reception, recording and reproduction apparatus of the present embodiment.

As described in the below, the information reception, recording and reproduction apparatus according to the present Embodiment 6 is different from a conventional information reception, recording and reproduction apparatus and is an information reception, recording and reproduction apparatus wherein the video data for carrying out a scene change is detected by a scene change detection part 1903 from among the inputted video sound data and the output of the outputted video sound data can be switched by the output switching part 1911 which receives the control of the switching control part 1908.

The information reception, recording and reproduction apparatus of the present embodiment is formed of an AD conversion part (referred to as ADC in the figure) 1901 for digitally converting an inputted analog video sound data, a frame memory 1910 for temporally storing digitalized video sound data, a coding part 1902 for coding digital video sound data, a scene change detection part 1903 for reading out information related to images before and after the scene included in the coded digital video data and for detecting in the coded digital video data the position where the scene switches, a time stamp sampling part 1904 for extracting a time stamp from coded digital video sound data, a disk recording medium part 1905 which allows random access, a time stamp analysis part 1906 for extracting a time stamp from coded digital video sound data and for analyzing the time stamp, a decoding part 1907 for decoding coded digital video sound data, an output switching part 1911 for switching digital video sound data outputted without being recorded in the disk recording medium part 1905 and digital video sound data recorded in the disk recording medium part 1905, a switching control part 1903 for controlling this output switching part 1911, a user interface part 1909 for making a notification of a command from the user to the switching controlling part 1908 and a DA conversion part (hereinafter referred to as DAC) 1912 for converting digital video sound data to analog video sound data.

The switching control part 1908 is a means which recognizes that a scene change has occurred in the inputted video data from the output of the scene change detection part 1903 and which gains a time stamp relative to the coded digital video sound data, where scene change is carried out, from the time stamp sampling part 1904. In addition, the switching control part 1908 is a means of gaining a time stamp relative to the coded digital video sound data, which is reproduced after being recorded in the disk recording medium part 1905, from the time stamp analysis part 1906. The switching control part 1908 is a means of receiving the outputs from the scene change detection part 1903, the time stamp sampling part 1904 and the time stamp analysis part 1906 and of controlling the output switching part 1911 which switches the digital video sound data outputted without being recorded in the disk recording medium part 1905 and the digital video sound data which is reproduced after being recorded in the disk recording medium part 1905.

Here, the means which includes the user interface 1909 corresponds to the selection means of the present invention, the means which includes the disk recording medium part 1905 corresponds to the recording and reproduction means of the present invention, the means which includes the output switching part 1911 corresponds to the output switching means of the present invention, the means which includes the scene change detection part 1903 corresponds to the detection means of the present invention, the means which includes the switching control part 1908 corresponds to the switching control means of the present invention, the means which includes the time stamp sampling part 1904 corresponds to the time information sampling means of the present invention and the means which includes the time stamp analysis part 1906 corresponds to the switching position specification means of the present invention.

Figure 21:
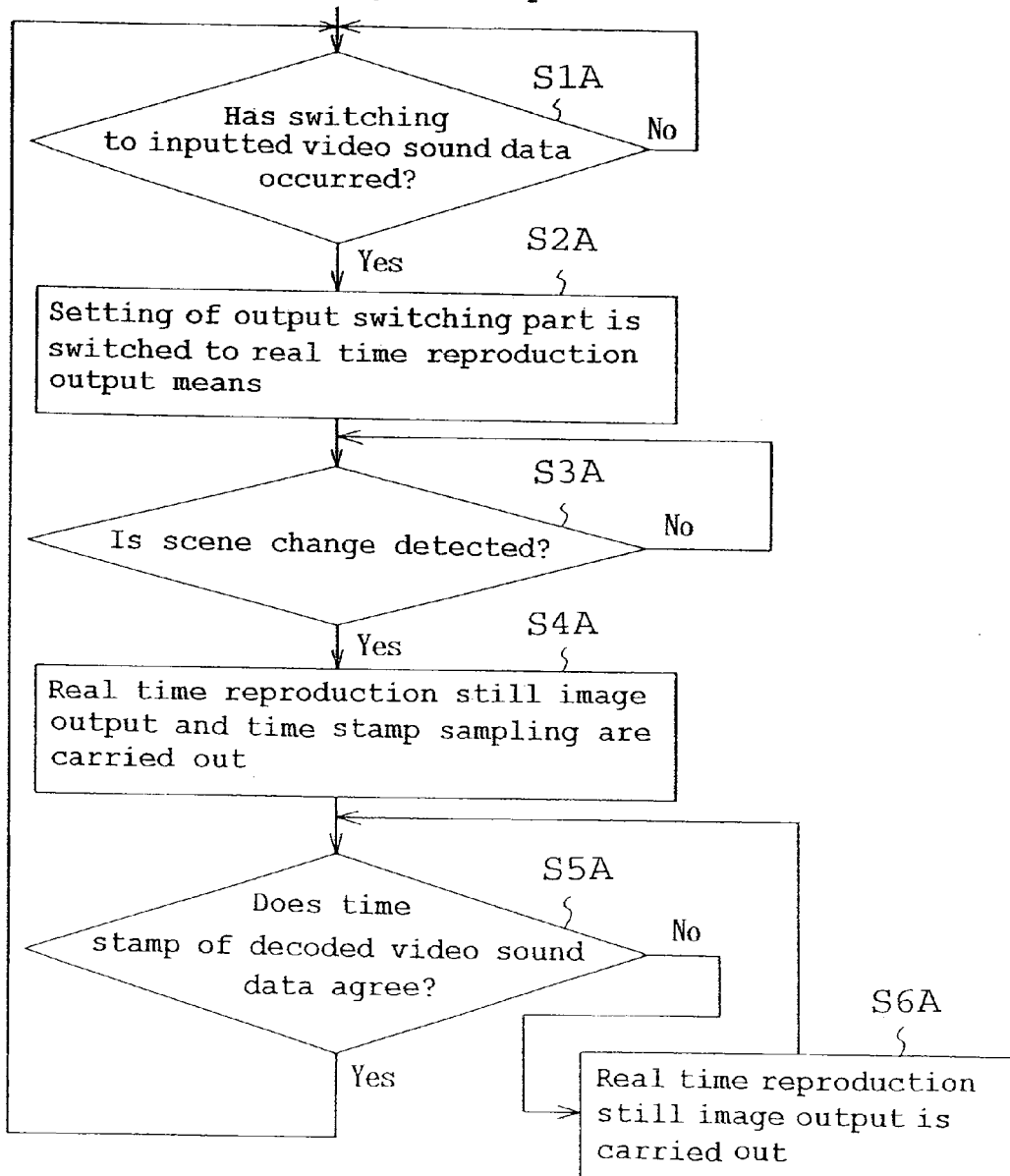
FIG. 21 is a flow chart showing an output video signal switching process according to Embodiment 6 of the present invention.

Next, in reference to FIGS. 19 and 21, the operation of the information reception, recording and reproduction apparatus according to the present embodiment is described in the case that the switching of the inputted video sound data has occurred. Here, FIG. 21 is a flow chart showing a switching process of the outputted video sound data according to the output from the scene change detection part 1903 (see FIG. 19).

In the information reception, recording and reproduction apparatus of FIG. 19, in the case of normal viewing and listening, the inputted analog video sound data is coded by the coding part 1902 after being digitalized by the AD conversion part 1901. The coded digital video sound data passes through the scene change detection part 1903 and the time stamp sampling part 1904 and is recorded in the disk recording medium part 1905. The coded digital video sound data recorded in the disk recording medium part 1905 passes through the time stamp analysis part 1906 and is decoded to the digital video sound data by the decoding part 1907 and, after that, passes through the output switching part 1911 and the DA conversion part 1912 so as to be outputted as analog video sound. The user usually reproduces the video sound data recorded in the disk recording medium part 1905 in the above manner (accordingly it is possible to smoothly carry out switching from normal reproduction to specific reproduction or switching from specific reproduction to normal reproduction).

Here, at the time when the inputted video sound data is switched by the user (for example, when the inputted video sound data is a TV broadcast program and the user carries out channel switching of the TV broadcast program which the user was watching to another channel), the user interface part 1909 makes notification of the switching of the inputted video sound data to the switching control part 1908 (SA).

The switching control part 1908 receives the output from the user interface part 1909 and controls the output switching part 1911 so that the video sound data recorded in the disk recording medium part 1905 is outputted without being recorded in the disk recording medium part 1905 and the output switching part 1911 switches the output from the video sound data recorded in the disk recording medium part 1905 to the inputted video sound data temporarily stored in the frame memory 1910 after being digitalized in the AD conversion part 1901 so as to output the inputted digital video sound data to the DA conversion part 1912 (SA).

In addition, the inputted video sound data is outputted to the outside of the apparatus after passing through the frame memory 1910, the output switching part 1911 and the DA conversion part 1912 and, at the same time, is continuously coded by the coding part 1902, passes through the scene change detection part 1903 as well as the time stamp sampling part 1904 and is recorded in the disk recording medium part 1905 and, after that, passes through the time stamp analysis part 1906 and the decoding part 1907 and, then, is outputted to the output switching part 1911 (therefore, specific reproduction such as a fast forward reproduction or fast reverse reproduction can be coped with).

Then, when the scene change detection part 1903 detects a scene change in the coded digital video data (S3A), the switching control part 1908 controls the frame memory 1910 so as to implement a conversion to the still video condition immediately after the scene change and converts the video data outputted after passing through the output switching part 1911 and the DA conversion part 1912 into the still image condition immediately after the scene change and, at the same time, the time stamp of the coded digital video data from which the scene change has occurred is recognized by the time stamp sampling part 1904 (S4A). Here, the frame memory 1910 rejects the overwriting of the data from the AD conversion part 1901 at the point in time when it is controlled so as to be converted to the still video condition immediately after the scene change.

The time stamp analysis part 1906 monitors the time stamp of the coded digital video data outputted from the disk recording part 1905 and determines whether or not the coded digital video data detected by the scene change detection part 1903 is outputted from the disk recording medium part 1905 after being recorded in the disk recording medium part 1905 based on the time stamp gained from the time stamp sampling part 1904.

When the time stamp analysis part 1906 senses that the coded digital video data detected by the scene change detection part 1903 has been outputted from the disk recording medium part 1905 (S5A), the switching control part 1908 switches the digital video sound data outputted from the output switching part 1911 from the output digital video sound data of the frame memory 1910 to the output digital video sound data of the decoding part 1907. Here, until the time stamp gained from the time stamp analysis part 1906 agrees with the time stamp recognized by the time stamp sampling part 1904, the real time reproduction still image output immediately after the scene change detection from the frame memory 1910 is maintained (S6A)

As described above, the inputted video sound data and the video sound data which is reproduced after being recorded in the recording medium are switched and outputted in accordance with the scene change detection of the inputted video data at the time when the inputted video sound data is switched and, thereby, an information reception, recording and reproduction method can be implemented wherein a smooth switching of the outputted video sound data is possible, by freezing the image immediately after the scene change, between the inputted video sound data and the video sound data which is reproduced after being recorded in the recording medium, so as not to give the user an unnatural feeling due to the above time lag.

Embodiment 7

Figure 20:
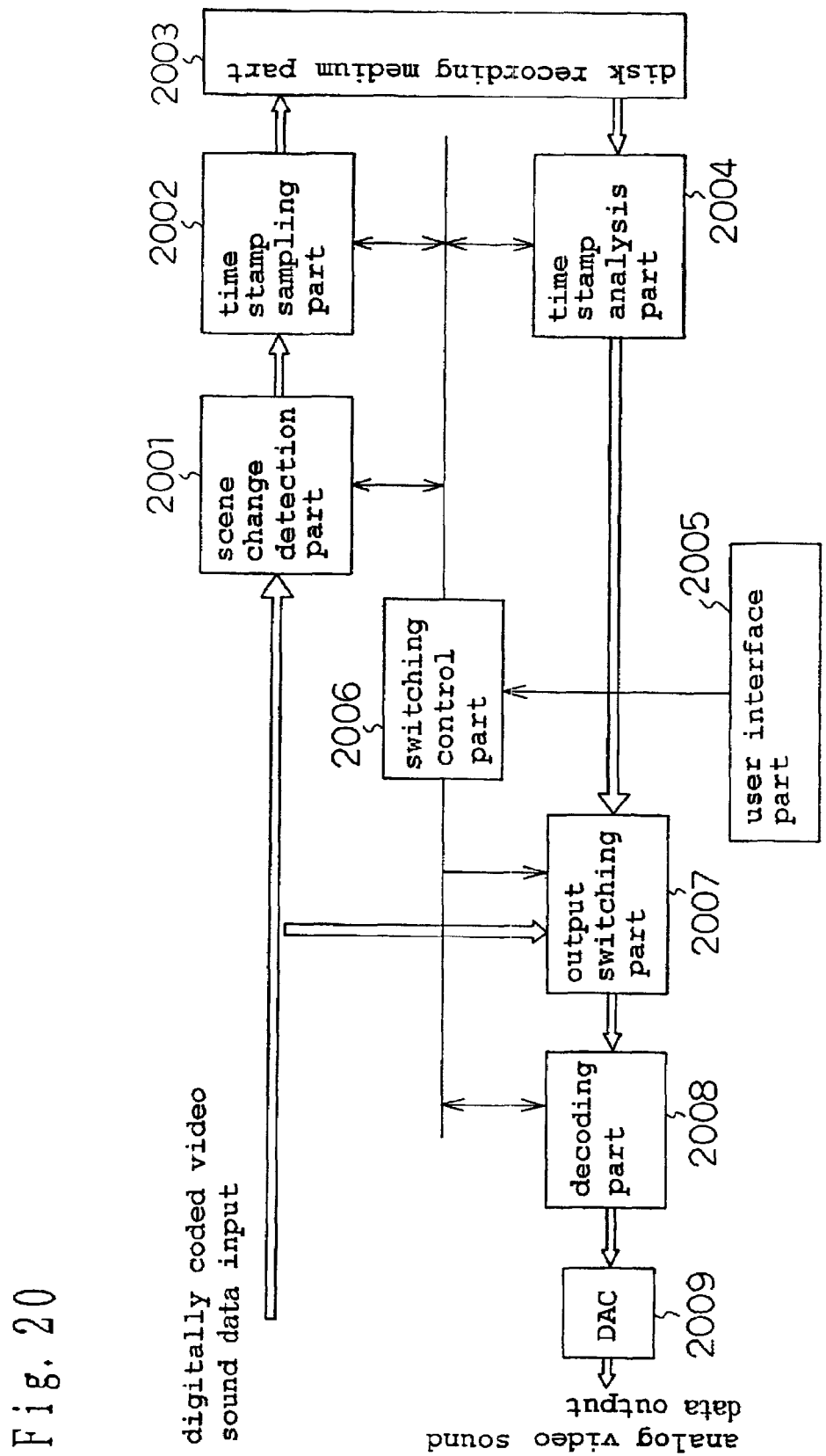
FIG. 20 is a block diagram of an information reception, recording and reproduction apparatus at the time of an digital video sound data input according to Embodiment 7 of the present invention.

Next, the structure and the operation of an information reception, recording and reproduction apparatus according to the present Embodiment 7 is described primarily in reference to FIG. 20. Here, the structure and the operation of the information reception, recording and reproduction apparatus of the present embodiment is described and, at the same time, one embodiment of an information reception, recording and reproduction method of the present invention is described.

First, in reference to FIG. 20, the structure of the information reception, recording and reproduction apparatus of the present embodiment is described. Here, FIG. 20 shows a block diagram of the information reception, recording and reproduction apparatus.

As described in the following, coded digital video sound data, instead of analog video sound data, is inputted into the information reception, recording and reproduction apparatus according to the present embodiment, which is an information reception, recording and reproduction apparatus wherein video data where a scene change is carried out is detected by a scene change detection part 2001 from the inputted video sound data and the outputs of the outputted video sound data are switched by an output switching part 2007 which receives the control of a switching control part 2006 in the same manner as in the information reception, recording and reproduction apparatus according to the present Embodiment 1.

The information reception, recording and reproduction apparatus according to the present embodiment is formed, as shown in FIG. 20, of a scene change detection part 2001 which reads out information related to the video before and after the image included in the inputted coded digital video data and which detects the position, from the coded digital video data, where a scene is switched, a time stamp sampling part 2002 which extracts out a time stamp from the coded digital video sound data, a disk recording medium part 2003 which allows random access, a time stamp analysis part 2004 for extracting and analyzing a time stamp from the coded digital video sound data, a decoding part 2008 for decoding the coded digital video sound data, an output switching part 2007 for switching the video sound data which is outputted without being recorded in the disk recording medium part 2003 and the video sound data which is recorded in the disk recording medium part 2003, a switching control part 2006 for controlling this output switching part 2007, a user interface part 2005 for making a notification of a command from the user to the switching control part 2006 and a DA conversion part (referred to as DAC in the figure) 2009 for converting the digital video sound data into analog video sound data.

The switching control part 2006 is a means which recognizes that a scene change has occurred in respect to the inputted video data from the output of the scene change detection part 2001 and which gains a time stamp, from the time stamp sampling part 2002, in respect to the coded digital video sound data where the scene change is carried out. In addition, the switching control part 2006 is a means which gains a time stamp, from the time stamp analysis part 2004, in respect to the coded digital video sound data which is reproduced after being recorded in the disk recording medium part 2003. The switching control part 2006 is a means which receives the outputs from the scene change detection part 2001, the time stamp sampling part 2002 and the time stamp analysis part 2004 and which controls the output switching part 2007 for switching the video sound data which is outputted without being recorded in the disk recording medium part 2003 and the video sound data which is reproduced after being recorded in the disk recording medium part 2003.

Here, the means which includes the user interface part 2005 corresponds to the selection means of the present invention, the means which includes the disk recording medium part 2003 corresponds to the recording and reproduction means of the present invention, the means which includes the output switching part 2007 corresponds to the output switching means of the present invention, the means which includes the scene change detection part 2001 corresponds to the detection leans of the present invention, the means which includes the switching control part 2006 corresponds to the switching control means of the present invention, the means which includes the time stamp sampling part 2002 corresponds to the time information sampling means of the present invention and the means which includes the time stamp analysis part 2004 corresponds to the switching position specification means of the present invention.

Next, the operation, in the case that the switching of the inputted video sound data occurs, of the information reception, recording and reproduction apparatus according to the present embodiment is described.

In the information reception, recording and reproduction apparatus of FIG. 20, the inputted coded digital video sound data passes through the scene change detection part 2001 and the time stamp sampling part 2002 and is recorded in the disk recording medium part 2003 in the case that conventional viewing and listening are carried out. The coded digital video sound data recorded in the disk recording medium part 2003 passes through the time stamp analysis part 2004 as well as the output switching part 2007 and, then, is decoded to digital video sound data by the decoding part 2008 and, after that, passes through the DA conversion part 2009 so as to outputted as analog video sound. The user conventionally reproduces video sound data recorded in the disk recording medium part 2003 in such a manner.

Here, when the user switches the inputted video sound data, notification of the switching of the inputted video sound data to the switching control part 2006 is made by the user interface part 2005.

The switching control part 2006 receives the output of the user interface part 2005 and controls the output switching part 2007 so that the video sound data is outputted from the video sound data recorded in the disk recording medium part 2003 without being recorded in the disk recording medium part 2003.

The output switching part 2007 switches the output from the coded digital video sound data recorded in the disk recording medium part 2003 to the inputted coded digital video sound data so as to output the video sound data to the decoding part 2008.

In addition, the inputted coded digital video sound data passes through the output switching part 2007, the decoded part 2008 and the DA conversion part (DAC) 2009 so as to be outputted to the outside of the apparatus and, at the same time, continuously passes through the scene change detection part 2001 and the time stamp sampling part 2002 so as to be recorded in the disk recording medium part 2003 and, after that, passes through the time stamp analysis part 2004 so as to be outputted to the output switching part 2007.

Then, when the scene change detection part 2001 detects a scene change in the inputted video data, the switching control part 2006 controls the decoding part 2008 so as to implement a conversion to the still video condition immediately after the scene change and converts the video data outputted after passing through the DA conversion part 2009 into the still image condition immediately after the scene change.

The switching control part 2006 recognizes the time stamp of the inputted coded digital video sound data wherein a scene change has occurred from time stamp sampling part 2002. The time stamp analysis part 2004 monitors the time stamp of the coded digital video sound data outputted from the disk recording part 2003 and determines whether or not the video data detected by the scene change detection part 2001 is outputted from the disk recording medium part 2003 after being recorded in the disk recording medium part 2003 based on the time stamp gained from the time stamp sampling part 2002.

When the time stamp analysis part 2004 senses that the coded digital video sound data detected by the scene change detection part 2001 has been outputted from the disk recording medium part 2003, the switching control part 2006 switches the coded digital video sound data outputted from the output switching part 2007 from the inputted coded digital video sound data to the coded digital video sound data outputted from the time stamp analysis part 2004.

In addition, the switching control part 2006 directs the decoding part 2008 which is outputting the still image immediately after the scene change, to decode and output the coded digital video sound data outputted from the time stamp analysis part 2004.

As described above, in the case that the inputted video sound data is not analog video sound data as described in the present Embodiment 1 but, rather, is coded digital video sound data, an information reception, recording and reproduction method can be implemented wherein a smooth switching of the outputted video sound data is possible so as to reduce any unnatural feeling by the user due to a time lag between the inputted video sound data and the video sound data which is reproduced after being recorded in the recorded medium by switching the inputted video sound data and the video sound data which is reproduced after being recorded in the recording medium so as to be outputted in accordance with the detection of a scene change of the inputted video data at the time when the inputted video sound data is switched.

Embodiment 8

Figure 22:
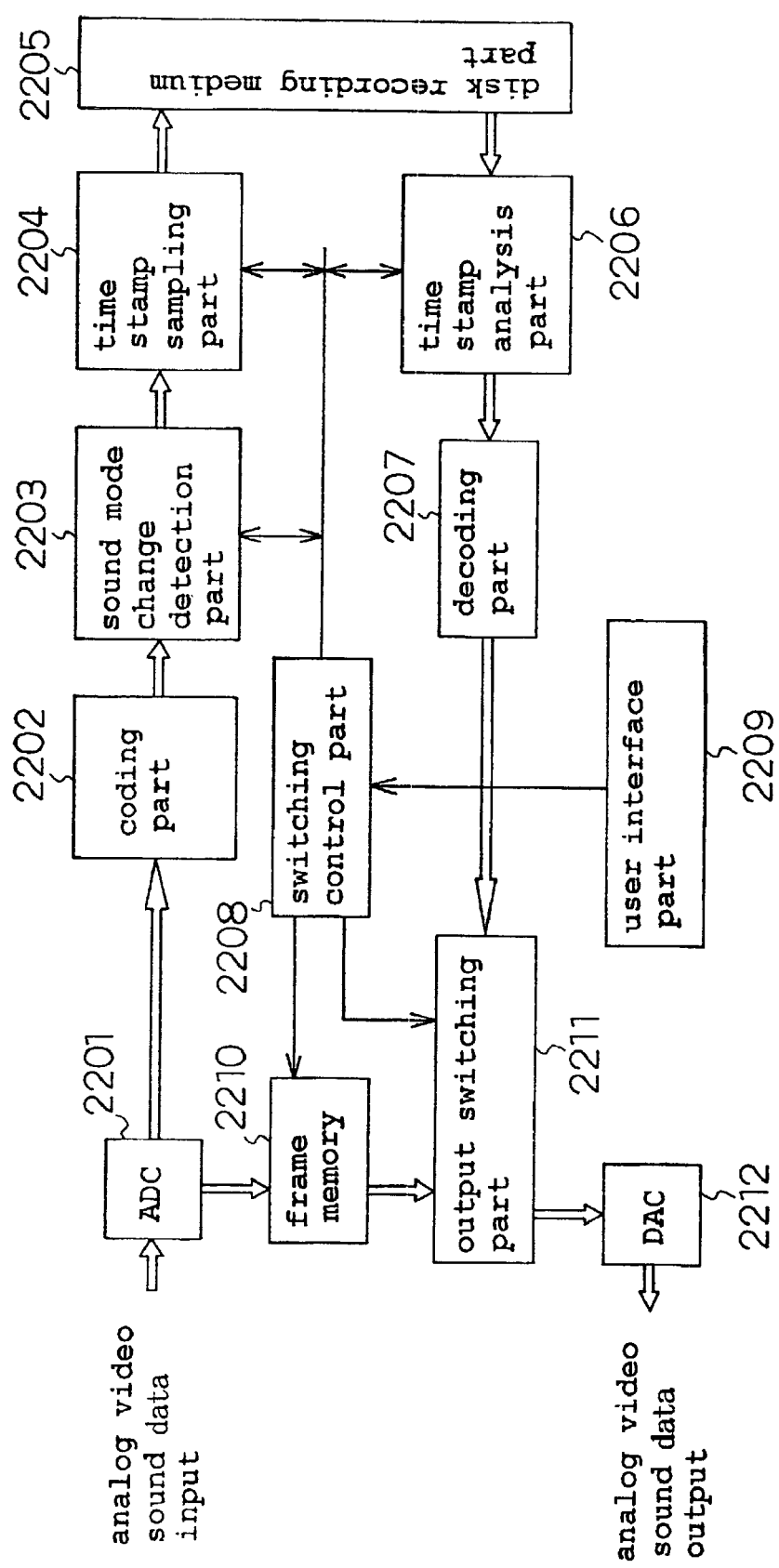
FIG. 22 is a block diagram of an information reception, recording and reproduction apparatus at the time of an analog video sound data input according to Embodiment 8 of the present invention.

Next, the structure and the operation of an information reception, recording and reproduction apparatus according to the present Embodiment 8 are described primarily in reference to FIG. 22. Here, the structure and the operation of the information reception, recording and reproduction apparatus of the present embodiment is described and, at the same time, one embodiment of the information reception, recording and reproduction method is described.

First, in reference to FIG. 22, the structure of the information reception, recording and reproduction apparatus into which analog video sound data is inputted according to the present embodiment is described. Here, FIG. 22 shows a block diagram of the information reception, recording and reproduction apparatus of the present embodiment.

As described in the following, the information reception, recording and reproduction apparatus according to the present Embodiment 8 is different from the information reception, recording and reproduction apparatus according to the prior art and is an information reception recording and reproduction apparatus wherein a change of the sound mode is detected by a sound mode change detection part 2203 from the inputted sound data and the output of the outputted video sound data can be switched by an output switching part 2211 which receives the control of a switching control part 2208.

The information reception, recording and reproduction apparatus of the present embodiment is formed of an AD conversion part (referred to as ADC in the figure) 2201 which digitally converts inputted analog video sound data, a frame memory 2210 for temporarily storing digitalized video sound data, a coding part 2202 for coding digital video sound data, a sound mode change detection part 2203 for reading out information of sound mode which is included in the coded digital video sound data and for detecting the position of a change in the sound mode from the coded digital video soured data, a time stamp sampling part 2204 for extracting a time stamp from the coded digital video sound data, a disk recording medium part 2205 which allows random access, a time stamp analysis part 2206 for extracting a time stamp from the coded digital video sound data so as to analyze the time stamp, a decoding part 2207 for decoding the coded digital video sound data, an output switching part 2211 for switching the digital video sound data outputted without being recorded in the disk recording medium part 2205 and digital video sound data recorded in the disk recording medium part 2205, a switching control part 2208 for controlling this output switching part 2211, a user interface part 2209 for making notification of a command from the user to the switching control part 2208 and a DA conversion part (referred to as DAC in the figure) 2212 which converts the digital video sound data into analog video sound data.

The switching control part 2208 is a means of recognizing the occurrence of a sound mode change in the inputted video sound data from the output of the sound mode change detection part 2203 and of gaining a time stamp in respect to the coded digital video sound data in which the sound mode change has occurred, from the time stamp sampling part 2204. In addition, the switching control part 2208 is a means of gaining a time stamp in respect to the coded digital video sound data which is reproduced after being recorded in the disk recording medium part 2205 from the time stamp analysis part 2206 The switching control part 2208 is a means of receiving the outputs of the sound mode change detection part 2203, of the time stamp sampling part 2204 and of the time stamp analysis part 2206 and of controlling the output switching part 2211 for switching the digital video sound data outputted without being recorded in the disk recording medium part 2205 and the digital video sound data which is reproduced after being recorded in the disk recording medium part 2205.

Here, the means which includes the user interface part 2209 corresponds to the selection means of the present invention, the means which includes the disk recording medium part 2205 corresponds to the recording and reproduction means of the present invention, the means which includes the output switching part 2211 corresponds to the output switching means of the present invention, the means which includes the sound mode change detection part 2203 corresponds to the detection means of the present invention, the means which includes the switching control part 2208 corresponds to the switching control means of the present invention, the means which includes the time stamp sampling part 2204 corresponds to the time information sampling means of the present invention and the means which includes the time stamp analysis part 2206 corresponds to the switching position specification means of the present invention.

Figure 24:
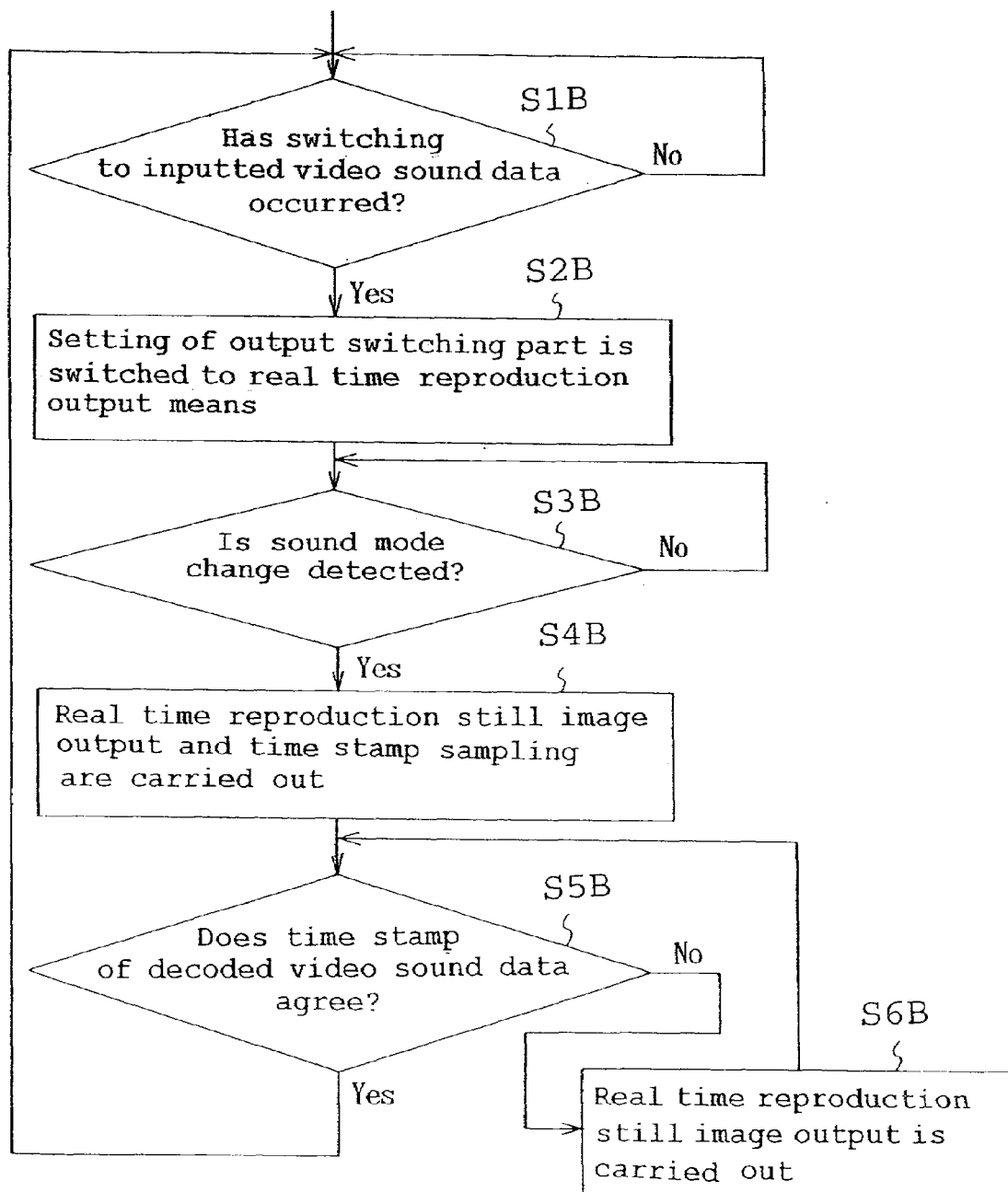
FIG. 24 is a flow chart showing an output video signal switching process according to Embodiment 8 of the present invention.

Next, referring primarily to FIGS. 22 and 24, the operation of the information reception, recording and reproduction apparatus according to the present embodiment is described in the case that switching of the inputted video sound data has occurred. Here, FIG. 24 is a flowchart showing a switching process of the outputted video sound data by means of the output of the sound mode change detection part 2203 (see FIG. 22).

In the information reception, recording and reproduction apparatus of FIG. 22, in the case that conventional viewing and listening are carried out, the inputted analog video sound data is digitalized in the AD conversion part 2201 and, after that, is coded by the coding part 2202.

The coding part 2202 adds information showing, with respect to the coded sound data, which sound data has been coded, to the coded digital video sound data. Here, for example, by using the coding technology of moving picture expert group (hereinafter also referred to as MPEG), a variety of sound modes can be coded as shown in FIG. 25 and the coded digital video sound data includes information for identifying these sound modes.

The coded digital video sound data passes through the sound mode change detection part 2203 and the time stamp sampling part 2204 and is recorded in the disk recording medium part 2205. The coded digital video sound data recorded in the disk recording medium part 2205 passes through the time stamp analysis part 2206 so as to be decoded to digital video sound data by the decoding part 2207 and, after that, passes through the output switching part 2211 and the DA conversion part 2212 so as to be outputted as analog video sound. The user usually reproduces video sound data recorded in the disk recording medium part 2205 in the above manner.

Here, at the time when the user switches the inputted video sound data (for example, when the inputted video sound data is a TV broadcast program and the user switches the channel the user is watching to another channel), the user interface part 2209 makes notification of the switching of the inputted video sound data to the switching control part 2208 (S1B).

The switching control part 2208 receives the output of the user interface part 2209 and controls the output switching part 2211 so that video sound data is outputted without being recorded in the disk recording medium part 2205 instead of the video sound data recorded in the disk recording medium part 2205 being outputted.

The output switching part 2211 switches the output from the video sound data recorded in the disk recording medium part 2205 to the inputted video sound data which is digitalized in the AD conversion part 2201 and is temporarily stored in the frame of 2210 so as to output the video sound data to the DA conversion part 2212 (S2B).

In addition, the inputted video sound data passes through the frame memory 2210, the output switching part 2211 and the DA conversion part 2212 so as to be outputted to the outside of the apparatus and at the same time is continuously coded by the coding part 2202 and passes through the sound mode change detection part 2203 and the time stamp sampling part 2204 so as to be recorded in the disk recording medium part 2205 and, after that, passes through the time stamp analysis part 2206 and the decoding part 2207 so as to be outputted to the output switching part 2211.

Then, when the sound mode change detection part 2203 detects a sound mode change in the coded digital video sound data (S3B) the switching control part 2208 controls the frame memory 2210 so as to implement a conversion to the still video condition immediately after the sound mode change and converts the video data outputted after passing through the output switching part 2211 and the DA conversion part 2212 into the still image condition immediately after the sound mode change and, at the same time, the time stamp sampling part 2204 recognizes the time stamp of the coded digital video sound data in which the sound mode change has occurred (S4B).

The time stamp analysis part 2206 monitors the time stamp of the coded video sound data outputted from the disk recording part 2205 and determines whether or not the coded digital video sound data detected by the sound mode change detection part 2203 has been outputted from the disk recording medium part 2205 after being recorded in the disk recording medium part 2205 based on the time stamp gained from the time stamp sampling part 2204.

When the time stamp analysis part 2206 senses that the coded digital video sound data detected by the sound mode change detection part 2203 is outputted from the disk recording medium part 2205 (S5B) the switching control part 2208 switches the digital video sound data outputted from the output switching part 2211 from the digital video sound data outputted from the frame memory 2210 to the digital video sound data outputted from the decoding part 2207. Here, the real time reproduction still image output immediately after the sound mode change detection from the frame memory 2210 is continued until the time stamp gained from the time stamp analysis part 2206 agrees with the time stamp recognized by the time stamp sampling part 2204 (S6B).

As described above, at the time when switching of the inputted video sound data is carried out, the inputted video sound data and the video sound data which is reproduced after being recorded in the recording medium are switched in accordance with the sound mode change detection of the inputted video sound data so as to be outputted and thereby an information reception, recording and reproduction method can be implemented wherein any unnatural feeling given to the user due to a time lag between the inputted video sound data and the video sound data which is reproduced after being recorded in the recording medium is reduced and smooth switching of the outputted video sound data is possible by freezing the video immediately after the sound mode change.

Embodiment 9

Figure 23:
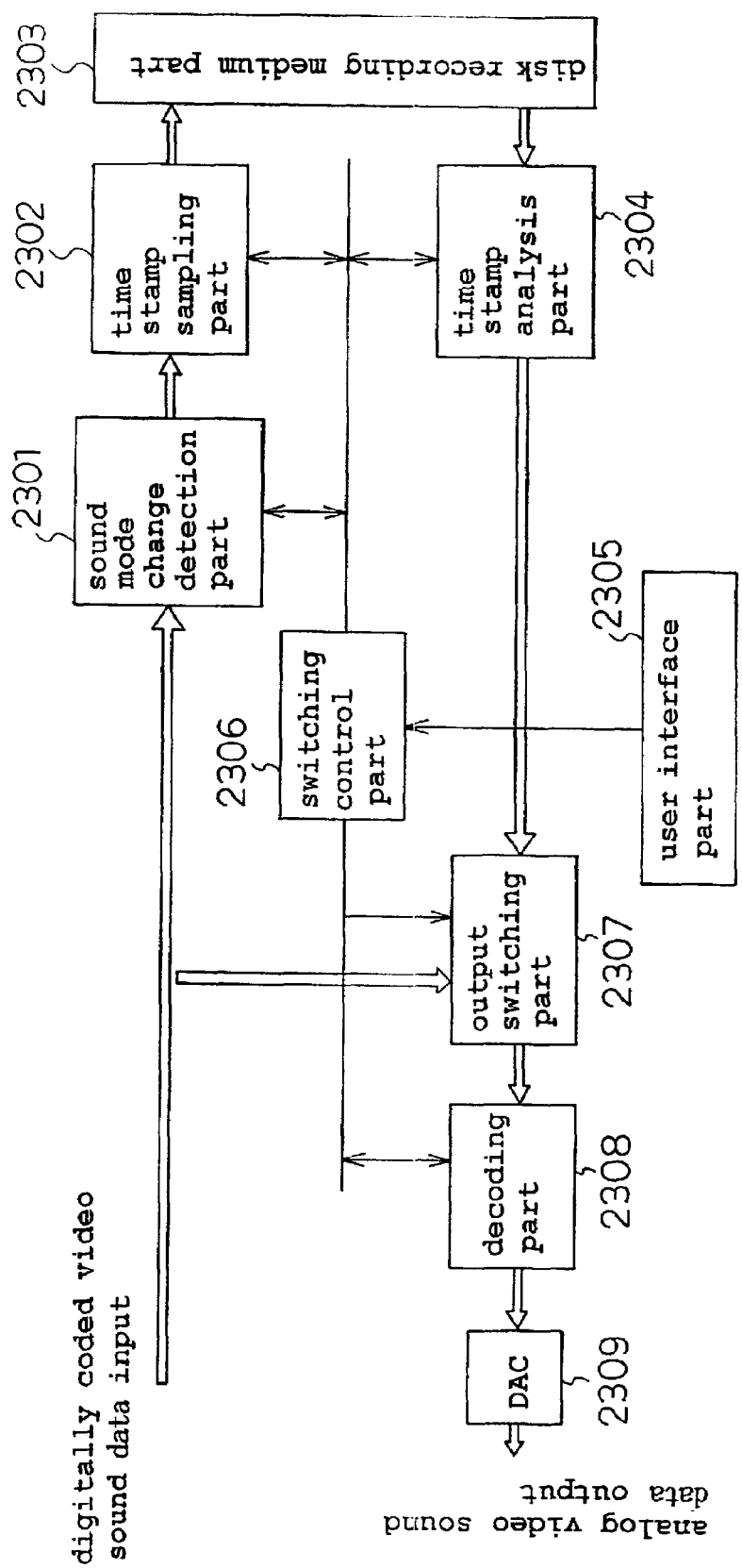
FIG. 23 is a block diagram of an information reception, recording and reproduction apparatus at the time of an digital video sound data input according to Embodiment 9 of the present invention.

Next, the structure and the operation of an information reception, recording and reproduction apparatus according to the present Embodiment 9 are described primarily in reference to FIG. 23. Here, the structure and the operation of the information reception, recording and reproduction apparatus of the present embodiment are described and, at the same time, one embodiment of an information reception, recording and reproduction method of the present invention is described.

First, in reference to FIG. 23, the structure of the information reception, recording and reproduction apparatus of the present embodiment is described. Here, FIG. 23 is a block diagram of the information reception, recording and reproduction apparatus.

As described below, coded digital video sound data is inputted instead of analog video sound data to the information reception, recording and reproduction apparatus according to the present embodiment, which is an information reception, recording and reproduction apparatus, wherein a change of the sound mode is detected by the sound mode change detection part 2301 from the inputted sound data and the output of the outputted video sound data can be switched by the output switching part 2307, which receives the control of the switching control part 2306, in the same manner as in the information reception, recording and reproduction apparatus according to the present Embodiment 9.

The information reception, recording and reproduction apparatus according to the present embodiment is formed of a sound mode change detection part 2301 which reads out sound mode information that is included in the inputted coded digital video sound data and which detects the position of a change in the sound mode from the coded digital video sound data, a time stamp sampling part 2302 which extracts a time stamp from the coded digital video sound data, a disk recording medium part 2303 which allows random access, a time stamp analysis part 2304 for extracting a time stamp from coded digital video sound data so as to analyze the time stamp, a decoding part 2308 for decoding the coded digital video sound data, an output switching part 2307 for switching between the video sound data outputted, without being recorded in the disk recording medium part 2303, and the video sound data recorded in the disk recording medium part 2303, a switching control part 2306 for controlling this output switching part 2307, a user interface part 2305 for making notification of a command from the user to the switching control part 2306 and a DA conversion part (referred to as DAC in the figure) 2309 which converts the digital video sound data into analog video sound data.

The switching control part 2306 is a means of recognizing that a sound mode change has occurred in the inputted video sound data from the output of the sound mode change detection part 2301 and of gaining the time stamp with respect to the coded digital video sound data, wherein a sound mode change is carried out, from the time stamp sampling part 2302. In addition, the switching control part 2306 is a means of gaining the time stamp with respect to the coded digital video sound data, which is reproduced after being recorded in the disk recording medium part 2303, from the time stamp analysis part 2304. The switching control part 2306 is a means of receiving the outputs of the sound mode change detection part 2301, of time stamp sampling part 2302 and of the time stamp analysis part 2304 and of controlling the output switching part 2307 for switching between the video sound data outputted without being recorded in the disk recording medium part 2303 and the video sound data which is reproduced after being recorded in the disk recording medium part 2303.

Here, the means which includes the user interface part 2305 corresponds to the selection means of the present invention, the means which includes the disk recording medium part 2303 corresponds to the output switching means of the present invention, the means including the output switching part 2307 corresponds to the output switching means of the present invention, the means which includes the sound mode change detection part 2301 corresponds to the detection means of the present invention, the means which includes the switching control part 2306 corresponds to the switching control means of the present invention, the means which includes the time stamp sampling part 2302 corresponds to the time information sampling means of the present invention and the means which includes the time stamp analysis part 2304 corresponds to the switching position specification means of the present invention.

Next, the operation of the information reception, recording and reproduction apparatus according to the present embodiment is described in the case that the switching of the inputted video sound data has occurred.

In the information reception, recording and reproduction apparatus of FIG. 23, the inputted coded digital video sound data passes through the sound mode change detection part 2301 and the time stamp sampling part 2302 so as to be recorded in the disk recording medium part 2303 in the case that conventional viewing and listening are carried out. The coded digital video sound data recorded in the disk recording medium part 2303 passes through the time stamp analysis part 2304 and the output switching part 2307 so as to be decoded into digital video sound data by the decoding part 2308 and, after that, passes through the DA conversion part 2309 so as to outputted as analog video sound. The user normally uses the reproduction of the video sound data recorded in the disk recording medium part 2303 in the above manner.

Here, at the time when the user switches the inputted video sound data, the user interface part 2305 makes notification of the switching of the inputted video sound data to the switching control part 2306.

The switching control part 2306 receives the output of the user interface part 2305 and controls the output switching part 2307 so that video sound data is outputted without being recorded in the disk recording medium part 2303 from the video sound data recorded in the disk recording medium part 2303.

The output switching part 2307 switches the output from the coded digital video sound data recorded in the disk recording medium part 2303 to the inputted coded digital video sound data so as to output the video sound data to the decoding part 2308.

In addition, the inputted coded digital video sound data passes through the output switching part 2307, the decoding part 2308 and the DA conversion part 2309 so as to outputted to the outside of the apparatus and, at the same time, continuously passes through the sound mode change detection part 2301 and the time stamp sampling part 2302 so as to be recorded in the disk recording medium part 2303 and, after that, passes through the time stamp analysis part 2304 so as to be outputted to the output switching part 2307.

Then, when a sound mode change is detected in the inputted video sound data by the sound mode change detection part 2301, the switching control part 2306 controls the decoding part 2308 so as to implement a conversion to the still video condition immediately after the sound mode change and converts the video sound data outputted after passing through the DA conversion part 2309 into a still image condition immediately after the sound mode change.

The switching control part 2306 also recognizes the time stamp of the inputted coded digital video sound data in which a sound mode change has occurred from the time stamp sampling part 2302.

The time stamp analysis part 2304 monitors the time stamp of the coded digital video sound data which is outputted from the disk recording part 2303 and determines whether or not the video sound data detected by the sound mode change detection part 2301 is outputted from the disk recording medium part 2303 after being recorded in the disk recording medium part 2303 based on the time stamp gained from the time stamp sampling part 2302.

When the time stamp analysis part 2304 senses that the coded digital video sound data detected by the sound mode change detection part 2301 is outputted from the disk recording medium part 2303, the switching control part 2306 switches the coded digital video sound data outputted from the output switching part 2307 from the inputted coded digital video sound data to the coded digital video sound data outputted from the time stamp analysis part 2304.

In addition, the switching control part 2306 directs the decoding part 2308 which is outputting the still video immediately after the sound mode change, to decode and output the coded digital video sound data outputted from the time stamp analysis part 2304.

As described above, in the case that the inputted video sound data is not analog video sound data as described in the present Embodiment 8 but, rather, is coded digital video sound data, an information reception, recording and reproduction method can be implemented wherein the unnatural feeling given to the user due to a time lag between the inputted video sound data and the video sound data which is reproduced after being recorded in the recording medium is reduced so that smooth switching of the output video sound data is possible by switching the inputted video sound data and the video sound data which is reproduced after being recorded in the recording medium in accordance with the sound mode change detection of the inputted video data at the time when switching of the inputted video sound data is carried out.

Embodiment 10

Figure 26:
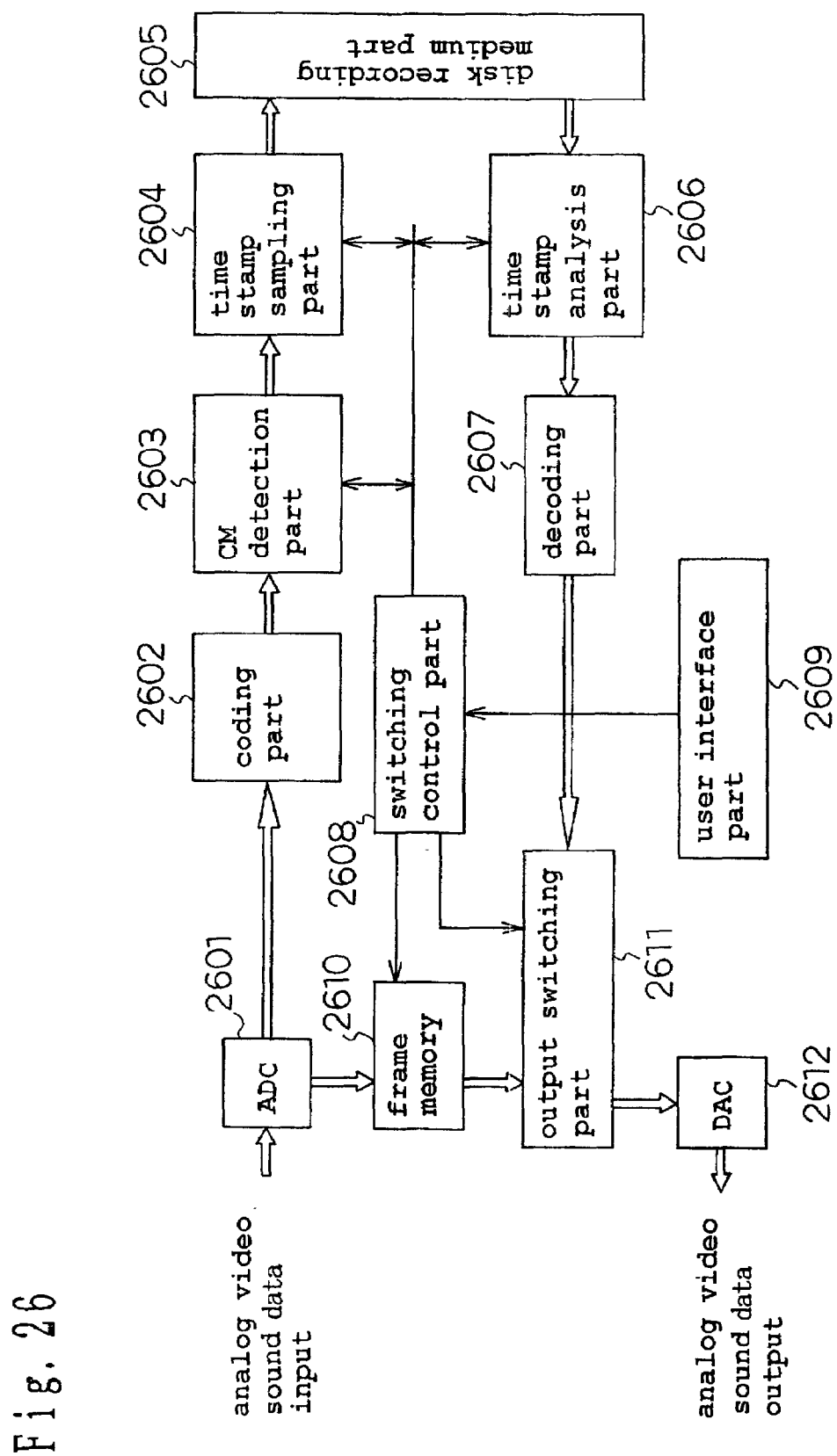
FIG. 26 is a block diagram of an information reception, recording and reproduction apparatus at the time of an analog video sound data input according to Embodiment 10 of the present invention.

Next, the structure and the operation fan information reception, recording and reproduction apparatus according to the present Embodiment 10 are described primarily in reference to FIG. 26. Here, the structure and the operation of the information reception, recording and reproduction apparatus of the present embodiment is described and, at the same time, one embodiment of the information reception, recording and reproduction method of the present invention is described.

First, in reference to FIG. 26, the structure of the information reception, recording and reproduction apparatus into which analog video sound data is inputted is described in the present embodiment. Here, FIG. 26 shows a block diagram of the information reception, recording and reproduction apparatus of the present embodiment.

As described below, the information reception, recording and reproduction apparatus according to the present Embodiment 10 is different from the information reception, recording and reproduction apparatus according to the prior art and is an information reception, recording and reproduction apparatus wherein commercial messages (hereinafter also referred to as CM) are detected by a CM detection part 2603 from the inputted video sound data and the output of the outputted video sound data can be switched in an output switching part 2611 which receives the control of a switching control part 2608.

The information reception, recording and reproduction apparatus of the present embodiment is formed of an AD conversion part (referred to as ADC in the figure) 2601 for digitally converting inputted analog video sound data, a frame memory 2610 for temporarily storing the digitized video sound data, a coding part 2602 for coding the digital video sound data, a CM detection part 2603 for reading out CM information which is included in the coded digital video sound data and for detecting the positions of the CMs from the coded digital video sound data, a time stamp sampling part 2604 for extracting a time stamp from the coded digital video sound data, a disk recording medium part 2605 for allowing random access, a time stamp analysis part 2606 for extracting the time stamp from the coded digital video sound data so as to analyze the time stamp, a decoding part 2607 for decoding the coded digital video sound data, an output switching part 2611 for switching between the digital video sound data outputted without being recorded in the disk recording medium part 2605 and the digital video sound data recorded in the disk recording medium part 2605, a switching control part 2608 for controlling this output switching part 2611, a user interface part 2609 for making notification of a command from the user to the switching control part 2608 and a DA conversion part (referred to as DAC in the figure) 2612 for converting the digital video sound data into analog video sound data.

The switching control part 2608 is a means of recognizing the occurrence of a CM in the inputted video sound data from the output of the CM detection part 2603 and of gaining, from the time stamp sampling part 2604, a time stamp with respect to the coded digital video sound data wherein a CM has occurred. In addition, the switching control part 2608 is a means of gaining, from the time stamp analysis part 2606, a time stamp with respect to the coded digital video sound data, which is reproduced after being recorded in the disk recording medium part 2605. The switching control part 2608 is a means of receiving the outputs of the CM detection part 2603, of the time stamp sampling part 2604 and of the time stamp analysis part 2606 and of controlling the output switching part 2611 which switches between the digital video sound data outputted without being recorded in the disk recording medium part 2605 and the digital video sound data which is reproduced after being recorded in the disk recording medium part 2605.

Here, the means which includes the user interface part 2609 corresponds to the selection means of the present invention, the means which includes the disk recording medium part 2605 corresponds to the recording and reproduction means of the present invention, the means which includes the output switching part 2611 corresponds to the output switching means of the present invention, the means which includes the CM detection part 2603 corresponds to the detection means of the present invention, the means which includes the switching control part 2608 corresponds to the switching control means of the present invention, the means which includes the time stamp sampling part 2604 corresponds to the time information sampling means of the present invention and the means which includes the time stamp analysis part 2606 corresponds to the switching position specification means of the present invention.

Figure 28:
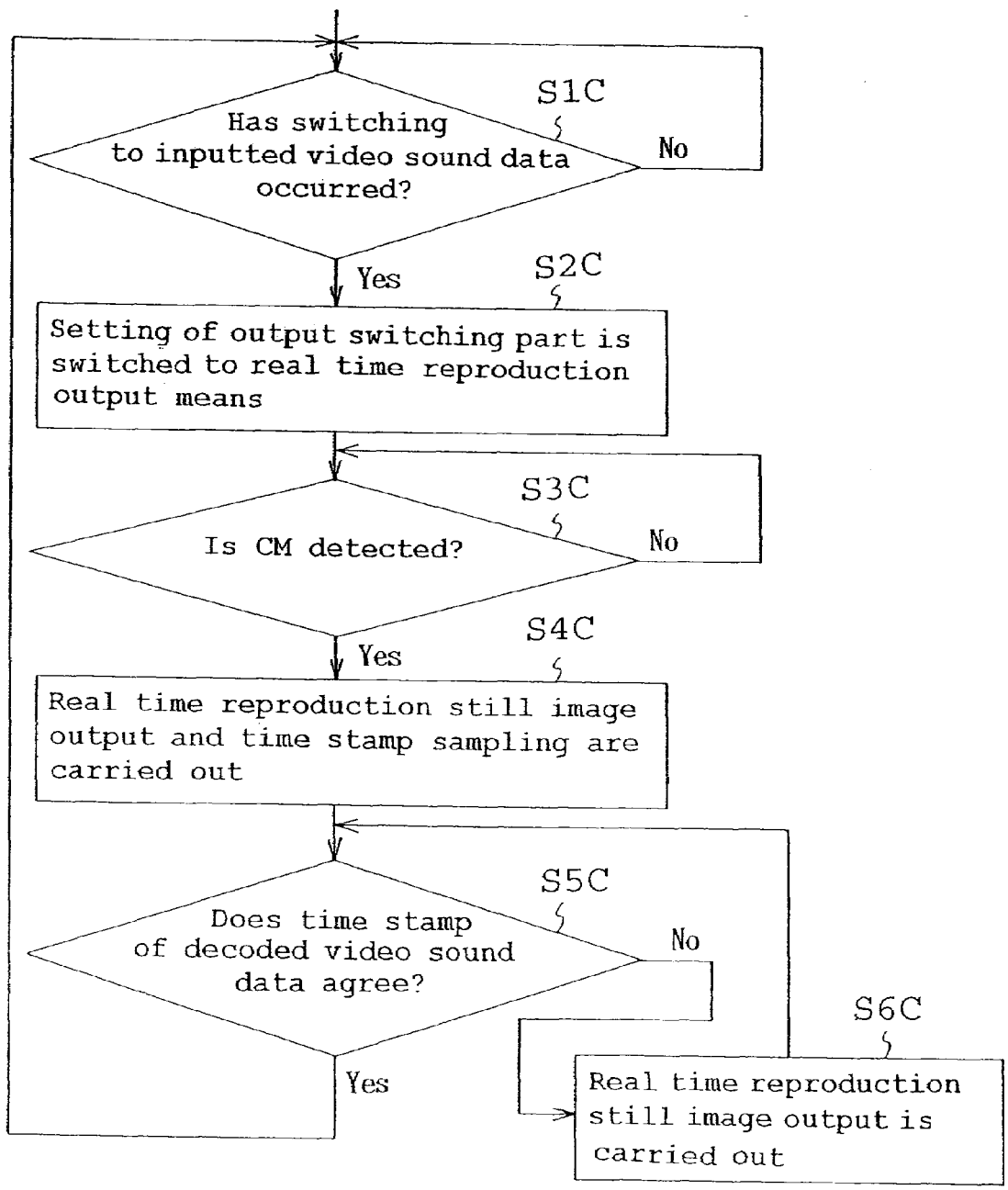
FIG. 28 is a flow chart showing an output video signal switching process according to Embodiment 10 of the present invention.

Next, primarily in reference to FIGS. 26 and 28, the operation of the information reception, recording and reproduction apparatus according to the present embodiment is described in the case that switching of the inputted video sound data has occurred. Here, FIG. 28 is a flowchart showing a switching process of the video sound data outputted by means of the output from the CM detection part 2603 (in reference to FIG. 26).

In the case that conventional viewing and listening are carried out in the information reception, recording and reproduction apparatus of FIG. 26, the inputted analog video sound data is coded by the coding part 2602 after being digitized by the AD conversion part 2601.

The coding part 2602 adds information which indicates a CM is coded to the coded digital video sound data in the case that the CM is included in the coded video sound data. The coded digital video sound data passes through the CM detection part 2603 and the time stamp sampling part 2604 so as to be recorded in the disk recording medium part 2605. The coded digital video sound data recorded in the disk recording medium part 2605 passes through the time stamp analysis part 2606 so as to be decoded to digital video sound data by the decoding part 2607 and, after that, passes through the output switching part 2611 and the DA conversion part 2612 so as to be outputted as analog video sound. The user usually reproduces video sound data recording in the disk recording medium part 2605 in the above manner.

Here, when the user switches the inputted video sound data (for example, when the inputted video sound data is a TV broadcast program and the user switches the channel being watched by the user to another channel) notification of the switching of the inputted video sound data is made to the switching control part 2608 by the user interface part 2609 (S1C).

The switching control part 2608 receives the output of the user interface part 2609 and controls the output switching part 2611 so that video sound data is outputted from the video sound data recorded in the disk recording medium part 2605 without being recorded in the disk recording medium part 2605.

The output switching part 2611 switches the output from the video sound data recorded in the disk recording medium part 2605 to the inputted video sound data, which is digitized by the AD conversion part 2601 and which is temporarily stored in the frame memory 2610, and outputs video sound data to the DA conversion part 2612 (S2C).

In addition, the inputted video sound data passes through the frame memory 2610, the output switching part 2611 and the DA conversion part 2612 so as to be outputted to the outside of the apparatus and, at the same time, is coded by the coding part 2602 and passes through the CM detection part 2603 and the time stamp sampling part 2604 so as to be recorded in the disk recording medium part 2605 and, after that, passes through the time stamp analysis part 2606 and the decoding part 2607 so as to be outputted to the output switching part 2611.

Then, when the CM detection part 2603 detects a CM in the inputted video sound data (S3C), the switching control part 2608 controls the frame memory 2610 so as to implement a conversion to the still video condition immediately after the CM detection and converts the video data outputted after passing through the output switching part 2611 and the DA conversion part 2612 to the still image condition immediately after the CM detection and, at the same time, the time stamp sampling part 2604 recognizes a time stamp of the coded digital video sound data where a CM has occurred (S4C).

The time stamp analysis part 2606 monitors the time stamp of the coded digital video sound data outputted from the disk recording part 2605 and determines whether or not the coded digital video sound data detected by the CM detection part 2603 is outputted from the disk recording medium part 2605 after being recorded in the disk recording medium part 2605 based on the time stamp gained from the time stamp sampling part 2604.

When the time stamp analysis part 2606 senses that the coded digital video sound data detected by the CM detection part 2603 is outputted from the disk recording medium part 2605 (S5C) the switching control part 2608 switches the digital video sound data outputted from the output switching part 2611 from the video sound data outputted from the frame memory 2610 to the digital video sound data outputted from the decoding part 2607. Here, the real time reproduction still image output immediately after the CM detection from the frame memory 2610 is continued up to the time when the time stamp gained from the time stamp analysis part 2606 agrees with the time stamp recognized by the time stamp sampling part 2604 (S6C).

As described above, when the inputted video sound data is switched, the inputted video sound data and the video sound data which is reproduced after being recorded in the recording medium are switched in accordance with the CM detection of the inputted video data so as to be outputted and, thereby, an information reception, recording and reproduction method can be implemented, wherein any unnatural feeling given to the user due to a time lag between the inputted video sound data and the video sound data which is reproduced after being recorded in the recording medium is reduced so as to make a smooth switching of the outputted video sound data possible by freezing the video immediately after the CM detection.

Embodiment 11

Figure 27:
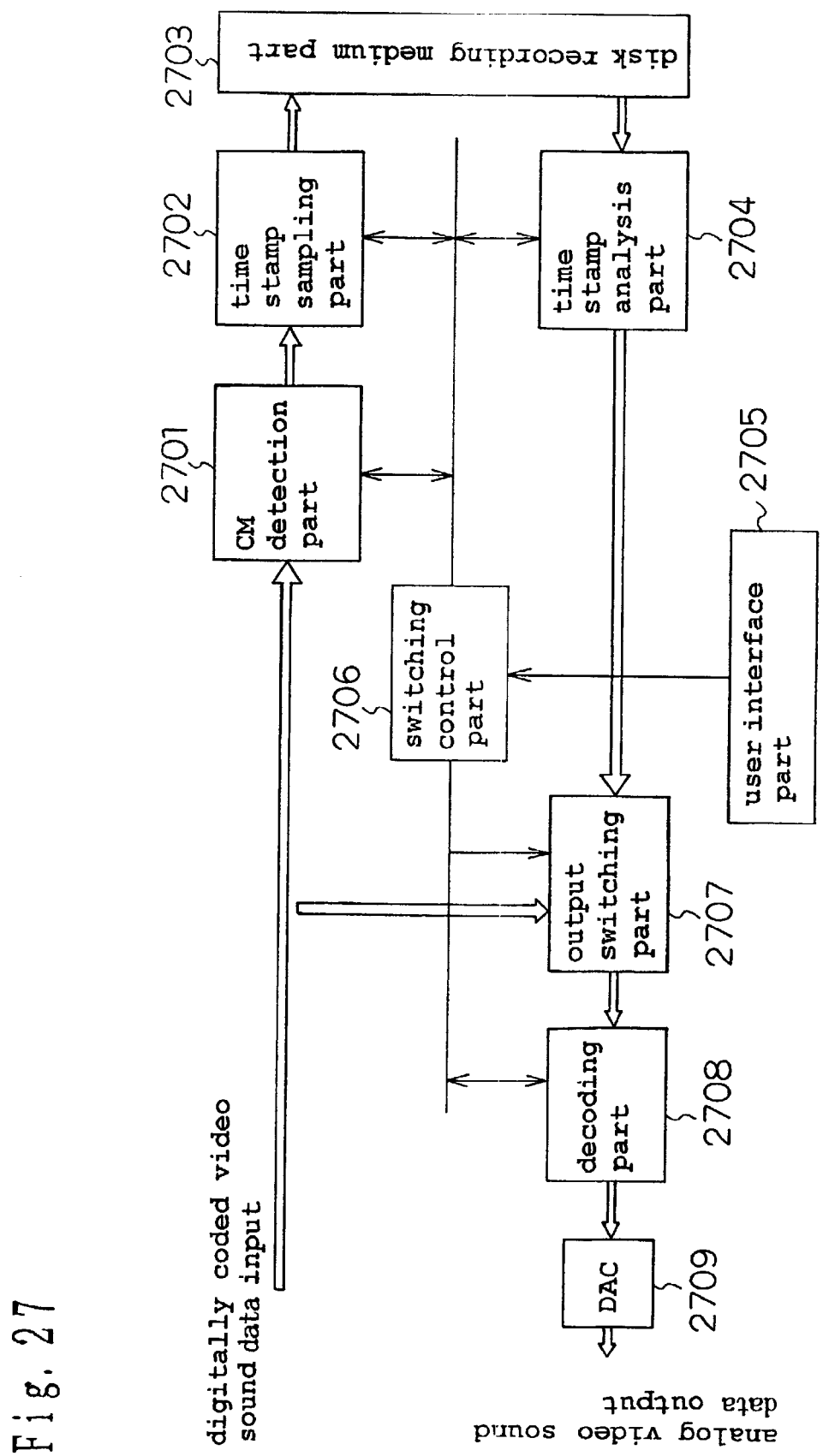
FIG. 27 is a block diagram of an information reception, recording and reproduction apparatus at the time of an digital video sound data input according to Embodiment 11 of the present invention.

Next, the structure and the operation of an information reception, recording and reproduction apparatus according to the present Embodiment 11 are described primarily in reference to FIG. 27. Here, the structure and the operation of the information reception, recording and reproduction apparatus of the present embodiment are described and, at the same time, one embodiment of an information reception, recording and reproduction method of the present invention is described.

First, in reference to FIG. 27, the structure of the information reception, recording and reproduction apparatus of the present embodiment is described. Here, FIG. 27 is a block diagram of the information reception, recording and reproduction apparatus.

As described below, coded digital video sound data instead of analog video sound data is inputted to the information reception, recording and reproduction apparatus according to the present embodiment, which is an information reception, recording and reproduction apparatus which detects CMs in a CM detection part 2701 from the inputted video sound data and which can switch the output of the outputted video sound data in an output switching part 2707 that receives the control of a switching control part 2706 in the same manner as in the information reception, recording and reproduction apparatus according to the present Embodiment 10.

The information reception, recording and reproduction apparatus according to the present embodiment is formed of a CM detection part 2701 for reading out CM information included in the inputted coded digital video sound data, a time stamp sampling part 2702 for extracting a time stamp from the coded digital video sound data, a disk recording medium part 2703 for allowing random access, a time stamp analysis part 2704 for extracting a time stamp from the coded digital video sound data so as to analyze the time stamp, a decoding part 2708 for decoding the coded digital video sound data, an output switching part 2707 for switching between the video sound data outputted without being recorded in the disk recording medium part 2703 and the video sound data recorded in the disk recording medium part 2703, the switching control part 2706 for controlling this output switching part 2707, the user interface part 2705 for making notification of a command from the user to the switching control part 2706 and a DA conversion part (referred to as DAC in the figure) 2709 for converting the digital video sound data into analog video sound data.

The switching control part 2706 is a means of recognizing the occurrence of a CM in the inputted video sound data from the output of the CM detection part 2701 and of gaining a time stamp with respect to the coded digital video sound data where the CM has occurred from the time stamp sampling part 2702. In addition, the switching control part 2706 is a means of gaining the time stamp with respect to the coded digital video sound data, which is reproduced after being recorded in the disk recording medium part 2703, from the time stamp analysis part 2704. The switching control part 2706 is a means of receiving the outputs of the CM detection part 2701, of the time stamp sampling part 2702 and the time stamp analysis part 2704 and of controlling the output switching part 2707 which switches between the video sound data outputted without being recorded in the disk recording medium part 2703 and the video sound data which is reproduced after being recorded in the disk recording medium part 2703.

Here, the means which includes the user interface part 2705 corresponds to the selection means of the present invention, the means which includes the disk recording medium part 2703 corresponds to the recording and reproduction means of the present invention, the means which includes the output switching part 2707 corresponds to the output switching means of the present invention, the means which includes the CM detection part 2701 corresponds to the detection means of the present invention, the means which includes the switching control part 2706 corresponds to the switching control means of the present invention, the means which includes the time stamp sampling part 2702 corresponds to the time information sampling means of the present invention and the means which includes the time stamp analysis part 2704 corresponds to the switching position specification means of the present invention.

Next, the operation of the information reception, recording and reproduction apparatus according to the present embodiment is described in the case that switching of the inputted video sound data has occurred.

In the information reception, recording and reproduction apparatus of FIG. 27, in the case that conventional viewing and listening are carried out, the inputted coded digital video sound data passes through the CM detection part 2701 and the time stamp sampling part 2702 so as to be recorded in the disk recording medium part 2703. The coded digital video sound data recorded in the disk recording medium part 2703 passes through the time stamp analysis part 2704 and the output switching part 2707 so as to be decoded to digital video sound data in the decoding part 2708 and, after that, passes through the DA conversion part 2709 so as to be outputted as analog video sound. The user usually reproduces the video sound data recorded in the disk recording medium part 2703 in the above manner.

Here, when the user switches the inputted video sound data the user interface part 2705 makes notification of the switching of the inputted video sound data to the switching control part 2706.

The switching control part 2706 receives the output of the user interface part 2705 and controls the output switching part 2707 so that the video sound data is outputted from the coded digital video sound data recorded in the disk recording medium part 2703 without being recorded in the disk recording medium part 2703.

The output switching part 2707 switches the output from the coded digital video sound data recorded in the disk recording medium part 2703 to the inputted coded digital video sound data so as to output the video sound data to the decoding part 2708.

In addition, the inputted coded digital video sound data passes through the output switching part 2707, the decoding part 2708 and the DA conversion part 2709 so as to be outputted to the outside of the apparatus and, at the same time, continuously passes through the CM detection part 2701 and the time stamp sampling part 2702 so as to be recorded in the disk recording medium part 2703 and, after that passes through the time stamp analysis part 2704 so as to be outputted to the output switching part 2707.

Then, when the CM detection part 2701 detects a CM in the inputted video sound data, the switching control part 2706 controls the decoding part 2708 so as to implement a conversion to the still video condition immediately after the CM detection and converts the video sound data outputted after passing through the DA conversion part 2709 to the still image condition immediately after the CM.

The switching control part 2706 also recognizes a time stamp of the inputted coded digital video sound data where the CM has occurred from the time stamp sampling part 2702.

The time stamp analysis part 2704 monitors the time stamp of the coded digital video sound data outputted from the disk recording part 2703 and determines whether or not the coded digital video sound data detected by the CM detection part 2701 is outputted from the disk recording medium part 2703 after being recorded in the disk recording medium part 2703 based on the time stamp gained from the time stamp sampling part 2702.

When the time stamp analysis part 2704 senses that the coded digital video sound data detected by the CM detection part 2701 is outputted from the disk recording medium part 2703, the switching control part 2706 switches the coded digital video sound data outputted from the output switching part 2707 from the inputted coded digital video sound data to the coded digital video sound digital data outputted from the time stamp analysis part 2704.

In addition, the switching control part 2706 directs the decoding part 2708 which outputs the still image immediately after the CM to decode and output the coded digital video sound data outputted from the time stamp analysis part 2704.

As described above, even in the case that the inputted video sound data is coded digital video sound instead of analog video sound data as described in the present Embodiment 10, when the switching of the inputted video sound data is carried out, the inputted video sound data and the video sound data which is reproduced after being recorded in the recording medium are switched in accordance with the CM detection of the inputted video sound data so as to be outputted and, thereby, an information reception, recording and reproduction method can be implemented, wherein any unnatural feeling given to the user due to a time lag between the inputted video sound data and the video sound data which is reproduced after being recorded in the recording medium is reduced and smooth switching of the outputted video sound data is possible.

Embodiment 12

Figure 29:
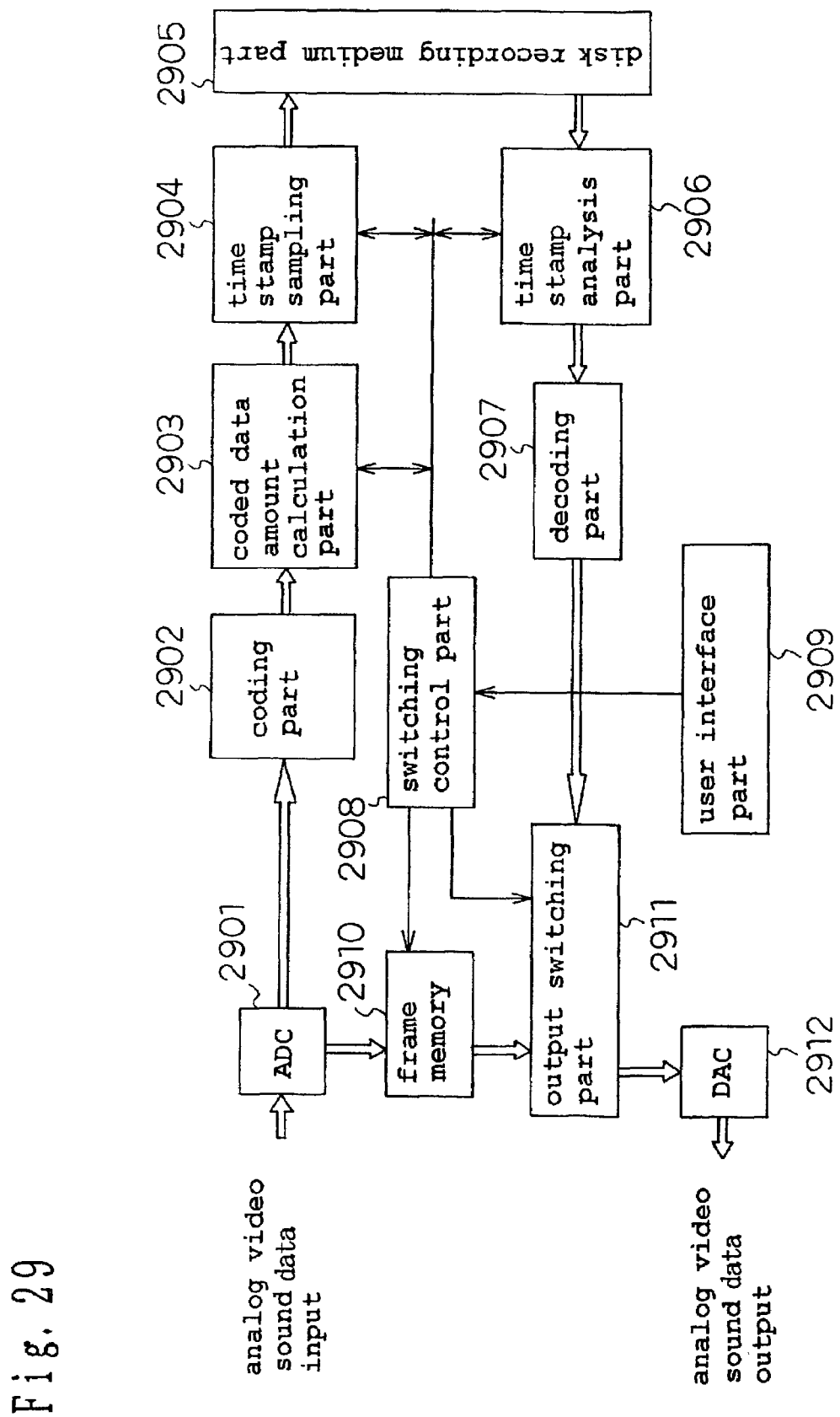
FIG. 29 is a block diagram of an information reception, recording and reproduction apparatus at the time of an analog video sound data input according to Embodiment 12 of the present invention.

Next, the structure and the operation of the information reception, recording and reproduction apparatus according to the present Embodiment 12 are described primarily in reference to FIG. 29. Here, the structure and the operation of the information reception, recording and reproduction apparatus of the present embodiment are described and, at the same time, one embodiment of an information reception, recording and reproduction method of the present invention is described.

First, in reference to FIG. 29, the structure of the information reception, recording and reproduction apparatus according to the present embodiment to which analog video sound data is inputted is described. Here, FIG. 29 shows a block diagram of the information reception, recording and reproduction apparatus of the present embodiment.

As described below, the information reception, recording and reproduction apparatus according to the present Embodiment 12 is different from the information reception, recording and reproduction apparatus according to the prior art and is an information reception, recording and reproduction apparatus wherein a coded data amount calculation part 2903 detects a video portion without sound and without movement to and from the subsequent and previous video image from inputted video sound data and the output of the outputted video sound data can be switched by an output switching part 2911, which is controlled by the switching control part 2908.

The information reception, recording and reproduction apparatus of the present embodiment is formed of an AD conversion part (referred to as ADC in the figure) 2901, which digitally converts inputted analog video sound data, a frame memory 2910 for temporarily storing digitized video data, a coding part 2902 for coding the digital video sound data, a coded data amount calculation part 2903 for detecting a video portion without sound and without movement to and from the subsequent and previous video image from the coded digital video sound data, a time stamp sampling part 2904 for extracting a time stamp from the coded digital video sound data, a disk recording medium part 2905 for allowing random access, a time stamp analysis part 2906 for extracting a time stamp from the coded digital video sound data and for analyzing the time stamp, a decoding part 2907 for decoding the coded digital video sound data, an output switching part 2911 for switching between the digital video sound data which is outputted without being recorded in the disk recording medium part 2905 and the digital video sound data recorded in the disk recording medium part 2905, a switching control part 2908 for controlling this output switching part 2911, the user interface part 2909 for making notification of a command from the user to the switching control part 2908 and a DA conversion part (referred to as DAC in the figure) 2912 for converting the digital video sound data into analog video sound data.

The switching control part 2908 is a means of recognizing the occurrence of a video portion without sound and without movement to and from the subsequent and previous video image in the inputted video sound data from the output of the coded data amount calculation part 2903 and of gaining a time stamp with respect to the coded digital video sound data wherein the video portion without sound and without movement to and from the subsequent and previous video image has occurred from the time stamp sampling part 2904. In addition, the switching control part 2908 is a means of gaining a time stamp with respect to the coded digital video sound data which is reproduced after being recorded in the disk recording medium part 2905 from the time stamp analysis part 2906. The switching control part 2908 is a means of receiving the outputs of the coded data amount calculation part 2903, of the time stamp sampling part 2904 and of the time stamp analysis part 2906 and of controlling the output switching part 2911 which switches between the digital video sound data that is outputted without being recorded in the disk recording medium part 2905 and the digital video sound data that is reproduced after being recorded in the disk recording medium part 2905.

Here, the means which includes the user interface part 2909 corresponds to the selection means of the present invention, the means which includes the disk recording medium part 2905 corresponds to the recording and reproduction means of the present invention, the means which includes the output switching part 2911 corresponds to the output switching means of the present invention, the means which includes the coded data amount calculation part 2903 corresponds to the detection means of the present invention, the means which includes the switching control part 2908 corresponds to the switching control means of the present invention, the means which includes the time stamp sampling part 2904 corresponds to the time information sampling means of the present invention and the means which includes the time stamp analysis part 2906 corresponds to the switching position specification means of the present invention.

Figure 31:
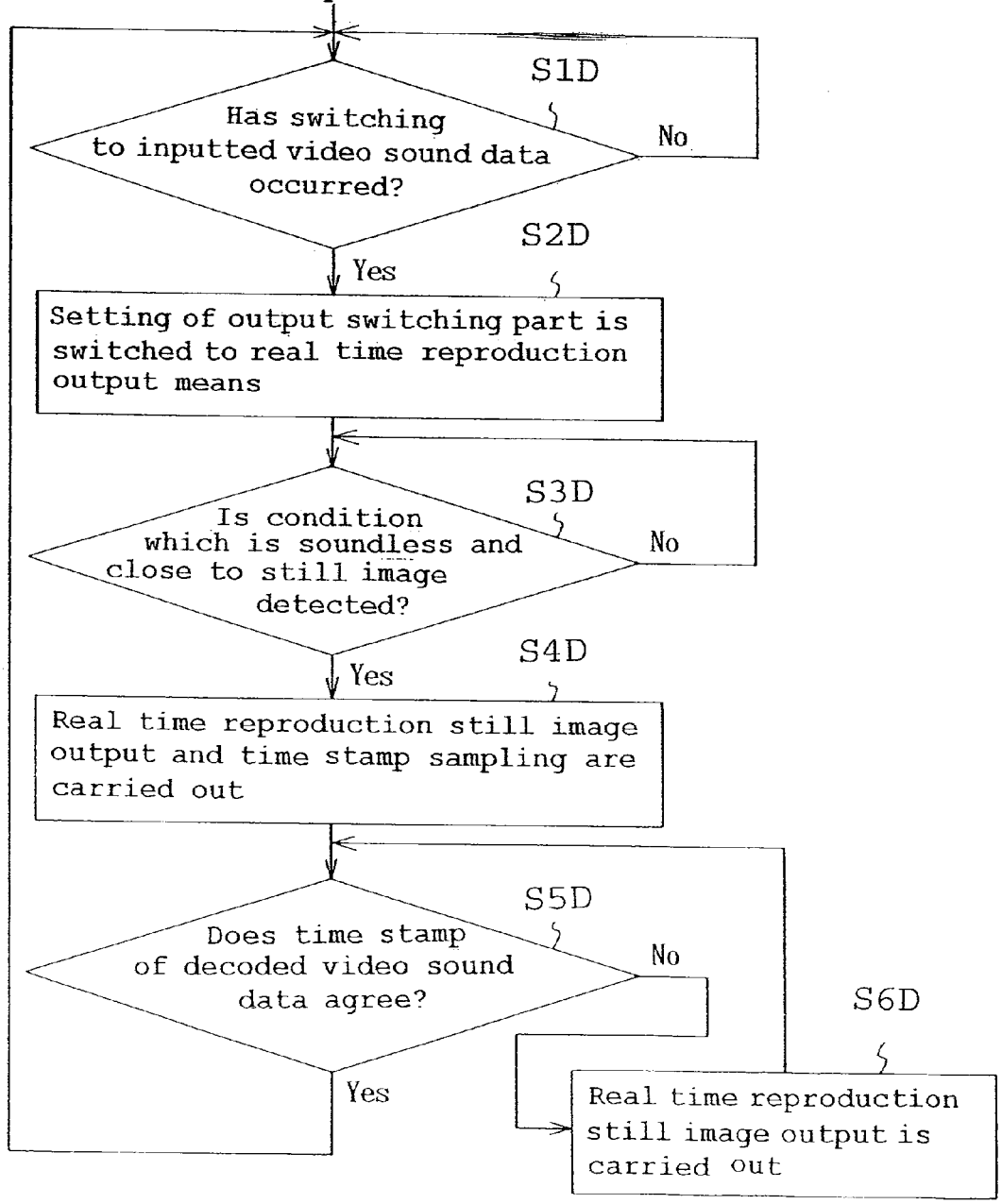
FIG. 31 is a flow chart showing an output video signal switching process according to Embodiment 12 of the present invention.
Figure 32:
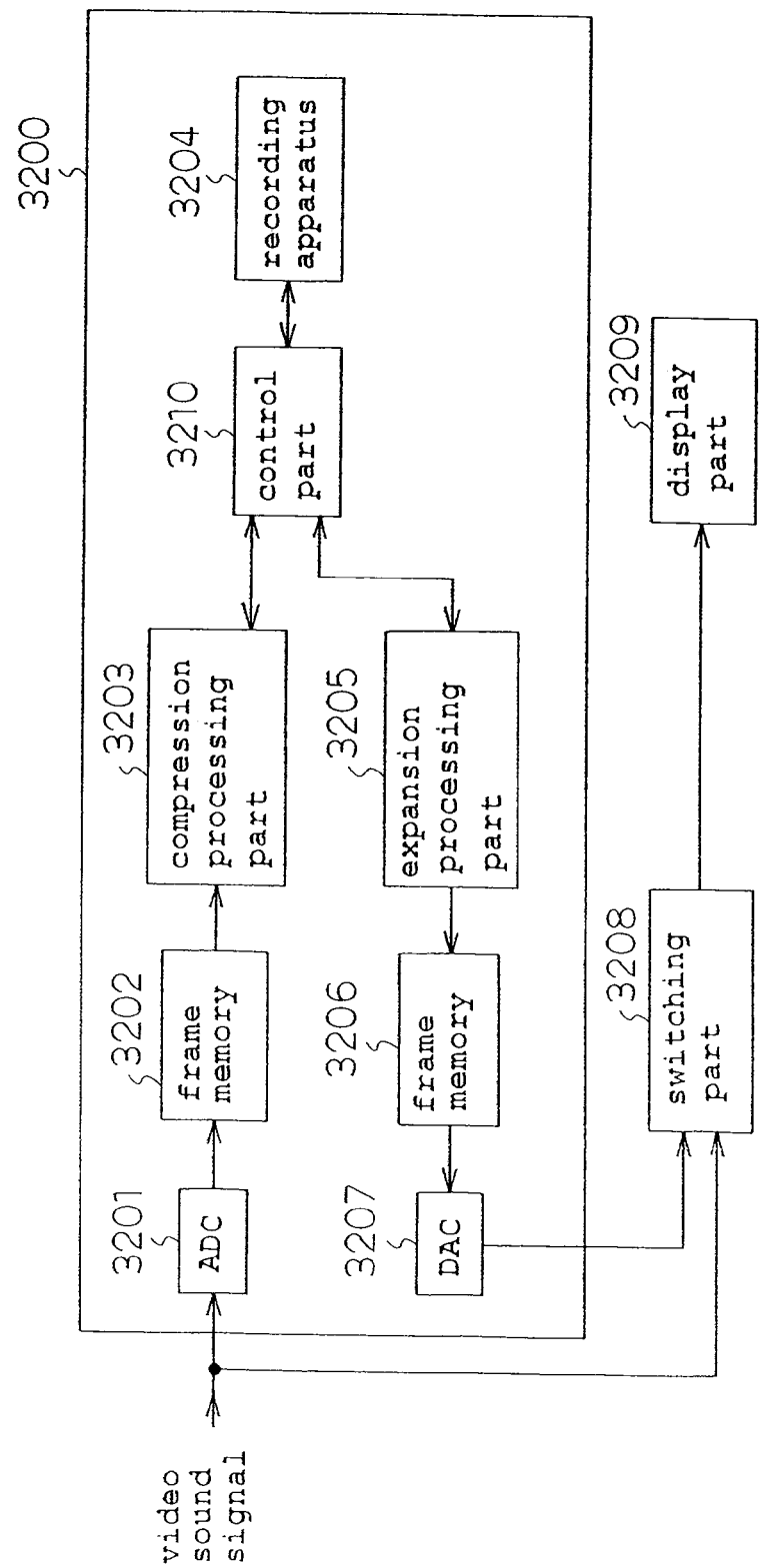
FIG. 32 is a diagram showing an information reception, recording and reproduction apparatus according to a prior art.

Next, primarily in reference to FIGS. 29 and 31, the operation of the information reception, recording and reproduction apparatus according to the present embodiment is described in the case that the switching of the inputted video sound data has occurred. Here, FIG. 31 is a flow chart showing a switching process of the outputted video sound data by means of the output of the coded data amount calculation part 2903 (see FIG. 29).

In the information reception, recording and reproduction apparatus of FIG. 29, in the case that conventional listening and viewing are carried out, the inputted analog video sound data is coded by the coding part 2902 after being digitized by the AD conversion part 2901. The coded digital video sound data passes through the coded data amount calculation part 2903 and the time stamp sampling part 2904 so as to be recorded in the disk recording medium part 2905.

Here, the coded data amount calculation part 2903 detects the position of a portion without sound from the coded digital video sound data and the position of a video portion without movement to and from the subsequent and previous video image. For example, in the case that MPEG technology is used as the coding compression technology, prediction of the movement from the subsequent and previous video image is used in coding the video data. From this movement prediction information, the position of a video portion which is in the condition that approximates a still image without movement is detected. In the present embodiment the coded data amount calculation part 2903 determines that a portion without sound and a video portion without movement to and from the subsequent and previous video image are included in the coded video sound data in the case that one second, or more, of the portion without sound and the video portion without movement to and from the subsequent and previous video image are in the coded digital video sound data.

The coded digital video sound data recorded in the disk recording medium part 2905 passes through the time stamp analysis part 2906 so as to be decoded to the digital video sound data by the decoding part 2907 and, after that, passes through the output switching part 2911 and the DA conversion part 2912 so as to be outputted as analog video sound. The user usually reproduces the video sound data recorded in the disk recording medium part 2905 in the above manner.

Here, when the user switches to the inputted video sound data (for example, when the inputted video sound data is a TV broadcast program and the user switches the channel being watched by the user to another channel) the user interface part 2909 makes notification of the switching of the inputted video sound data to the switching control part 2908 (S1D).

The switching control part 2908 receives the output from the user interface part 2909 and controls the output switching part 2911 so that the video sound data is outputted from the video sound data recorded in the disk recording medium part 2905 without being recorded in the disk recording medium part 2905.

The output switching part 2911 switches the output from the video sound data recorded in the disk recording medium part 2905 to the inputted video sound data which is digitized by the AD conversion part 2901 and which is temporarily stored in the frame memory 2910 and outputs the inputted digital video sound data to the DA conversion part 2912 (S2D).

In addition, the inputted video sound data passes through the frame memory 2910, the output switching part 2911 and the DA conversion part 2912 so as to outputted to the ousted of the apparatus and, at the same time, is continuously coded by the coding part 2902 and passes through the coded data amount calculation part 2903 and the time stamp sampling part 2904 so as to be recorded in the disk recording medium part 2905 and, after that, passes through the time stamp analysis part 2906 and the decoding part 2907 so as to be outputted to the output switching part 2911.

Then, when the coded data amount calculation part 2903 detects a video portion without sound and without movement to and from the subsequent and previous video image in the coded digital video sound data (S3D), the switching control part 2908 controls the frame memory 2910 so as to implement a conversion to the still video condition of the video portion without sound and without movement to and from the subsequent and previous video image and converts the video data outputted after passing through the output switching part 2911 and the DA conversion part 2912 to the still image condition of the video portion without movement to and from the subsequent and previous video image and, at the same time, recognizes a time stamp of the coded digital video sound data wherein the video portion without sound and without movement to and from the subsequent and previous video image has occurred for one second (S4D).

The time stamp analysis part 2906 monitors the time stamp of the coded digital video sound data outputted from the disk recording part 2905 and determines whether or not the coded digital video sound data detected by the coded data amount calculation part 2903 is outputted from the disk recording medium part 2905 after being recorded in the disk recording medium part 2905 based on the time stamp gained by the time stamp sampling part 2904.

When the time stamp analysis part 2906 senses that the coded digital video sound data detected by the coded data amount calculation part 2903 is outputted from the disk recording medium part 2905 (S5D), the switching control part 2908 switches the digital video sound data outputted from the output switching part 2911 from the video sound data outputted from the frame memory 2910 to the video sound data outputted from the coding part 2907. Here, the real time reproduction still image output of the video portion without sound and without movement to and from the subsequent and previous video image from the frame memory 2910 is continued up to the time when the time stamp gained by the time stamp analysis part 2906 agrees with the coded digital video data wherein the video portion without sound and without movement to and from the subsequent and previous video image detected by the time stamp sampling part 2904 has occurred for one second (S6D).

As described above, when the switching of the inputted video sound data is carried out, the inputted video sound data and the video sound data which is reproduced after being recorded in the recording medium are switched so as to be outputted in accordance with the detection of the video portion without sound and without movement to and from the subsequent and previous video image of the inputted video data and, thereby, an information reception, recording and reproduction method can be implemented wherein any unnatural feeling given to the user due to a time lag between the inputted video sound data and the video sound data which is reproduced after being recorded in the recording medium is reduced by freezing the video in the video portion without sound and without movement to and from the subsequent and previous video image so that a smooth switching of the output video sound data is possible.

Embodiment 13

Figure 30:
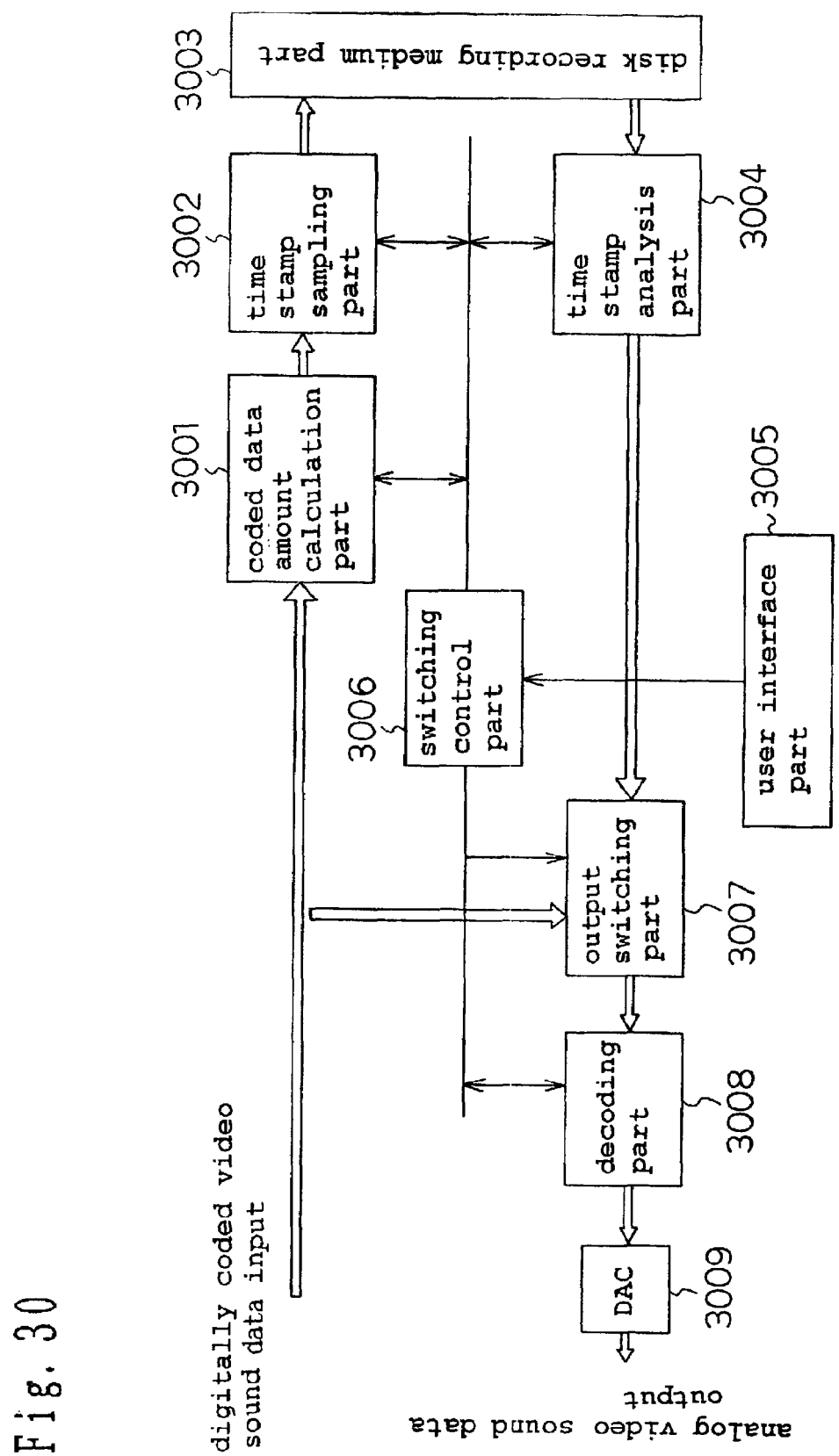
FIG. 30 is a block diagram of an information reception, recording and reproduction apparatus at the time of an digital video sound data input according to Embodiment 13 of the present invention.

Next, the structure and the operation of an information reception, recording and reproduction apparatus according to the present Embodiment 13 is described primarily in reference to FIG. 30. Here, the structure and the operation of the information reception, recording and reproduction apparatus of the present embodiment are described and, at the same time, one embodiment of an information reception, recording and reproduction method of the present invention is described.

First, in reference to FIG. 30, the structure of the information reception, recording and reproduction apparatus of the present embodiment is described. Here, FIG. 30 shows a block diagram of the information reception, recording and reproduction apparatus.

As described below, coded digital video sound data, instead of analog video sound data, is inputted to the information reception, recording and reproduction apparatus according to the present embodiment which is, in the same manner as the information reception, recording and reproduction apparatus in the present Embodiment 12, an information reception, recording and reproduction apparatus wherein video portions without sound and without movement from and to the previous and subsequent video images are detected by a coding data amount calculation part 3001 from the inputted video sound data and the output of the outputted video sound data can be switched in an output switching part 3007, which receives the control of a switching control part 3006.

The information reception, recording and reproduction apparatus according to the present embodiment is formed of a coded data amount calculation part 3001 for detecting video portions without sound and without movement from and to the previous and subsequent video images from the coded digital video sound data, a time stamp sampling part 3002 for extracting a time stamp from the coded digital video sound data, a disk recording medium part 3003 for allowing random access, a time stamp analysis part 3004 for extracting a time stamp from the coded digital video sound data so as to analyze the time stamp, a decoding part 3008 for decoding the coded digital video sound data, an output switching part 3007 for switching between the video sound data which is outputted without being recorded in the disk recording medium part 3003 and the video sound data recorded in the disk recording medium part 3003, a switching control part 3006 for controlling this output switching part 3007, a user interface part 3005 for making notification of a command from the user to the switching control part 3006 and a DA conversion part (referred to as DAC in the figure) 3009 for converting the digital video sound data into analog video sound data.

The switching control part 3006 is a means of recognizing the occurrence of a video portion without sound and without movement from and to the previous and subsequent video images in the inputted video data from the output of the coded data amount calculation part 3001 and of gaining a time stamp, from time stamp sampling part 3002, with respect to the coded digital video sound data wherein the video portion without sound and without movement from and to the previous and subsequent video images has occurred. In addition, the switching control part 3006 is a means of gaining a time stamp, from the time stamp analysis part 3004, with respect to the coded digital video sound data, which is reproduced after being recorded in the disk recording medium part 3003. The switching control part 3006 is a means of receiving the outputs of the coded data amount calculation part 3001, of the time stamp sampling part 3002 and of the time stamp analysis part 3004 and of controlling the output switching part 3007 which switches between the video sound data that is outputted without being recorded in the disk recording medium part 3003 and the video sound data that is reproduced after being recorded in the disk recording medium part 3003.

Here, the means which includes the user interface part 3005 corresponds to the selection means of the present invention, means which includes the disk recording medium part 3003 corresponds to the recording and reproduction means of the present invention, the means which includes the output switching part 3007 corresponds to the output switching means of the present invention, means which includes the coded data amount calculation part 3001 corresponds to the detection means of the present invention, the means which includes the switching control part 3006 corresponds to the switching control means of the present invention, the means which includes the time stamp sampling part 3002 corresponds to the time information sampling means of the present invention and the means which includes the time stamp analysis part 3004 corresponds to the switching position specification means of the present invention.

Next, the operation of the information reception, recording and reproduction apparatus according to the present embodiment is described in the case that the switching of inputted video sound data has occurred.

In the information reception, recording and reproduction apparatus of FIG. 30, in the case that conventional switching and listening are carried out, inputted coded digital video sound data passes through the coded data amount calculation part 3001 and the time stamp sampling part 3002 so as to be recorded in the disk recording medium part 3003. The coded digital video sound data recorded in the disk recording medium part 3003 passes through the time stamp analysis part 3004 and the output switching part 3007 so as to be decoded into digital video sound data by the decoding part 3008 and, after that, passes through the DA conversion part 3009 so as to outputted as analog video sound. The user conventionally reproduces the video sound data recorded in the disk recording medium part 3003 in such a manner.

Here, when the user switches to the inputted video sound data, the user interface part 3005 makes notification of the switching of the inputted video sound data to the switching control part 3006.

The switching control part 3006 receives the output of the user interface part 3005 and controls the output switching part 3007 so that the video sound data is outputted without being recorded in the disk recording medium part 3003 from the video sound data recorded in the disk recording medium part 3003.

The output switching part 3007 switches the output from the coded digital video sound data recorded in the disk recording medium part 3003 to the inputted coded digital video sound data so as to output the video sound data to the decoding part 3008.

In addition, the inputted coded digital video sound data passes through the output switching part 3007, the decoding part 3008 and the DA conversion part 3009 so as to outputted to the outside of the apparatus and, at the same time, continuously passes through the coded data amount calculation part 3001 and the time stamp sampling part 3002 so as to be recorded in the disk recording medium part 3003 and, after that, passes through the time stamp analysis part 3004 so as to be outputted to the output switching part 3007.

Then, when the coded data amount calculation part 3001 detects a video portion without sound and without movement from and to the previous and subsequent video images in the inputted video sound data, the switching control part 3006 controls the decoding part 3008 so as to implement a conversion to the still video condition of the video portion without sound and without movement from and to the previous and subsequent video images and converts the video sound data outputted after passing through the DA conversion part 3009 to the still image condition of the video portion without sound and without movement from and to the previous and subsequent video images.

The switching control part 3006 also recognizes a time stamp of the inputted coded digital video sound data wherein the video portion without sound and without movement from and to the previous and subsequent video images has occurred from the time stamp sampling part 3002.

The time stamp analysis part 3004 monitors the time stamp of the coded digital video sound data, which is outputted from the disk recording part 3003, and determines whether or not the video sound data detected by the coded data amount calculation part 3001 is outputted from the disk recording medium part 3003 after being recorded in the disk recording medium part 3003 based on the time stamp gained from the time stamp sampling part 3002.

When the time stamp analysis part 3004 senses that the coded digital video sound data detected by the coded data amount calculation part 3001 is outputted from the disk recording medium part 3003, the switching control part 3006 switches the coded digital video sound data outputted from the output switching part 3007 from the inputted coded digital video sound data to the coded digital video sound data outputted from the time stamp analysis part 3004.

In addition, the switching control part 3006 directs the decoding part 3008 which is outputting the still video of the video portion without sound and without movement from and to the previous and subsequent video images, to decode and output the coded digital video sound data outputted from the time stamp analysis part 3004.

As described above, even in the case that the inputted video sound data is not analog video sound data as described in the present Embodiment 12 but, rather, is coded digital video sound data, video portions without sound and without movement from and to the previous and subsequent video images are detected at the time when the switching of the inputted video sound data is carried out and, thereby, an information reception, recording and reproduction method can be implemented wherein any unnatural feeling given to the user due to a time lag between the inputted video sound data and the video sound data that is reproduced after being recorded in the recording medium is reduced so that a smooth switching of the outputted video sound data is possible by switching and outputting the inputted video sound data and the video sound data that is reproduced after being recorded in the recording medium.

Here, the control for switching based on the detection result of the present invention means, in the above described embodiment, (1) when the detection means of the present invention detects a position where switching is carried out, the output switching means of the present invention is controlled so as to make the conversion to a predetermined condition and (2) when the switching position specification means of the present invention specifies the position to be switched, the output switching means is made to switch to the output of the signal which is recorded in the recording and reproduction means of the present invention and which is selected based on the indication for change. However, the present invention is not limited to this but, rather, the control for switching based on the detection result of the invention means of example, (1) even when the detection means of the present invention detects a position for switching, the output of the signal selected based on the indication for change, which does not pass through the recording and reproduction means, is maintained and (2) when the position to be switched is outputted from the recording and reproduction means of the present invention, it may be switched to the output of the signal selected based on the indication for change, which is recorded in the recording and reproduction means. Though some of the video signals are outputted again by passing through the recording and reproduction means after once being outputted through the recording and reproduction means so that, in some cases, a slight overlap occurs in the outputted video image in the above manner, such an information reception, recording and reproduction apparatus can be of a structure wherein the time information sampling means of the present invention or the switching position specification means of the present invention are not required so as to have the advantage of having a simple structure which can be manufactured at a low cost so that any unnatural feeling given to the viewer due to the slowness of response of the remote controller can by reduced to a certain extent.

In addition, control of the output switching means of the present invention so as to make a conversion to a predetermined condition means, in the above described present embodiment, to freeze the signal selected based on the indication for change, which is outputted without passing through the recording and reproduction means, in the condition of the detected position wherein switching is carried out. The present invention is not limited to this, however, and the control of the output switching means of the present invention so as to make a conversion to a predetermined condition may be, for example, to output a display showing that switching of the signal is being carried out to the screen.

In addition, though information with respect to time corresponding to the detected position wherein switching is carried out in the present invention is, in the above described embodiment, a time stamp, the invention is not limited to this but, rather, in summary, it may be information with respect to time that corresponds to the position where the switching is carried out, which is utilized at the time that switching is carried out.

In addition, the received signal in the present invention is, in the above described embodiment, an analog or a digital video sound signal so that the information reception, recording and reproduction apparatus of the present invention corresponds to any of these video sound signals. The present invention is not limited to this, however, and an information reception, recording and reproduction apparatus of the present invention may be provided with an analog/digital switching means so that it can deal with either an analog or a digital video sound signal and, in such a case, the recording and reproduction means of the present invention, for example, may, of course, be utilized in common change in the case of either of these video sound signals.

Here, the present invention is a program for allowing the functions of the entirety of, or a part of, the means (or apparatus, element, circuit, part, or the like) of the above described information reception, recording and reproduction apparatus of the present invention to be carried out by a computer and is a program which operates in cooperation with a computer.

In addition, the present invention is a program for allowing the operation of the entirety of, or some of, the steps (or processes, operations, working effects, or the like) of the above described information reception, recording and reproduction method of the present invention to be carried out by a computer and is a program which operates in cooperation with a computer.

Here, a part of the means (or apparatus, element, circuit, part, or the like) of the present invention and some of the steps (or processes, operations, working effects, or the like) of the present invention mean some means and some steps within these pluralities of means and steps or mean a portion of a function or a portion of an operation within one means or one step.

In addition, a recording medium which is readable by a computer and which records a program of the present invention is also included in the present invention.

In addition, one application mode of a program of the present invention may be a mode that is recorded in a recording medium that is readable by a computer and which operates in cooperation with a computer.

In addition, one application mode of a program of the present invention may be a mode that transmits in a transmission medium, is read by a computer and operates in cooperation with a computer.

A ROM, or the like, is included as the recording medium, while Internet, light, radio waves, sound waves and the like, are included as the transmission medium.

In addition, the above described computer of the present invention is not limited to hardware exclusively, such as a CPU but, rather, may be a computer which includes firmware, an OS or peripheral apparatuses.

Here, as described above, the structure of the present invention may be implemented in a software manner or may be implemented in a hardware manner.

Thus, the present invention has, for example, in an information reception, recording and reproduction method, or apparatus, which records or reproduces coded digital video sound data in a disk recording medium, which allows random access, a means of detecting a time stamp of the coded digital video sound data recorded in the above disk recording medium, a means of analyzing the time stamp of the coded digital video sound data which is reproduced from the above disk recording medium, a means of reproducing the inputted video sound data, after being recorded in the above disk recording medium, a means of reproducing the inputted video sound data in real time, without being recorded in the above recording medium, and an output switching means of switching between and of outputting video sound data which is reproduced after being recorded in the above disk recording medium and the video sound data which is reproduced without being recorded in the above disk recording medium, wherein this output switching means is characterized by switching the outputted video sound data by receiving the outputs from the above time stamp detection means and from the above time stamp analysis means.

In addition, the present invention is provided with a scene change detection means of detecting, for example, a scene switching position of the inputted video data in the above information reception, recording and reproduction method or apparatus and is characterized in that the above output switching means of switching and outputting the video sound data receives the output from this scene change detection means and switches to the outputted video sound data.

In addition, the present invention is provided with a sound mode switching detection means which detects a sound mode switching position of the inputted video sound data in, for example, the above information reception, recording and reproduction method or apparatus and is characterized in that the above output switching means of switching and outputting the video sound data receives an output from this sound mode switching detection means and switches to the received video sound data.

In addition, the present invention is provided with a CM detection means of detecting a CM part of the inputted video sound data in, for example, the above information reception, recording and reproduction method or apparatus and is characterized in that the output switching means of switching and outputting the above video sound data receives an output from this CM detection means and switches to the output of the outputted video sound data.

In addition, the present invention is provided with a coded data amount calculation means of detecting a soundless portion of the coded digital video sound data and a movement to and from the subsequent and previous video image in, for example, the above described information reception, recording and reproduction method or apparatus and is characterized in that the above output switching means of switching and outputting the video sound data receives an output from this coded data amount calculation means and switches to the outputted video sound data.

In addition, the present invention is characterized in that the above described information reception, recording and reproduction method or apparatus, wherein the above inputted video sound data is analog video sound data, is, for example, provided with a means of converting analog data into digital data, a means of temporarily storing the video digital data which is digitally converted, a means of coding digital video data, a means of recording digital data in the above disk recording medium, a means of reading out digital data from the above disk recording medium, a means of decoding the coded data and a means of outputting the decoded digital data after converting it to analog data.

In addition, the present invention is characterized in that the above information reception, recording and reproduction method or apparatus, wherein the above inputted video sound data is coded digital video sound data, is provided with a means of recording digital data in the above disk recording medium, a means of reading out digital data from the above disk recording medium, a means of decoding the coded data and a means of outputting the coded digital data after converting it to analog data.

As is clear from the above description, according to the present invention, an information reception, recording and reproduction method or apparatus wherein video sound data that is digitally coded is recorded to, and is reproduced from, a disk recording medium that allows random access is, for example, provided with a means of sampling a time stamp of the coded digital video sound data in order to reproduce the inputted analog video sound data or digital video sound data, a means of analyzing the time stamp of the coded digital video sound data that is reproduced from the above disk recording medium, a means of reproducing data after recording the data in a disk recording medium that allows random access, a means of reproducing data without recording the data in the recording medium, an output switching means of switching between and of outputting the video sound data that is reproduced after being recorded in the above disk recording medium and the video sound data that is reproduced without being recorded in the above disk recording medium and a scene change detection means of detecting the scene switching position of the inputted video data, wherein the output switching means of switching and outputting the above video sound data receives an output from the above scene change detection means and switches to the output of the outputted video sound data and, thereby, the advantageous effect can be gained wherein the switching of the inputted video sound data can be smoothly carried out.

In addition, according to the present invention an information reception, recording and reproduction method or apparatus for recording and reproducing digitally coded video sound data to and from a disk recording medium which allows for random access is provided with, for example, a means of sampling a time stamp of coded digital video sound data in order to reproduce inputted analog video sound data or digital video sound data, a means of analyzing the time stamp of the coded digital video sound data reproduced from the above disk recording medium, a means of reproducing data after recording the data in the disk recording medium, which allows random access, a means of reproducing data without recording the data in the recording medium, a output switching means of switching between and outputting the video sound data, which is reproduced after being recorded in the above disk recording medium, and the video sound data, which is reproduced without being recorded in the above disk recording medium and a sound mode switching detection means of detecting a sound mode switching position of the inputted video sound data, wherein the output switching means of switching and outputting the above video sound data receives an output from the above sound mode switching detection means and switches to the output of the outputted video sound data and, thereby, the advantageous effect can be gained wherein the switching of the inputted video sound data can be smoothly carried out.

In addition, according to the present invention, an information reception, recording and reproduction method or apparatus for recording and reproducing digitally coded video sound data to and from a disk recording medium which allows for random access is provided with, for example, a means of sampling a time stamp of the coded digital video sound data in order to reproduce inputted analog video sound data or digital video sound data, a means of analyzing the time stamp of the coded digital video sound data, which is reproduced from the above disk recording medium, a means of reproducing data after recording the data in the disk recording medium, which allows random access, a means of reproducing data without recording the data in the recording medium, an output switching means of switching between and outputting the video sound data which is reproduced after being recorded in the above disk recording medium and the video sound data which is reproduced without being recorded in the above disk recording medium and a CM detection means of detecting a CM portion of the inputted video sound data, wherein the output switching means of switching and outputting the above video sound data receives the output from the above CM detection means and switches the output of the outputted video sound data and, thereby, the advantageous effect can be gained wherein the switching of the inputted video sound data can be smoothly carried out.

In addition, according to the present invention, an information reception, recording and reproduction method or apparatus for recording and reproducing digitally coded video sound data to and from a disk recording medium which allows for random access is provided with, for example, a means of sampling a time stamp of the coded digital video sound data in order to reproduce inputted analog video sound data or digital video sound data, a means of analyzing the time stamp of the coded digital video sound data, which is reproduced from the above disk recording medium, a means of reproducing data after recording the data in the disk recording medium, which allows random access, a means of reproducing data without recording the data in the recording medium, an output switching means of switching between and outputting the video sound data which is reproduced after being recorded in the above disk recording medium and the video sound data which is reproduced without being recorded in the above disk recording medium and a coded data amount calculation means of detecting a soundless portion of the coded digital video sound data and a movement to and from the subsequent and previous video images, wherein the output switching means of switching and outputting the above video sound data receives the output of the above coded data amount calculation means and switches the output of the outputted video sound data and, thereby, an advantageous effect can be gained wherein the switching of the inputted video sound data can be smoothly carried out.

Here, the present invention concretely relates to an information reception, recording and reproduction method or apparatus for implementing a time shift reproduction by utilizing a disk recording medium that allows random access and includes a method or apparatus characterized by the smooth carrying out of the switching of the outputted video sound without giving an unnatural feeling to a viewer in the case wherein the switching operation of the inputted channel is carried out from a normal reproduction to a specific reproduction, such as a forward direction high speed reproduction or a reverse direction high speed reproduction.

INDUSTRIAL APPLICABILITY

As is clear from the above description, according to the present invention, an information reception, recording and reproduction apparatus, and the like, is gained wherein a smooth switching of the reproduction condition is possible even in the case that the reproduction condition has changed from, for example, normal reproduction to a specific reproduction or from a specific reproduction to a normal reproduction so that the switching of the inputted video sound data can be smoothly carried out.

The invention claimed is:

1. An information reception, recording and reproduction apparatus for carrying out a time shift reproduction wherein a video sound signal is reproduced after being temporarily recorded, comprising, at least:
    a first recording means of recording said video sound signal in order to carry out the operation of said time shift reproduction, which allows non-sequential random access, and a second recording means, which allows non-sequential random access, at a speed higher than that of said first recording means;
    a real time transmission means of transmitting said video sound signal in real time; and
    a switching means of switching among, and outputting an output of said first recording means, an output of said second recording means and an output of said real time transmission means, wherein
    said switching means carries out a switching operation based on a monitored condition of said video sound signal so that the output of said second recording means is automatically used for outputting before switching from the output of said first recording means and the output of said real time transmission means.

2. The information reception, recording and reproduction apparatus according to claim 1, further comprising:
    a first coding means of receiving an input of an analog signal as said video sound signal and of digitally coding said analog signal into coded data; and
    a first decoding means of gaining a digital signal by decoding said coded data and of converting the digital signal into an analog signal,
    wherein said first recording means and/or said second recording means carry out recording and reproduction of said video sound signal in the form of said coded data and/or said digital signal.

3. The information reception, recording and reproduction apparatus according to claim 2, further comprising a sampling means of sampling the entirety, or a part of, said video sound signal as a specific reproduction signal for use in a specific reproduction based on the reproduction condition of said video sound signal,
    wherein said second recording means records or reproduces said specific reproduction signal.

4. The information reception, recording and reproduction apparatus according to claim 3, wherein said sampling means has the function of changing the intervals of sampling time of said specific reproduction signal in accordance with the speed of the specific reproduction.

5. The information reception, recording and reproduction apparatus according to claim 3, wherein said sampling means samples said specific reproduction signal in, the form of said coded data and/or the form of the digital signal before said coded data is coded.

6. An information reception, recording and reproduction apparatus according to claim 3, wherein said second recording means changes the order of reproduction of the coded data, which is said specific reproduction signal, and of the digital data before being coded, based on the reproduction condition of said video sound signal.

7. The information reception, recording and reproduction apparatus according to claim 1, further comprising a second decoding means of receiving coded data that is digitally coded as said video sound signal, of gaining a digital signal by decoding said coded data and, in addition, of converting the digital signal into an analog signal, wherein said first recording means and/or said second recording means carry out recording and reproduction of said video sound signal in the form of said coded data and/or said digital signal.

8. A computer readable medium storing a program for allowing a computer to function as the entirety of, or a part of, the first recording means which records said video sound signal for carrying out the operation of said time shift reproduction and which allows random access and the second recording means which allows random access at a speed higher than that of said first recording means, the real time transmission means of transmitting said video sound signal in real time and the switching means of switching between and outputting the output of said first recording means, the output of said second recording means and the output of said real time transmission means of the information reception, recording and reproduction apparatus according to claim 1.

* * * * *